US012586060B2

(12) United States Patent
Ortiz et al.

(10) Patent No.: US 12,586,060 B2
(45) Date of Patent: *Mar. 24, 2026

(54) METHODS AND SYSTEMS FOR DIGITAL REWARD PROCESSING

(71) Applicant: ROYAL BANK OF CANADA, Toronto (CA)

(72) Inventors: Edison U. Ortiz, Orlando, FL (US); Iustina-Miruna Vintila, Bucharest (RO)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,976

(22) Filed: Nov. 14, 2024

(65) Prior Publication Data

US 2025/0078064 A1 Mar. 6, 2025

Related U.S. Application Data

(63) Continuation of application No. 18/380,485, filed on Oct. 16, 2023, now Pat. No. 12,165,135, which is a
(Continued)

(51) Int. Cl.
G06Q 20/36 (2012.01)
G06F 16/27 (2019.01)
(Continued)

(52) U.S. Cl.
CPC ......... G06Q 20/3674 (2013.01); G06F 16/27 (2019.01); G06F 21/62 (2013.01);
(Continued)

(58) Field of Classification Search
CPC .. G06Q 20/3674; G06Q 20/065; G06Q 20/10; G06Q 30/0207; G06Q 30/0226;
(Continued)

(56) References Cited

U.S. PATENT DOCUMENTS 10,055,715 B1 * 8/2018 Grassadonia .......... G06Q 20/36
2015/0149272 A1 5/2015 Salmon et al.
(Continued)

OTHER PUBLICATIONS

Malhotra "Bitcoin Protocol: Model of 'Cryptographic Proof' Based Global Crypto-Currency & Electronic Payments System", retrieved from http://yogeshmalhotra.com/BitcoinProtocol.html, Feb. 4, 2017, 11 pages (Year: 2017).*
(Continued)

*Primary Examiner* — James D Nigh
(74) *Attorney, Agent, or Firm* — Norton Rose Fulbright Canada LLP

(57) ABSTRACT
Embodiments generally relate to the field of reward processing, and more particularly, systems, methods, and computer readable media for digital reward processing utilizing distributed ledger technology. Distributed ledger technology is utilized wherein distributed ledgers are stored on a plurality of node computing devices, the distributed ledgers including sequential entries that are cryptographically linked to one another.

20 Claims, 38 Drawing Sheets

Related U.S. Application Data continuation of application No. 17/132,997, filed on Dec. 23, 2020, now Pat. No. 11,790,350, which is a continuation of application No. 16/101,122, filed on Aug. 10, 2018, now Pat. No. 10,909,529, which is a continuation-in-part of application No. PCT/CA2017/050169, filed on Feb. 13, 2017.

(60) Provisional application No. 62/341,363, filed on May 25, 2016, provisional application No. 62/294,978, filed on Feb. 12, 2016.

(51) Int. Cl.

| | |
|---|---|
| *G06F 21/62* | (2013.01) |
| *G06Q 20/06* | (2012.01) |
| *G06Q 20/10* | (2012.01) |
| *G06Q 30/0207* | (2023.01) |
| *G06Q 30/0226* | (2023.01) |
| *G06Q 30/0601* | (2023.01) |
| *H04L 9/00* | (2022.01) |
| *H04L 9/06* | (2006.01) |
| *H04L 9/32* | (2006.01) |
| *H04L 9/40* | (2022.01) |

(52) U.S. Cl.
CPC ........... *G06Q 20/065* (2013.01); *G06Q 20/10* (2013.01); *G06Q 30/0207* (2013.01); *G06Q 30/0226* (2013.01); *G06Q 30/0601* (2013.01); *H04L 9/0637* (2013.01); *H04L 9/3236* (2013.01); *G06Q 2220/00* (2013.01); *H04L 9/50* (2022.05); *H04L 2209/56* (2013.01)

(58) Field of Classification Search
CPC ........... G06Q 30/0601; G06Q 2220/00; G06F 16/27; G06F 21/62; H04L 9/0637; H04L 9/3236; H04L 9/50; H04L 2209/56; H04L 63/20
USPC .......................................................... 705/67
See application file for complete search history.

(56) References Cited

U.S. PATENT DOCUMENTS

| | | | | |
|---|---|---|---|---|
| 2015/0269624 | A1* | 9/2015 | Cheng | G06Q 30/0261 |
| | | | | 705/14.58 |
| 2015/0356555 | A1* | 12/2015 | Pennanen | G06Q 20/4014 |
| | | | | 705/71 |
| 2016/0012424 | A1 | 1/2016 | Simon et al. | |
| 2017/0032365 | A1* | 2/2017 | Liberty | G06Q 20/10 |
| 2017/0161734 | A1* | 6/2017 | Bankston | G06Q 20/405 |
| 2017/0178127 | A1* | 6/2017 | Kravitz | G06Q 20/38215 |
| 2017/0372392 | A1* | 12/2017 | Metnick | G06Q 30/0613 |
| 2019/0199787 | A1* | 6/2019 | Carver | H04L 67/568 |
| 2019/0340619 | A1* | 11/2019 | Leong | G06Q 20/145 |

OTHER PUBLICATIONS

European Patent Office (EPO), Extended European Search Report issued to EP 23187576.6, dated Oct. 18, 2023.

Anonymous: "Making blockchain real for customer loyalty rewards programs", Deloitte, Jan. 1, 2016 (Jan. 1, 2016), XP055607280, Retrieved from the Internet: URL:https://www.finextra.com/finextra-downloads/newsdocs/us-fsi-aking-blockchain-real-for-loyalty-rewards-programs.pdf.

Patent Corporation Treaty, International Search Report and Written Opinion dated Jun. 1, 2017 in respect of corresponding PCT Application No. PCT/CA2017/050169.

European Patent Office, Extended European Search Report dated Sep. 9, 2019 in respect of corresponding EP Application No. 17749884.7.

Canadian Intellectual Property Office, International Search Report and Written Opinion dated Jun. 1, 2017 in respect of PCT Application No. PCT/CA2017/050169.

Canadian Intellectual Property Office, Office Action, issued in application 3,014,392, dated Mar. 2, 2023.

European Patent Office, Examination Report, issued in application 17749884.7, dated Jun. 30, 2021.

\* cited by examiner

FIG. 37

METHODS AND SYSTEMS FOR DIGITAL REWARD PROCESSING

CROSS REFERENCE TO RELATED APPLICATIONS

This application is a continuation of U.S. patent application Ser. No. 18/380,485 filed Oct. 16, 2023, which is a continuation of U.S. patent application Ser. No. 17/132,997 filed Dec. 23, 2020, which is a continuation of U.S. patent application Ser. No. 16/101,122 filed Aug. 10, 2018, entitled "METHODS AND SYSTEMS FOR DIGITAL REWARD PROCESSING", which is a continuation in part of PCT International Application No. PCT/CA2017/050169, filed Feb. 13, 2017, which claims benefit of two provisional applications, U.S. Application Nos. 62/341,363, dated May 25, 2016 and 62/294,978, dated Feb. 12, 2016, the contents of which are incorporated in their entirety herein by reference.

FIELD

Some embodiments described herein generally relate to the field of reward processing, and more particularly, systems and methods for digital reward processing are provided utilizing distributed ledger technology, wherein distributed ledgers are stored on a plurality of node computing devices, the distributed ledgers including sequential entries that are cryptographically linked to one another.

INTRODUCTION

In the context of digital reward processing, there may be various challenges encountered, for example, there may be significant resources devoted and/or required in relation to managing and processing digital rewards. In the computing ecosystem, there are differing standards, triggers, conditions, and logical rules that are taken into consideration.

Accordingly, a decentralized solution may be desirable that addresses some or more of the challenges associated with digital reward processing. A decentralized solution also permits innovative approaches to rule propagation and transaction querying that are otherwise not available or difficult in a traditional centralized solution.

SUMMARY

In some embodiments, an improved computing infrastructure is provided, directed to implementing an improved computer architectural approach to leverage blockchain (e.g., Ethereum™) for business process integration between merchants and a backend points exchange platform. The improved data architecture is a foundation for supporting a loyalty exchange merchant protocol that, in some cases, is adapted as a flexible framework supporting other merchant interactions in relation to different use cases (e.g., settlement).

In accordance with one aspect, there is provided a system for electronically managing virtual tokens corresponding to loyalty rewards stored on a series of decentralized devices, the system comprising: a plurality of node computing devices, each node computing device of the plurality of node computing devices having a communication link established with at least one other node computing device of the plurality of node computing devices; a plurality of distributed ledgers, each distributed ledger of the plurality of distributed ledgers managed by a corresponding node computing device of the plurality of node computing devices, the plurality of distributed ledgers together tracking generation, provisioning and processing of the virtual tokens through sequential entries that are cryptographically linked together and propagated through the plurality of distributed ledgers through application of a set of electronic propagation consensus mechanisms that are applied to determine whether an incoming sequential entry should be added at a target distributed ledger; an interface layer provided at some or all of the nodes of the node computing devices, the interface layer adapted for receiving electronic instructions at payment transaction devices operatively linked to the corresponding node computing device, the electronic instructions including at least data transmissions representative of an electronic transaction; wherein the interface layer is configured to extract, from the electronic instructions, one or more control commands indicative of requests to generate, provision or process virtual tokens stored in a digital wallet linked to a user profile, the one or more control commands adapted to interface with the plurality of distributed ledgers by recording electronic transactions to the distributed ledger corresponding to the node computing device that the interface layer is operating on, the electronic transactions representative of data records corresponding to the one or more control commands and adapted for propagation through the plurality of distributed ledgers through the communication links established between the individual node computing devices of the plurality of node computing devices, the propagation updating each of the plurality distributed ledgers by generating new sequential entries cryptographically linked to existing sequential entries.

In accordance with another aspect, the system further comprises a control command generator operatively coupled to the interface layer configured to encapsulate one or more data payloads that are propagated to the plurality of distributed ledgers through the communication links established between the individual node computing devices of the plurality of node computing devices, the one or more data payloads encapsulated to include at least: (i) a transaction amount, (ii) a transaction type, (iii) an originating account identifier, (iv) a counterparty account identifier, and (v) a merchant identifier; and wherein the one or more data payloads are aggregated in one or more blocks that are stored within the sequential entries on the plurality of distributed ledgers.

In accordance with another aspect, the system the control command generator is configured to encrypt at least a portion of each of the one or more data payloads using at least a public key corresponding to the merchant identifier; and wherein a corresponding private key to the public key is made available to a corresponding merchant, the corresponding private key usable by the corresponding merchant to decrypt the one or more data payloads; wherein the one or more blocks aggregate only data payloads that share a common merchant identifier; and wherein the cryptographic linkages between the one or more blocks are generated using at least the public key corresponding to the merchant identifier.

In accordance with another aspect, each of the data payloads includes an encrypted portion and a non-encrypted portion, the encrypted portion including identifiable information, and the non-encrypted portion including non-identifiable transaction information.

In accordance with another aspect, each of the data payloads includes a variable confirmation requirement field that is determined based on a transaction value of the data payloads, wherein data payloads having greater transaction values have proportionally increased variable confirmation requirements, each of the variable confirmation requirements identifying a minimum number of the plurality of distributed ledgers upon which a block corresponding to the data payload must be confirmed prior to the data payload being marked as recorded, the minimum number determined to reduce a probability of an unresolved race condition.

In accordance with another aspect, the interface layer is configured to initiate one or more queries associated with the virtual tokens stored in the digital wallet or linked to the user profile by performing a traversal of a portion of a predefined number of the distributed ledgers of the plurality of distributed ledgers, the traversal utilizing the private key corresponding to the merchant identifier to decrypt the cryptographic linkages between the one or more blocks.

In accordance with another aspect, the system further includes a legacy onboarding utility that is configured to receive, from an external rewards database, an array of data messages representing a series of transactions to onboard legacy rewards points records; and instruct the control command generator to generate a corresponding data payload for each data message of the array of data messages, each of the data payloads being populated with a bypass value in the variable confirmation requirement field such that no confirmations are required prior to the data payload being marked as recorded.

In accordance with another aspect, the system further includes a cross-platform transfer mechanism for processing transactions between a first digital wallet and a second digital wallet, the first digital wallet corresponding to a first merchant, and the second digital wallet corresponding to a second merchant; the cross-platform transfer mechanism configured to: receive, from authentication interfaces associated with each of the first and the second merchant, a first private key associated with the first merchant and a second private key associated with the second merchant; determine, from a conversion table, a conversion rate to be applied as between transaction amounts from the first digital wallet and the second digital wallet; instruct the control command generator to cause the recordation of a first transaction on the first digital wallet using the first private key and the recordation of a second transaction on the second digital wallet using the second private key, the transaction amounts determined based at least on the conversion rate; and confirm the recordation of the first transaction and the second transaction by monitoring received confirmations related to both of the first and the second transaction until a total number of confirmations required in the variable confirmation requirement fields is satisfied.

In accordance with another aspect, the system further includes an accumulation monitoring mechanism configured to periodically or continuously mine an external transaction log to identify accumulation of new virtual tokens associated with the user profile, the accumulation monitoring mechanism configured to instruct the control command generator to generate one or more new data payloads corresponding to the accumulated new virtual tokens, each of the new data payloads including an originating account identifier populated as a virtual token treasury, a counterparty account identifier populated with the virtual wallet associated with the user profile, and a variable confirmation requirement field populated with a bypass value in the variable confirmation requirement field such that no confirmations are required prior to the data payload being marked as recorded.

In accordance with another aspect, the system further includes a plurality of distributed processing rule ledgers each being managed by a corresponding node computing device of the plurality of node computing devices and corresponding to a distributed ledger of the plurality of distributed ledgers, the distributed processing rule ledgers sequentially storing a series of modifications of processing rules; wherein the interface layer of each node computing device is configured to traverse the corresponding distributed processing rule ledger during the extraction of the one or more control commands to identify and to apply a latest updated processing rule.

In accordance with another aspect, the control command generator is configured to encapsulate rule modifications and rule modification authorization keys alongside the electronic transactions within at least one of one or more the data payloads; wherein the interface layer of each node computing device is configured to receive propagated data payloads from neighboring node computing devices that are directly in communication with the node computing device, and the interface layer is further configured to (i) extract transaction information for addition to the distributed ledger corresponding to the node computing device where the propagation consensus mechanisms are satisfied, and (ii) extract the rule modifications authorized against the rule modification authorization keys for addition to the processing rule ledger corresponding to the node computing device.

In accordance with another aspect, the interface layer of each node computing device is configured to, upon adding a rule modification to the processing rule ledger corresponding to the node computing device, generate new private key requirements based at least on the rule modification authorization keys, the new private key requirements generated to provide a cascading chain of authorization keys that are automatically modified on every rule modification added to the corresponding processing rule ledger.

Corresponding methods and computer readable media are provided.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 6 is illustrative of two use cases wherein a user earns points while purchasing an item from a merchant.

FIG. 7 is illustrative of a use case wherein a credit card account is utilized to provision payments, and rewards are accrued in relation to the credit card.

FIG. 8 is illustrative of a use case for payments and rewards, in single currency.

FIG. 9 is illustrative of two use cases where payments and rewards are conducted in multiple currencies (e.g., CAD and rewards points).

FIG. 10 is an example depicting of how records may be stored in various blocks of a blockchain.

Figure 37:
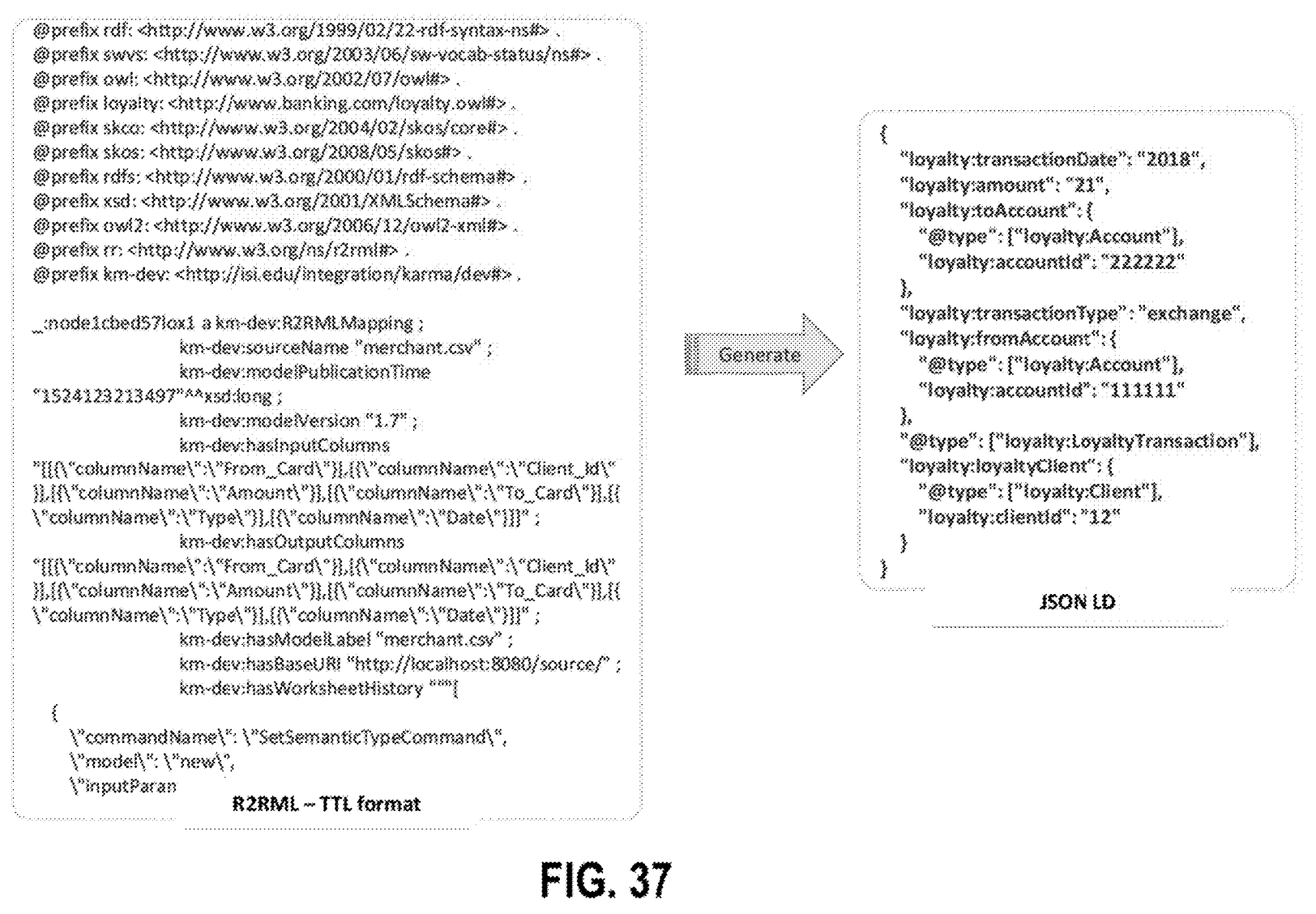

FIG. 37 is an example of an application of an R2RML model to a JSON Linked Data, according to some embodiments.

DETAILED DESCRIPTION

Figures 1A, 1B:
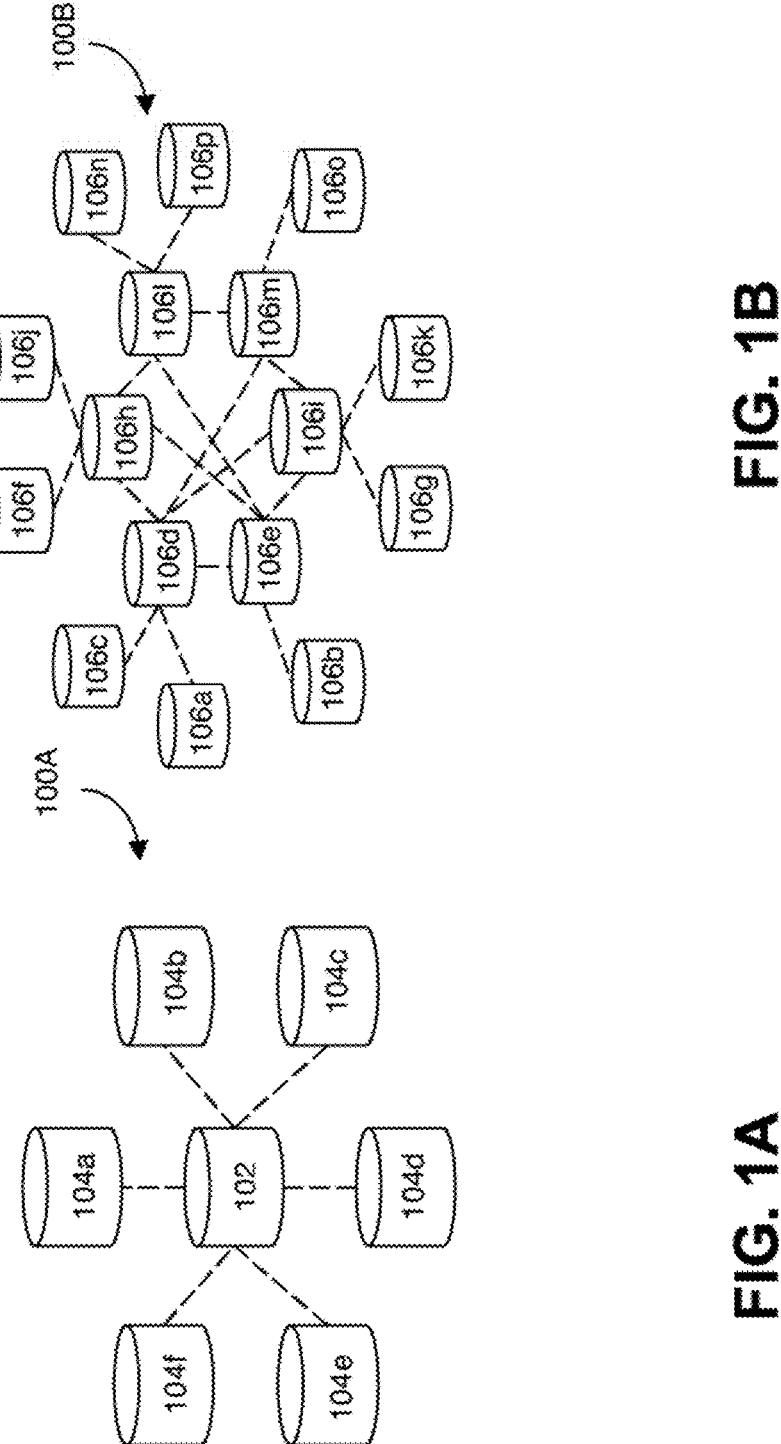
FIG. 1A illustrates an example platform where a digital reward processing system is provided in the form of a hub-and-spoke model.
FIG. 1B illustrates another example system where a digital reward processing platform is provided that utilizes a decentralized set of nodes, each of the nodes maintaining copies of ledger that is developed in accordance with blockchain and/or distributed ledger techniques.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, various systems, methods, and/or computer-readable media may be provided in relation to computing, and more particularly, systems, methods, and/or computer-readable media for digital reward processing. These systems, methods, and/or computer readable media may be configured to provide backend computing functionality associated with learning and redeeming loyalty points, utilizing and/or interfacing with distributed ledger technology.

In pre-distributed ledger approaches, digital rewards are saved on a centralized backend that is controlled by one or a group of issuer organizations. The centralized backend is vulnerable to cyberattacks as the centralized backend provides a single point of failure. Traditional digital rewards platforms have been targeted by various hacking organizations, and malicious actors have affected the integrity of the underlying rewards programs as accounts have been subject to unauthorized transactions.

Where a centralized backend is utilized, the underlying records, when maliciously accessed, can be modified and for example, a number of reward currency can be modified, spent, etc. These transactions are difficult to trace and verify, and the veracity of existing records is subject to question. Further, as a centralized system is generally controlled by a single issuer organization, partner organizations may be unable to independent initiate, access/view/edit transactions without actions taken by the issuer organization. Accordingly, there may be bottlenecks caused inadvertently by a lack of computing resources or conversely, an increase in demand in relation to transactions or transaction complexity.

In some embodiments, a blockchain implementation is described wherein virtual tokens are stored on a series of decentralized devices acting as node computing devices each having a copy of a distributed ledger managed on the node computing device in accordance with electronic propagation mechanisms (e.g., consensus mechanisms used to effect state transitions in relation to the updating of the nodes such that the distributed ledgers contain the same entries across the decentralized network) that are used to validate and verify transactions/activities that relate to a loyalty reward program. The blockchain implementation provides improvements in event ordering (e.g., transactions are ordered based on their timestamp, in a FIFO queue), block creation (e.g., transactions are stored in immutable corresponding blocks), block chaining (e.g., blocks are chained using the previous block hash, before being codified in a system chain, improving the integrity of the events stored in the blockchain and permits for easy queries by way of traversal), preventing double-spend (e.g., transactions are checked to see if their output was not previously claimed by another transaction (account balance validation)).

The embodiments provide a technical improvement over prior centralized loyalty rewards programs in some aspects, with corresponding tradeoffs in relation to distributed control and overall complexity. For example, there are increased complexities in configuring nodes to manage the distributed ledgers such that, insomuch as possible, a single view of the distributed ledger is promoted at a given time (e.g., prevention of forks/collisions in ledger entry generation). Distributed ledger specific considerations require a technical approach to rectify/avoid (e.g., a potential for double spending) while maintaining a sufficient level of transaction comfort (e.g., probability that a transaction is properly confirmed and propagated across the distributed ledgers) and security.

Furthermore, another technical challenge to be addressed includes the propagation of changes to consensus rules, which may be required, for example, based on changes to a program (e.g., trades between different types of loyalty rewards, on-boarding of a new loyalty reward program), etc., which, while trivial in a centralized system context, are more difficult given that any changes require propagation to a distributed set of decentralized nodes.

Accordingly, in some embodiments, a system for electronically managing virtual tokens corresponding to loyalty rewards stored on a series of decentralized devices is provided that includes a plurality of node computing devices, each having a communication link established with at least one other node computing device of the plurality of node computing devices.

The node computing devices each manage a plurality of distributed ledgers that together track generation, provisioning and processing of the virtual tokens through sequential entries that are cryptographically linked together and propagated through application of a set of electronic propagation consensus mechanisms that are applied to determine whether an incoming sequential entry should be added at a target distributed ledger.

An interface layer is provided at some or all of the nodes of the node computing devices, that receives electronic instructions at payment transaction devices operatively linked to the corresponding node computing device, the electronic instructions including at least data transmissions representative of an electronic transaction.

These electronic instructions may be extracted, for example, based on spending behavior, transaction details, promotions, etc. For example, transactions may be provided in encoded formats whereby the system may extract details relating to qualifying spend and/or other activities and rewards provisioning logical conditions and operators may be utilized to either generate corresponding new virtual tokens on the distributed ledger or facilitate a transfer or otherwise cause a transaction to be posted on the distributed ledger.

The interface layer (e.g., as provided by an interface unit) extracts, from the electronic instructions, control commands indicative of requests to generate, provision or process virtual tokens stored in a digital wallet linked to a user profile. In some embodiments, the interface layer is further configured for facilitating queries through conducting one or more traversals of the distributed ledgers, for example, by traversing linked sequential or related entries through their cryptographic linkages.

The one or more control commands are used to then interface with the plurality of distributed ledgers by recording electronic transactions to the distributed ledger corresponding to the node computing device that the interface layer is operating on, the electronic transactions representative of data records corresponding to the one or more control commands and adapted for propagation to update each of the plurality distributed ledgers by generating new sequential entries cryptographically linked to existing sequential entries. These command controls may be generated by a request processing unit.

In other embodiments, a control command generator is further included to encapsulate data payloads for propagation across the distributed ledgers, and these data payloads may relate to transactions and record transaction information, such as a transaction amount, a type of transaction, account identifiers, merchant information, etc.

Public and private key mechanisms are utilized to maintain (or in some embodiments bypass) privacy/security settings as between merchants (e.g., Store A may be prevented from querying/viewing/decrypting records stored in relation to Store B's loyalty rewards program). In some embodiments, key pairs are utilized to establish transactions and trades as between loyalty rewards programs. For example, each merchant/participating program may be associated with one or more key pairs that are utilized to validate transactions that convert from one virtual currency to another. In the context of conversions of one virtual currency to another, specially configured key pairs may be utilized such that both of the originating merchant/loyalty program and the recipient merchant/loyalty program are both able to see various aspects of the data payloads that are associated with points conversions.

The data payloads, in some embodiments, are configured to have partial encryption or to use of tiered/cascading encryption to ensure that parties have differing levels of access, and different portions of the data payloads may have differing levels of encryption. The cryptographic linkages between data payloads may be both used for enhanced security relative to centralized implementations and, in some embodiments, may be used for facilitating queries (e.g., a heuristically simpler transaction verification path by checking predecessor linked transactions), etc.

As each node has a copy of the distributed ledger, a participant computing system may be able to access and/or run various queries and/or reports based on the distributed ledger to obtain a view of transactions that have been processed, a total amount of virtual credits available, etc.

To obtain comfort that a transaction has been processed and exists as an immutable (or difficult to modify) record on the distributed ledgers, a minimum number of confirmations (i.e., successful queries) may be required by the system to determine whether it should mark or otherwise flag a transaction as successfully completed. Such a process helps mitigate race conditions and double spending issues that could occur in a decentralized distributed system.

For example, a transaction may be posted at one node, and before the transaction can be propagated across a sufficient number of networked distributed ledgers, a transaction for the same underlying reward credits may be posted at another node. In such a scenario, the consensus rules cause only one of the transactions to ultimately prevail and to exist on the distributed ledgers. Accordingly, in some embodiments, the system is configured to track confirmations prior to accepting a transaction as actually existing on the distributed ledgers. The number of confirmations may be dynamically determined, as an increase in the number of confirmations required potentially causes a proportional decrease in overall transaction processing speed, especially where a sequential series of transactions relating to the same or similar underlying credits are made.

In some embodiments, an on-boarding engine may be provided to onboard legacy credits into the system. Where legacy credits are being on-boarded into the system, the onboarding utility may be configured to provide a bypass value such that no confirmations are required so that loading of the credits may be conducted without delay as the source is trusted and there is a reduced risk of double spending or transaction collision issues.

In some embodiments, the data payloads may include processing rule (e.g., conversion rule/consensus rule) modifications that are "piggy-backed" on to existing transactions or sent as separate data payloads. When processing data payloads having rule modifications, the consensus and/or processing rules residing on the nodes may also be modified (e.g., to reflect a new policy that 1000 points of rewards type A are now convertible to 1250 points of rewards type B, instead of 1000 points of rewards type B). The inclusion of processing rule modifications allows for a decentralized system to periodically modify operational parameters without needing a centralized authority to "push" rule modifications downwards, as would otherwise be conducted in a conventional platform. Rather, the processing rule modifications propagate similar to transactional data payloads and, when processed, cause rule modifications that gradually propagate to modify the operation of all nodes over a period of time.

However, given that these rule modifications are no longer centrally managed and are subject to the propagation process, in some embodiments, the rule modification payloads further encapsulate a delay period or a confirmation number/check requirement prior to being put in force. For example, an improved conversion ratio (e.g., for incentivizing individuals to shift rewards from one system to another for the holidays) may require to be delayed by several hours while the changes propagate through the nodes, or, in some embodiments, changes are only implemented when a minimum number of non-correlated (e.g., having geographical or virtual distance) nodes queried by a particular node indicate that the changes have indeed been processed on those nodes as well.

Where rule modifications are "piggy backed" on to existing transactions, a convenient and computationally efficient approach is utilized whereby the propagation mechanism is used not only to conduct transactions, but also to securely transmit and cause the modification of processing rules alongside transactions, reducing overall bandwidth consumption and processing requirements. When processing transactions in relation to the distributed ledger, each node may query processing rules by traversing the separate ledger storing modifications to the processing rules in sequentially chained blocks.

Rule modifications may be secured from malicious activity through the use of merchant public/private key pairs, which, in some embodiments, are generated in a cascaded manner so that each generation of a processing rule modification FIG. 1A illustrates an example platform 100A where a digital reward processing system is provided in the form of a hub-and-spoke model. In this example, the nodes 104a-104f are configured for communication with a central "hub" 102, which, for example, may be a group of computing devices, such as those in a data center.

Hub 102 is provides a central repository of structured information, employing rules and constraints (schemas, unique, foreign keys, etc.) to ensure data consistency, and can be held, for example, as a database hosted inside an organization. In the example of FIG. 1A, a central authority (hub 102) has full control over transactions and data integrity of its databases and records. Trust relationships with partners (merchants, payment processors, Rewards Points provider) are generally established separately.

A challenge with the platform of FIG. 1A is that there may be significant time required for settling transactions (e.g., 2 days (or more)), and such tasks are generally done through batch processing. Further, additional reconciliation processes may be required to solve data integrity between parties. There may be difficulties in relation to ensuring integrity, as transactions can be further altered. Accordingly, such platforms may be heavily regulated, in some jurisdictions, to establish trusted relationships between the parties.

Users may require further identification and authentication, before accessing the platform, and while an audit log for security or business events may be maintained its immutability cannot be ensured. Participants may be dependent on control given by the central authority 102, and such control may be established through the application and/or use of standard roles or permissions (e.g., row-based, standard database restrictions: unique keys, constraints checks). However, such controls may not be effective to protect a database against malicious modifications.

Historical transactions can be altered by central authority 102, and ad-hoc mechanisms may be implemented to account for various alterations and modifications that may be necessary. In view of the hub-and-spoke model, there are often no public or independent mechanism to guarantee data integrity and validation aside from that provided by the central authority 102. The approach of FIG. 1A is a 'master-slave' relationship, where updates to a master database are then propagated to the various slaves (e.g., the nodes 104a-104f). This approach can present performance bottlenecks or data integrity issues.

A centralized intermediary may be required to manage trust between participants, and integrity and consistency constraints can be implemented through various types of semantic rules checks (database level or data in motion). In relation to the model of FIG. 1A, Additional reconciliation processes are likely necessary to ensure sure changes/updates are validated and confirmed (solve data integrity between parties, and each participant still has a copy of the shared data store. A potential challenge that arises with the model of FIG. 1A is the reprogramming/overhead that is required every time one wishes to add nodes and/or make changes to the system.

FIG. 1B illustrates another example platform 100B where a digital reward processing platform is provided that utilizes a decentralized set of nodes 106a-106p, each of the nodes 106a-106p maintaining copies of ledger that is developed in accordance with blockchain and/or distributed ledger techniques. The distributed ledger that is maintained on each of the nodes includes a set of computationally generated linked records, the records holding data values and/or objects indicative of an underlying virtual asset (e.g., a virtual credit).

The process of utilizing ledger consensus helps provide a solution for validity checks of the transactions. Data synchronization may help provide a level of consistency across network. Validated transactions on the network can be legally binding, as per established agreements, as the records may be difficult to alter and/or modify once the records are propagated through the system. For example, due to the computationally increased security and immutabilty of records, the model platform of FIG. 1B may, for example, be adapted such that organizations and/or regulatory bodies may apply regulatory services on top of the ledger. Existing intermediary roles (clearinghouses, etc.) can be simplified due to the cryptographic/security backing of the blockchain.

Ledger consensus may be provided by way of propagation rules, which, for example, control whether a particular update or record should be posted to a particular distributed ledger. Each of the nodes is configured to propagate transactions to neighboring nodes such that over time, each of the distributed ledgers contains a difficult to modify record of sequential entries. These sequential entries are cryptographically linked together whereby the linkages can be utilized to efficiently verify records by processing predecessor records (e.g., using cascading hashes or application of cryptographic techniques).

The platform may be incorporated in a permissioned blockchain architecture, which may utilize public key cryptography. The platform may thus provide a mechanism (e.g., built-in) for Blockchain ledgers to provide write only and tamper-proof (or tamper resistant) storage of events, records, transactions, information, credits, etc.

The control may be distributed across ledger participants, where each participant has control over its assets managed on the ledger. Example roles may include, data writes, data types, transaction verifications, among others.

Data stored in the distributed ledger is highly resistant to changes, such as deletions or modifications. Transactions may be split into time-ordered blocks and these transactions may include, for example, calculating the cryptographic hash of each of these blocks. A consensus process may be utilized to continuously validate the hashes, ensuring underlying data has not been altered. In some embodiments, by way of linkages between various parties, a closed-loop network of permissioned Blockchain participants (or nodes). Participants (e.g., nodes 106a-106p) may have different roles and economic incentives, for example, including merchants, payment processors (e.g., TSYS™), acquirers (e.g., Moneris™), merchant aggregators (e.g., Bridge2Solutions™), etc.

Each participant may have its own copy of the blockchain ledger, which, due to its computational construction, have an immutable (or at least tamper resistant) history of some or all of transactions which occurred in the network. Trust may thus be built-in at the "protocol level" of Blockchain given that it includes a function of native cryptographic verifications. Participants (e.g., nodes), in some embodiments, may be dynamically added and/or removed (e.g., the number may not be constant).

The example platform of FIG. 1B may provide for various additional functionality, such as real-time transaction processing, wherein data is shared in a limited trust environment, where none of the parties controls the information. All parties may have write access, and data integrity may be increased. Efficient settlement processes, tamper-proof transaction data and legal guarantees may thus be provided by implementing distributed ledgers in various types of limited trust environments.

Further, the example platform of FIG. 1B may also be adapted such that peer-to-peer transactions can be conducted without necessarily involving a centralized authority (e.g., a bank), by participants submitting updates to the blockchain ledger indicative of transactions (e.g., transfers). For example, a participant may have a number of keys corresponding to virtual credits stored in a digital wallet and the participant may update the blockchain ledger to indicate that such credits should be transferred to another participant's digital wallet.

Figure 2:
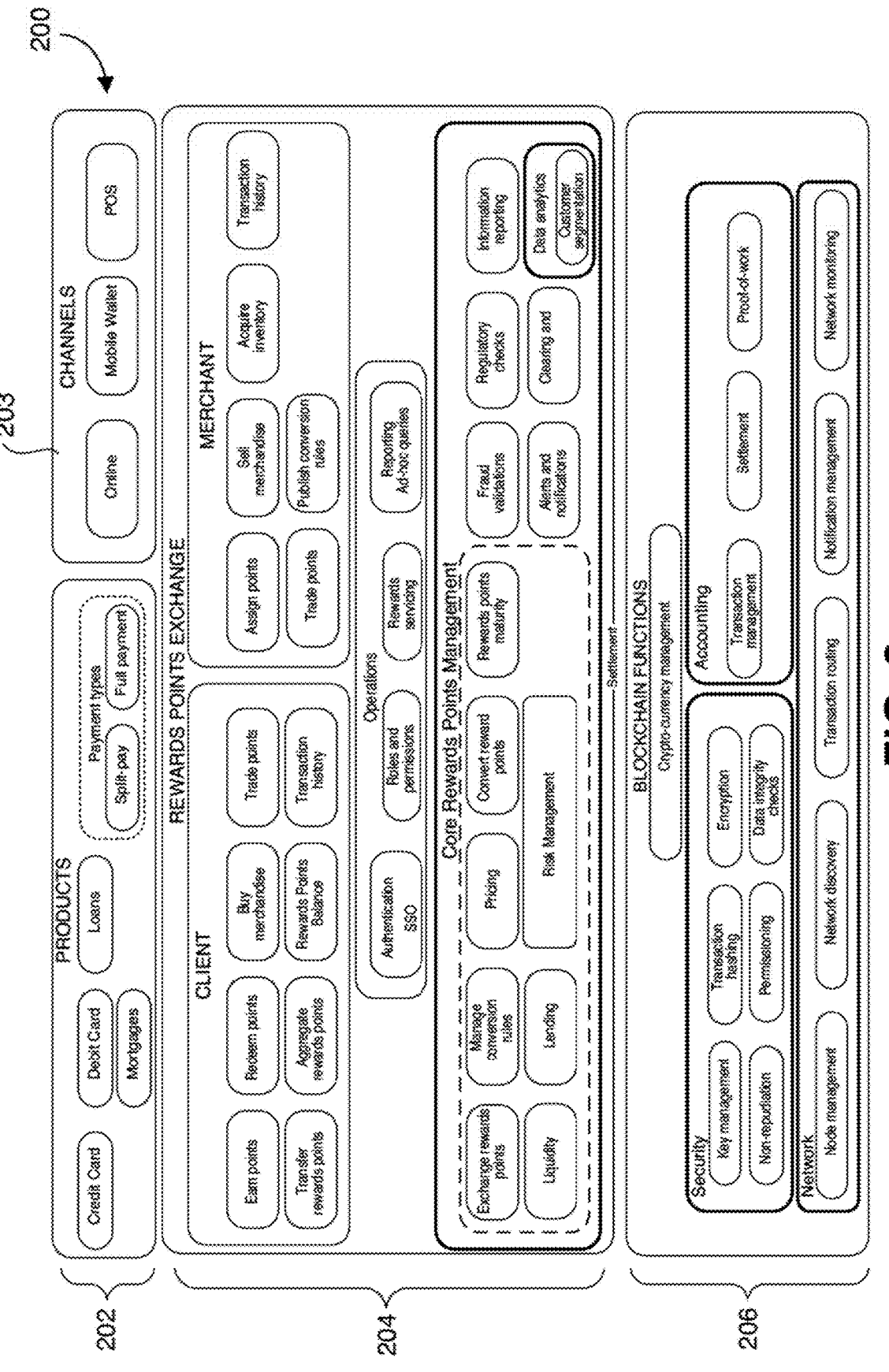
FIG. 2 illustrates a system that is provided as a layer operating in conjunction with the distributed ledger and the nodes to provide functionality associated with the generation, processing, and provisioning of digital rewards.

FIG. 2 illustrates a system 200 that is provided as a layer operating in conjunction with the distributed ledger and the nodes to provide functionality associated with the generation, processing, and provisioning of digital rewards.

The distributed ledger, in some embodiments, utilizes blockchain techniques in relation to how digital records corresponding to additional records (e.g., of transactions) are propagated through the distributed ledgers stored at each node of the distributed network of computing devices. The propagation may be developed to be competitive based on time priority, assuming that proper authorization is obtained in relation to the transaction or other type of modification to the record stored on the distributed ledger.

The distributed ledger may be one or more cryptographically linked chains of sequential entries, each of the cryptographically linked chains relating to one or more virtual tokens, or groups (blocks) of virtual tokens that may have associated data payloads, such as value, quantity, conditions, type of virtual token, etc.

Different types of virtual tokens may be stored on different cryptographically linked chains, but may be adapted such that consensus rules permit for cross-virtual token type transactions by way of a conversion process. Corresponding transactions may be effected on the distributed ledgers to correspondingly create/spend virtual tokens, establishing new chains or ending existing chains in accordance with conversation processes/logical conditions (e.g., conversation rate, pre-conditions, bonuses applied).

The distributed ledgers can be utilized as a query-able event log that provides increased security and traceability of transactions, and in some embodiments, provides enhanced and independent query capabilities where any computing device can connect to any node and perform a query on one or more local distributed ledgers (e.g., to obtain a present balance, to confirm whether a transaction was processed).

As depicted in FIG. 2, there may, at a high level, be various "tiers" of devices. 202 is illustrative of specific tools, accounts, and channels that may be utilized by an institution, and provided for clients. 204 is an illustration of a rewards points exchange layer (e.g., interface layer) that may operate in conjunction with or provide information to the devices of 202. The interface layer 204 may include various aspects and functionality that may be provided to clients and merchants, and various operations may be associated with the interface layer, such as the ability to generate, provision, process, and or to provide reporting relative to the records stored on distributed ledgers maintained by the devices operating in the blockchain functionality layer 206.

In some embodiments, the interface layer 204 is configured to extend operations to various transacting vehicles and products, such as debit card, loans, investment, insurance, mortgage accounts, email money transfer, etc., and offers capabilities for earning and redeeming points via online channel or other channels.

For example, a user may be able to pay with points for any recurring payments, and a dynamic exchange of the points across merchants loyalty programs, and clients may be provided.

The system backend may manage point liquidity and pricing, market risks supporting the exchange, and introduce regulatory checks, and data analytics features that are used to facilitate client engagement, such as customer segmentation, in order to provide offers, recommend additional products etc. The ledger platform can be utilized to provide the necessary data to more complex analytics engine, which may produce and support various analytic models.

The interface layer 204 may provide multiple systems, including a consumer rewards administration system, a merchant rewards administration system, an operational administration system, and a blockchain rewards ledger system, according to some embodiments. For example, the consumer rewards administration system may be configured to provide an ability to inquire regarding point balances, an ability to redeem points, an ability to transfer points to another entity, an ability to request refunds/returns, integration into the merchant portals, to allow consumers to pay with their rewards currency, as in some scenarios, the consumer is already authenticated either through online banking or merchant portal. For example, the merchant rewards administration system may be configured to provide an ability to inquire regarding point balances, an ability to transfer points to another entity, an ability to accept/reject consumer requests, and an ability to merchants to publish and manage their redemption rules. For example, the operational administration system may be configured to provide complex rewards reports by merchants and consumers, to service the consumer and merchant requests, and to support inquiries regarding the exchange rate between merchant points and rewards currency.

The blockchain rewards ledger system may be configured to provide services to allow the consumer to earn or redeem points in real time through the merchant's portals, integration with merchant's shopping carts to allow the consumer to earn or redeem points in real time, while shopping, automatic reconciliation of points across consumer and merchant accounts, integration with key management enterprise solution to allow for public/private keys management, required for blockchain ledger operations, and integration with the Loyalty Hub to interface with internal or external systems for merchant reconciliation or EOD reporting. In some embodiments, reconciliation with merchants may not be required, as the blockchain ledger validates the transactions across participants, ad merchants and credit card acquirer are participants in the rewards ledger and have valid rewards accounts.

The system 200 of FIG. 2 may be utilized, for example, to provide a new rewards digital currency, which can be exchanged across many financial products, such as deposit, chequing or other type of accounts. The value of the new credits may, for example, be supported by merchants' products and/or their reward systems (e.g., third party reward systems). For example, clients of an organization may be able to pay or receive funds using a new digital currency, and clients may also be able to earn and redeem reward points using the rewards digital currency.

The product and channel layer represented by 202 and 203 may provide functionality associated with various accounts through transaction channels. For example, clients may be provided with a new multiple currency account, which holds balances in various currencies types, such as government backed currencies: CAD, USD, EUR etc., and also digital currencies such as a digital rewards currency, bitcoin, XRP, etc. The multiple currency account may be adapted for currency exchange, via traded or tiered rates etc. For example, the system 200 may be utilized to provide functionality to exchange merchant specific reward points, government backed currencies (CAD, USD) and digital currencies in a "digital rewards exchange", using the new digital currency. Merchants can trade their specific rewards points to and from the digital currency.

In some embodiments, the provisioning of such a system 200 may aid in the transformation of rewards assets into a digital currency that is, to some customers, similar to liquid cash, incorporated into clients' everyday spending behaviors. The system may be configured to continuously or periodically monitor accounts associated with customers to provide accumulation monitoring mechanism configured to periodically or continuously mine an external transaction log to identify accumulation of new virtual tokens associated with the user profile. For example, the system may be configured to automatically generate or otherwise provision new points based on transactions that a user enters into. For example, a user had 5 nights at the hotel on an external transaction log (hotel stay log). This log can be automatically processed and used as the basis for new "data payloads" that serve as the basis for blocks being added to the ledger (or taken from a treasury amount associated with the hotel rewards chain.

As a specific implementation characteristic of an embodiment, the accumulation monitoring mechanism may be configured to instruct the control command generator to generate one or more new data payloads corresponding to the accumulated new virtual tokens, each of the new data payloads including an originating account identifier populated as a virtual token treasury, a counterparty account identifier populated with the virtual wallet associated with the user profile, and a variable confirmation requirement field populated with a bypass value in the variable confirmation requirement field such that no confirmations are required prior to the data payload being marked as recorded (provided to increase the speed on which trusted transactions can be loaded onto the distributed ledgers where there is lowered risk of double spending, etc.).

Virtual reward credits generated by the system 200 may have various characteristics, such as credits minted/issued, destroyed, bought, spent, transferred, stored, audited, matured etc., among others. Utilizing a business interface layer 204, entities may perform various functions (and combinations thereof) in relation to create an account, checking a balance, transferring credits to another customer, etc. The blockchain infrastructure 206 may utilize cryptography to generate and/or maintain various records on a distributed data platform, such as proof of works, etc. Such stored records may be utilized for information reporting, etc.

The business interface layer 204 may be adapted for transforming queries obtained in conjunction with products 202 from channels 203, such queries being associated with credits stored in the distributed ledgers managed by 206. Queries can be provided, for example, in the form of commands, controls, instruction sets, etc., and the business interface layer 204 may receive these queries, parse them to develop commands specific to operations involving distributed ledgers (e.g., generate new record for propagation, traverse blockchain/records to identify and/or confirm transactions), etc.

For example, merchants may utilize aspects of the interface layer 204 to, for example, offer reward points and sell goods to clients, publish rewards program rules, convert third party credits to/from credits stored on the blockchain platform, etc. Merchants may issue new rewards by generating new credits, etc. In other embodiments, merchants are assigned or provisioned a "treasury" account that is pre-populated with private keys for blocks available to be rewarded or otherwise provided to users. In this embodiment, when merchants provide points, they are transferred from the treasury by way of updates to the distributed ledgers, and when points are redeemed, they are conversely transferred back into the treasury. The interface layer 204 may be utilized to reconcile points, etc.

Customers may utilize the system 200 by accessing products 202 (e.g., credit cards, mobile wallets) through channels 203 (e.g., point of sale devices, ATMs, terminals), where they may engage in various transactions whereby they earn points, redeem points, generating the virtual currency, as a result of client participation (earn/redeem), etc. Such transactions could lead to instructions, queries and/or requests to be transmitted in relation to the distributed ledgers maintained under 206 through interface layer 204.

The system 200 may be adapted to utilize to use blockchain and the inherent security properties of blockchain such that various entities, such as financial institutions, merchants, or customer mobile devices, are able to each become subscribers or nodes on the distributed network. In some embodiments, some or all of the various computing devices are nodes and/or subscribers.

Some embodiments utilize block chain technologies alongside and/or in conjunction with distributed ledgers. These entities may, for example, include various computing devices that may be in communication with one another such that the computing devices are able to transmit and receive various data transmissions representative of elements of data information.

The system 200 may, for example, be configured to receive various forms of transactions, such as bill payments, purchasing transactions, deposits, etc., and provide interactions with the rewards platform during, in conjunction with, or in relation with the transactions. As a particular example, the use of various financial products in relation to transactions may yield points, etc.

The system 200 may apply various logical rules (e.g., soft coded or hard coded, relative or absolute), conditions, and/or triggers that determine when an event has taken place, and may award and/or otherwise provision points based on various conversion rules (e.g., from dollars to points). In some embodiments, dynamic conversion rates may be dictated by various characteristics and considerations, such as through a measured and/or monitored performance of the entity whose points are being used, as points would be treated may be applied and/or used similar to currency. Conversion rates may be auto-negotiated according to particular rules, such as different conversion rates for seasonal events, such as around Christmas.

The points used by some embodiments may, for example, be an organization's (e.g., a financial institution) existing loyalty points or may be a separate type of rewards currency. In accordance with some embodiments, various entities, such as financial institutions, reward credit institutions, merchants, etc. may be able to utilize the system 200 such that their own loyalty points to the system 200 may be converted to the system 200's rewards currency.

In some embodiments, the system 200 may provide permissioning functionality at a node level, for example, across the nodes, such that each organization would not be able to monitor, view, access, and/or modify the transactions of another. For example, each node may be assigned its own set of access rights, and these access rights may be applied in determining what functions a node can perform.

A query language may be utilized for interactions with the backend ledgers. For example, such interactions may include viewing transaction history, redeeming points, and/or other actions.

In some platforms, redeeming points has only been possible through online banking. In accordance with some embodiments, the system 200 may be adapted such that the system 200 may be able to scalably and conveniently adding new third parties, such that the third parties would be able to more readily to accept and redeem points. The system 200, as provided in some embodiments provides additional layer(s) of functionality that interface with a block chain enabled distributed ledger.

A potential benefit may be an increased ease of adding new merchants, taking into account a blockchain's distributed nature, its ability to scale well (e.g., by virtue of being a distributed, decentralized platform), and its inherent security (e.g., via cryptographic techniques). While reconciliation for point/reward earning and redemption synchronized batches may be conducted on a periodic (e.g., monthly) basis, some embodiments allow for real-time or near real-time reconciliation. In some embodiments, the system 200 is configured to provide settlement with point (e.g., virtual reward) redemption in real-time for a payment transaction through a payment channel.

In accordance with some embodiments, the use of the system 200 permits conflict prevention natively through transaction propagation and automatic validation in a network. For example, this may be achieved by providing rules that reject inconsistent transactions, such as delete a row that has already been deleted by a previous transaction. An in-built approach is provided for transaction verification and guaranteed integrity through the consensus process between entities. In the blockchain infrastructure 206, for example, the hash of each block of transactions may be linked to the next, by forming a chain, where transactions contained in these blocks cannot be altered. Utilizing a peer-to-peer approach, each node may have a copy of all the data (or as close to it as possible), and updates are shared across nodes. A suitable consensus mechanism may be implemented, for example, by utilizing a longest chain rule or selecting a trusted validator.

Figure 3:
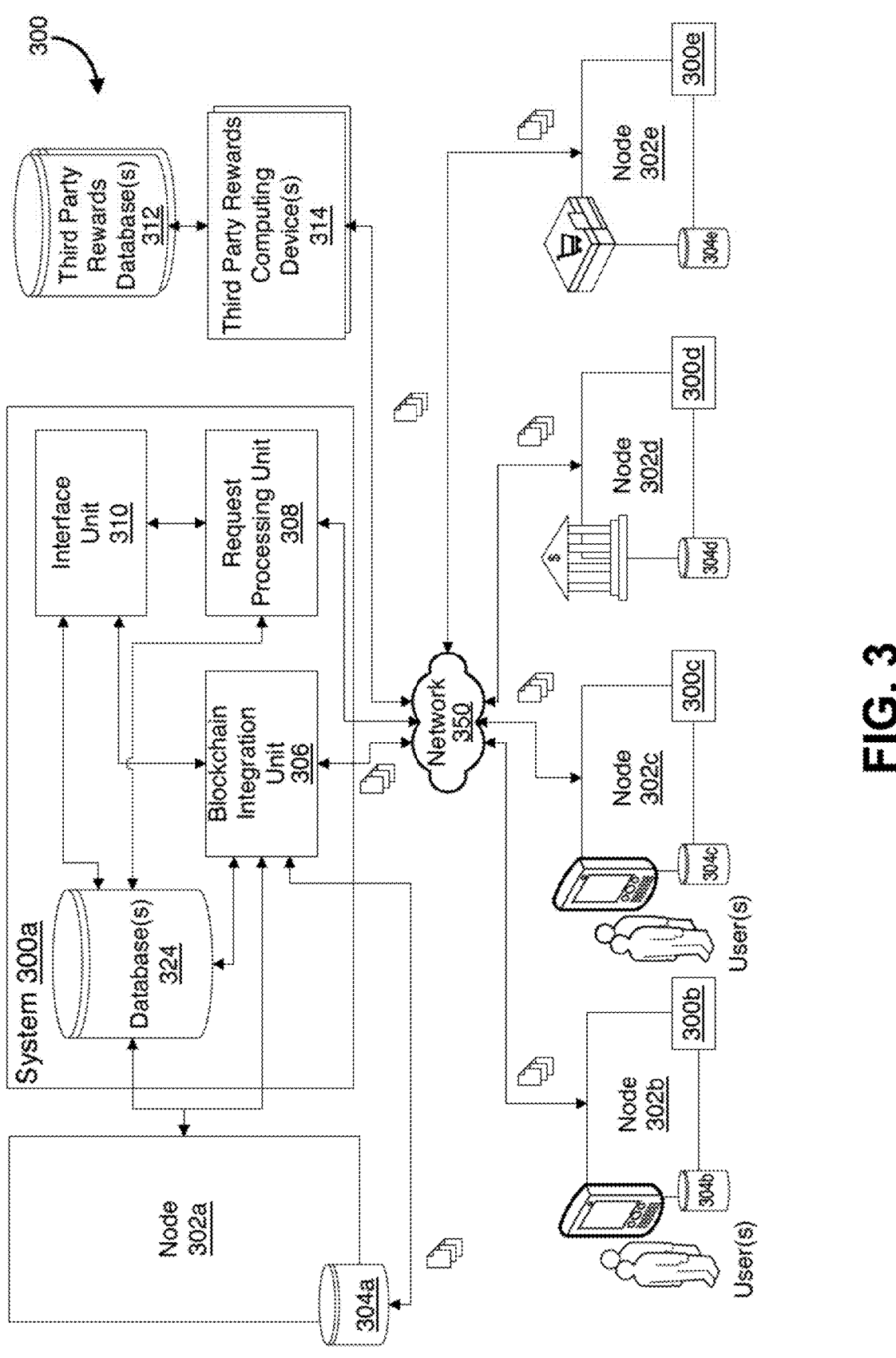
FIG. 3 is a block schematic diagram of a system for digital reward processing, according to some embodiments.

FIG. 3 is a block schematic diagram of a system for digital reward processing, according to some embodiments. The system is configured for electronically managing virtual tokens corresponding to loyalty rewards stored on a series of decentralized devices.

The system is configured to include a plurality of node computing devices, each node computing device of the plurality of node computing devices having a communication link established with at least one other node computing device of the plurality of node computing devices.

Blocks are provided as examples to illustrate components of the interface layer 300 (shown as 300a-300e) that may be implemented in a software, hardware, embedded firmware, and combinations thereof. Blocks are exemplary and may be different, alternate, and there may be more or less blocks. Various blocks may be combined together. Blocks may be representative of units, modules, electronic circuitry, computerized components, etc. Interface layer 300 may be provided through computing devices, including processors, non-transitory computer-readable media, storage media, among others. Interface layers 300a-300e are depicted in FIG. 3 to reside in conjunction with nodes 302a-302e, each of the nodes having a distributed ledger 304a-304e electronically stored thereon. The nodes 302a-302e may represent various computing devices and/or systems.

Activities are coordinated across a plurality of distributed ledgers, each distributed ledger of the plurality of distributed ledgers managed by a corresponding node computing device of the plurality of node computing devices.

The distributed ledgers 304a-304e may be managed by a corresponding node 302a-302e, the distributed ledgers 304a-304e together tracking generation, provisioning and processing of various virtual tokens through sequential entries that are cryptographically linked together and propagated through the plurality of distributed ledgers 304a-304e by way of application of a set of electronic consensus instructions.

Interface layer 300 may, in some embodiments, be configured to provide an interface layer that may interact with various transactional devices. In some embodiments, Interface layer 300 may be directly coupled to transactional devices. In some embodiments, Interface layer 300 may be indirectly coupled to transactional devices (e.g., through a communication link or a network 350. As depicted, node 302d is associated with a financial institution, and transactions may, for example, flow through computing systems and/or devices of the financial institution. As depicted, node 302e is a merchant's computing system, and, for example, may include various payment terminals, transactions processors, etc. 302b and 302c are nodes that may be connected to various computing devices of users (e.g., desktop computers, tablet computers, mobile devices).

Interface layer 300 may include, for example, a blockchain integration unit 306, a request processing unit 308, and an interface unit 310. The various nodes 302a-302e and computing devices may interface through network 350. Data may be stored on various types of storage technologies at data storage 324, such as physical storage devices (e.g., hard drives, solid state drives, flash memory, random access memory, read only memory), shared network resources that may be provided on an on-demand basis, etc. Data may be stored in the form of database records, flat files, relational records, non-relational records, text files, spreadsheets, extended markup language files, etc.

The interface layer 300 is provided at some or all of the nodes of the node computing devices, the interface layer adapted 300 for receiving electronic instructions at payment transaction devices operatively linked to the corresponding node computing device. The electronic instructions include at least data transmissions representative of an electronic transaction, and the interface layer 300 is configured to extract, from the electronic instructions, one or more control commands indicative of requests to generate, provision or process virtual tokens (e.g., virtual currencies) stored in a digital wallet linked to a user profile (e.g., a set of database records which may, for example, be related to corresponding digital locations and/or keys).

The one or more control commands are adapted to interface with the plurality of distributed ledgers by recording electronic transactions to the distributed ledger corresponding to the node computing device that the interface layer is operating on, the electronic transactions representative of data records corresponding to the one or more control commands and adapted for propagation through the plurality of distributed ledgers through the communication links established between the individual node computing devices of the plurality of node computing devices, the propagation updating each of the plurality distributed ledgers by generating new sequential entries cryptographically linked to existing sequential entries.

In some embodiments, the digital wallet is linked to the entries on the distributed ledgers by way of electronic private keys.

For example, in a public/private key implementation, the private keys are stored within the digital wallet, the electronic private keys being used as a mechanism by which transactions can be authorized to be effected on the distributed ledgers. In this example, the private key is used to submit an authorized transaction where a particular recorded virtual credit is then sent to a "location" (e.g., encrypted using a public key of a recipient device). In this example, the recipient's private key can be used to authorize a further transaction, enabling the transfer of credits having authorization being determined by having the correct corresponding private key for each recipient. The digital wallets may include a set of public and private keys that correspond with one another.

Data payloads of the sequential entries can be generated or encapsulated based on provided information, such as (i) a transaction amount, (ii) a transaction type, (iii) an originating account identifier, (iv) a counterparty account identifier, and (v) a merchant identifier, and one or more data payloads may be grouped together to be aggregated in one or more blocks that are stored within the sequential entries on the plurality of distributed ledgers.

For example, the system may be configured to provide entire groups of transactions as sequential entries to reduce processing load on the underlying computing devices that provide the distributed infrastructure. In some embodiments, the grouping of transactions as sequential entries may be determined on a dynamic basis depending on the current load of the infrastructure. The current load may be measured indirectly, for example, by tracking a propagation speed/confirmation speed of a test transaction. Accordingly, a balance between transaction speed and overall system speed may be achieved and/or tweaked over time, for example, based on periods of increased supply/demand/transaction load. The dynamic modification of the grouping of transactions is particularly useful, for example, during times of increased times of travel (e.g., Chinese new year), redemption of points, or during promotional periods.

Network 350 may include various types of communication links, such as cellular communication links, wireless communication links, wired communication links, satellite communication links, etc. Network communications may be unidirectional, bidirectional, synchronous, and/or asynchronous. In some embodiments, where a node has been determined to be off the network 350 for a prolonged period of time (e.g., greater than a defined threshold), the node may be taken offline as the ledger may no longer be up to date. In other embodiments, the ledger of the node may simply be discarded and copied from a neighboring node and verified for accuracy against other neighboring nodes. Tracking outdated ledgers may assist in ensuring the uniformity of the distributed ledgers and to avoid issues related to transactions being potentially performed on out of date or stale ledgers.

The blockchain integration unit 306 may be configured for interfacing with the distributed ledger 304 associated with a particular node 302, and may also be used for propagating new records to be added to a blockchain maintained by the distributed ledgers 304 of each node 302. The request processing unit 308 may be configured to extract various instruction sets and commands, and, in conjunction with the blockchain integration unit 306, convert and/or otherwise transform the instruction sets and commands into control commands that are readily interpretable in the form of actions and/or functions that may operate on the blockchain (e.g., add a record, traverse existing records, extract information from existing records, conduct a confirmation).

In some embodiments, blockchain integration unit 306 may be provided with an event queue where new transactions are queued up for encapsulation (e.g., generation of data payloads, encryption/creation of hash linkages). The event queue may be provided alongside a collision controller to minimize potentially double spending, or a state controller that actively tracks and manages states of transaction blocks on the distributed ledgers.

Changes to the distributed ledgers 304 may be subject to various types of conditions, logics, consensus rules, etc., that serve to maintain a level of robustness and immutability to the records stored on distributed ledgers 304. Where there are a sufficiently large number of trusted nodes in a given network of nodes, the consensus requiring rules for changes may serve to reduce the susceptibility of information stored on the distributed ledgers 304 to unauthorized changes. The information stored on the distributed ledgers 304 may be encrypted and/or otherwise cryptographically obscured or obfuscated such that the information is only accessible by persons or systems having correct authentication credentials. For example, the information may be stored such that a particular third party rewards computing device is only able to view, modify, and/or access records associated with the third party rewards program (and not other rewards programs). Similarly, there may be access permissions set in relation to information stored in relation to particular users and/or accounts.

A interface unit 310 may be configured to provide various portals and/or access tools (e.g., through a display, a user interface, a web interface, an application programming interface) so that the interface layer 300 may be utilized as an interface point to obtain access into various functionality associated with the distributed ledgers 304. In some embodiments, the interface unit 310 provides various portals and/or other interface elements, such as an administrative portal and a merchant portal.

The merchant portal may be configured to allow entities to manage their points, see transaction history etc. The administrative portal may be adapted for various operations, such as reporting, servicing and role management. Merchant and/or customer onboarding may be conducted through the portals, and may be used for interacting and interfacing with other computing systems, such as other transaction vehicles, banking products, insurance products, etc. Merchants may be associated with particular tags (or other identifiers) that are embedded into at least one of data payloads, encryption/linkage determination mechanisms, etc. so that merchants are further able to segment and analyze the market by conducting an automated traversal of one or more copies of the distributed ledger.

Where a merchant requires further authentication or comfort regarding the "current state" of a particular profile, the merchant portal may be configured to reach out to a predetermined number of different nodes and to conduct parallel or concurrent queries to traverse their distributed ledgers to validate that the existence of transactions or specific connections between user profiles and credits that exist on the distributed ledger. In some embodiments, an adapted Merkle tree is adapted to provide for improved efficiency for traversal by cross-validation of blocks by conducting hashing operations on predecessor blocks.

In operation, the interface layer 300 may be adapted for interactions with various virtual tokens, such as virtual tokens corresponding to credits or various point systems, which may be redeemed for rewards, products, services, etc. The interface layer 300 may be configured to extract, from various electronic instructions control commands indicative of requests to generate, provision or process virtual tokens stored in a digital wallet linked to a user profile.

The control commands may be adapted to interfacing with the distributed ledgers 304a-304e by recording electronic transactions to the distributed ledger 304 corresponding to the node 302 that the interface layer 300 is operating on, the electronic transactions representative of data records corresponding to the one or more control commands and adapted for propagation through the distributed ledgers 304a-304e through the communication links established between the individual nodes 302a-302e. Over a period of time, the distributed ledgers 304a-304e are updated through propagation of records such that the distributed ledgers 304a-304e reflect a record of transactions and events that have occurred. The various records may be linked to one another such nodes 302 are able to conduct various queries against the distributed ledgers 304a-304e to ascertain various aspects of information, such as balances on accounts, when a last transaction was made, etc.

The control command generator, in some embodiments, is configured to encrypt at least a portion of each of the one or more data payloads using at least a public key corresponding to the merchant identifier. A corresponding private key to the public key is made available to a corresponding merchant, the corresponding private key usable by the corresponding merchant to decrypt the one or more data payloads, and the one or more blocks aggregate only data payloads that share a common merchant identifier. Accordingly, the aggregation of blocks may allow for the segregation of data payloads based on merchant identifier (e.g., so that when blocks are decrypted for analysis, one merchant cannot easily view the information associated with another merchant).

The cryptographic linkages between the one or more blocks can be generated using at least the public key corresponding to the merchant identifier. Accordingly, the corresponding private key to the public key can be used by the merchant in conducting traversals or queries of the distributed ledger.

The network 350 may also include various third party rewards computing devices 314 and corresponding third party rewards databases 312, which may be configured to interoperate in various activities with distributed ledgers 304a-304e. While not depicted in FIG. 3, in some embodiments, third party computing devices 314 may also be nodes and may also have a corresponding interface layer 300 and copy of distributed ledger 304. For third party rewards computing devices 314, interactions may include points/rewards conversions, balance transfers. In some embodiments, third party rewards computing devices 314 may also be configured such that third party rewards balances, points, etc. may also be tracked and managed through distributed ledgers 304a-304e.

The distributed ledgers 304a-304e may be used such that various merchants and/or other parties may have a finite number of rewards points (e.g., tokens) in an account (or online wallet). Rewards account corresponding to various clients may be accessed and/or managed, and in some cases, already authenticated through various portals and/or authentication tokens. Reward accounts may be held not only by customers, but also merchants and/or other institutions. For example, when a customer makes a transaction and the merchant wishes to provide reward points to the customer, the merchant may record a transaction wherein the merchant's balance is debited and the customer's balance is credited.

When interactions are conducted in relation to the various nodes, such as merchant transactions, etc., the distributed ledgers 304a-304e may be accessed to conduct various operations, such as redeeming points recorded on the distributed ledgers 304a-304e for a particular account (e.g., debiting a merchant's account to credit a customer's account, or vice versa, or transfers between different customers to each other). In some embodiments, the distributed ledgers 304a-304e are used to determine whether participants have valid rewards accounts.

The distributed ledgers 304a-304e, based on blockchain characteristics and configurations (e.g., consensus and/or update logical rules) may be used to validate the transactions across participants (e.g., through the participants using their access credentials stored on various wallets or profiles). Confirmation messages and records may be propagated across the distributed ledgers 304a-304e through various updating and communication processes, and the distributed ledgers 304a-304e may be queried for validation that the confirmation messages and/or updated records have propagated across the network 350. In some embodiments, the number of verifications and/or confirmations may be used as a proxy for determining the trustworthiness and/or confidence that a transaction did indeed occur (e.g., with every confirmation, the confidence level should increase).

Activities that may be undertaken by merchants and/or customers may include, for example, redeeming points, transferring points, requesting refunds/returns, and may also integrates into various the merchant portals and/or other portals such that consumers are able to "pay" or otherwise redeem rewards currency (e.g., at a point-of-sale device, a transaction, etc. In some embodiments, customer accounts may be associated with automatic rules, etc. (e.g., always redeem where possible, never redeem).

Based on various rules and/or determinations, in some embodiments, the rewards points on distributed ledgers 304a-304e may be traded at various conversion rates with other point systems (e.g., third party systems) or real-world currencies. Redemption rules may be associated with such conversion rates, and these rates may be manually adjusted (e.g., 20× redemption event) or may also dynamically float (e.g., based on supply and demand of points). In some embodiments points may be redeemed and/or earned simultaneously in the same transaction, or within a series of transactions.

Cryptographic techniques may include various key management, key generation and/or key maintenance operations such that public/private keys are generated, managed, etc., which may be utilized for determining blockchain ledger operations. Keys may be issued, for example, based on an entity's profile.

A potential advantage with utilizing distributed ledgers 304a-304e is that a single central system need not be queried to obtain reporting or conduct queries as copies of the ledgers can be accessed to obtain information that may be probabilistically reliable.

In some embodiments, the distributed ledgers 304a-304e are periodically queried to conduct validation checks, fraud checks etc.

The data payloads in the blocks stored on the distributed ledgers 304a-304e may as a further security improvement, include a variable confirmation requirement field that is determined based on a transaction value of the data payloads, wherein data payloads having greater transaction values have proportionally increased variable confirmation requirements. For example, the confirmation requirement may be increased for transactions where a larger amount of credit is the subject of a transaction (e.g., redeeming for a round-the-world trip), relative to transactions where a lower amount of credit is the subject of the transaction (e.g., redeeming to get a $10 gas card).

The variable confirmation requirements identify a minimum number of the plurality of distributed ledgers upon which a block corresponding to the data payload must be confirmed prior to the data payload being marked as recorded, the minimum number determined to reduce a probability of an unresolved race condition (e.g., to avoid double spending or malicious or unauthorized usage).

Figure 4:
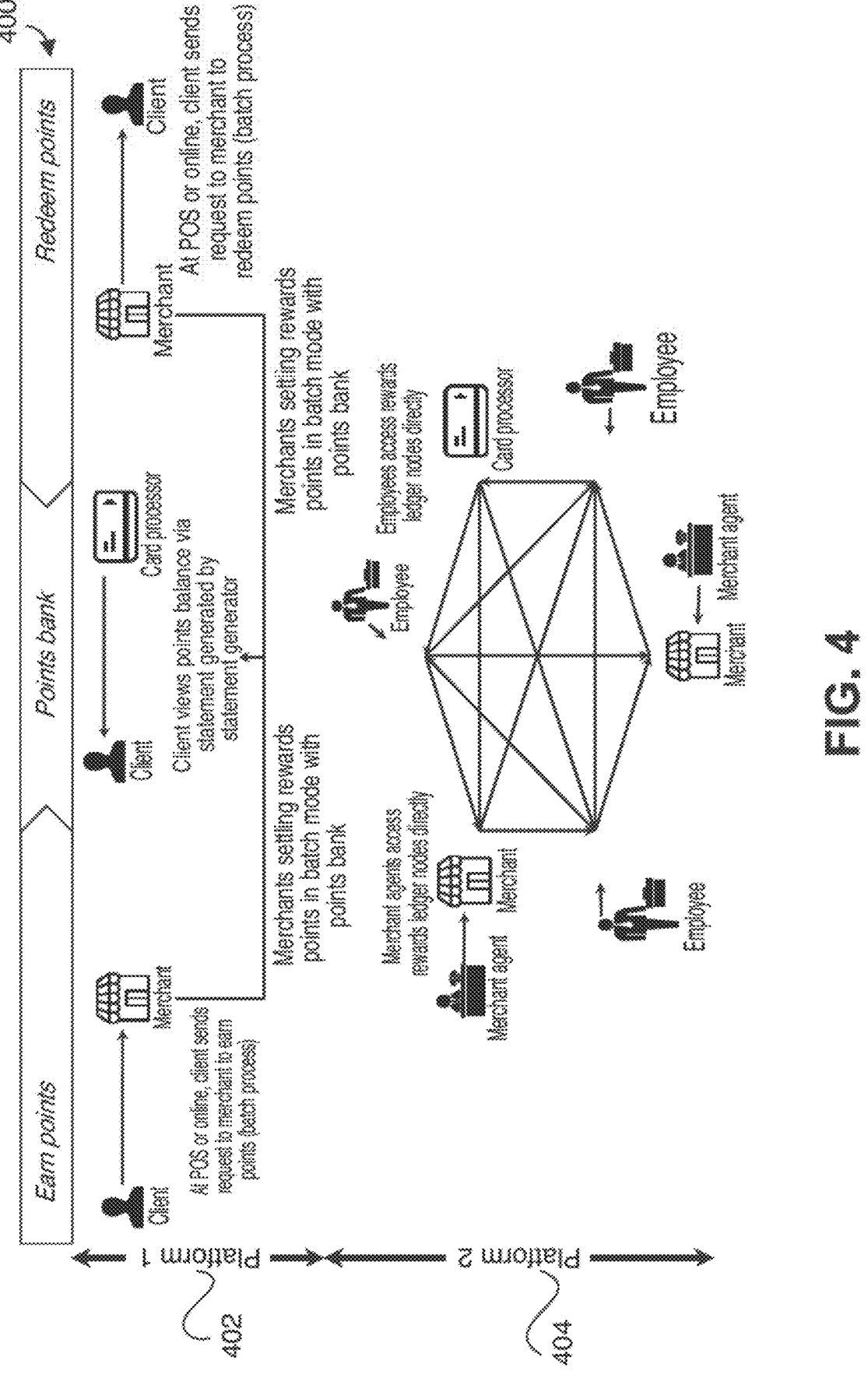
FIG. 4 is an example diagram illustrative of some interactions that may be provided in two example platforms.

FIG. 4 is an example diagram 400 illustrative of some interactions that may be provided in two example platforms. Platform 1, referenced as 402, is provided in relation to a hub and spoke model. Platform 2, referenced as 404, is provided in relation to a decentralized model.

Figure 5:
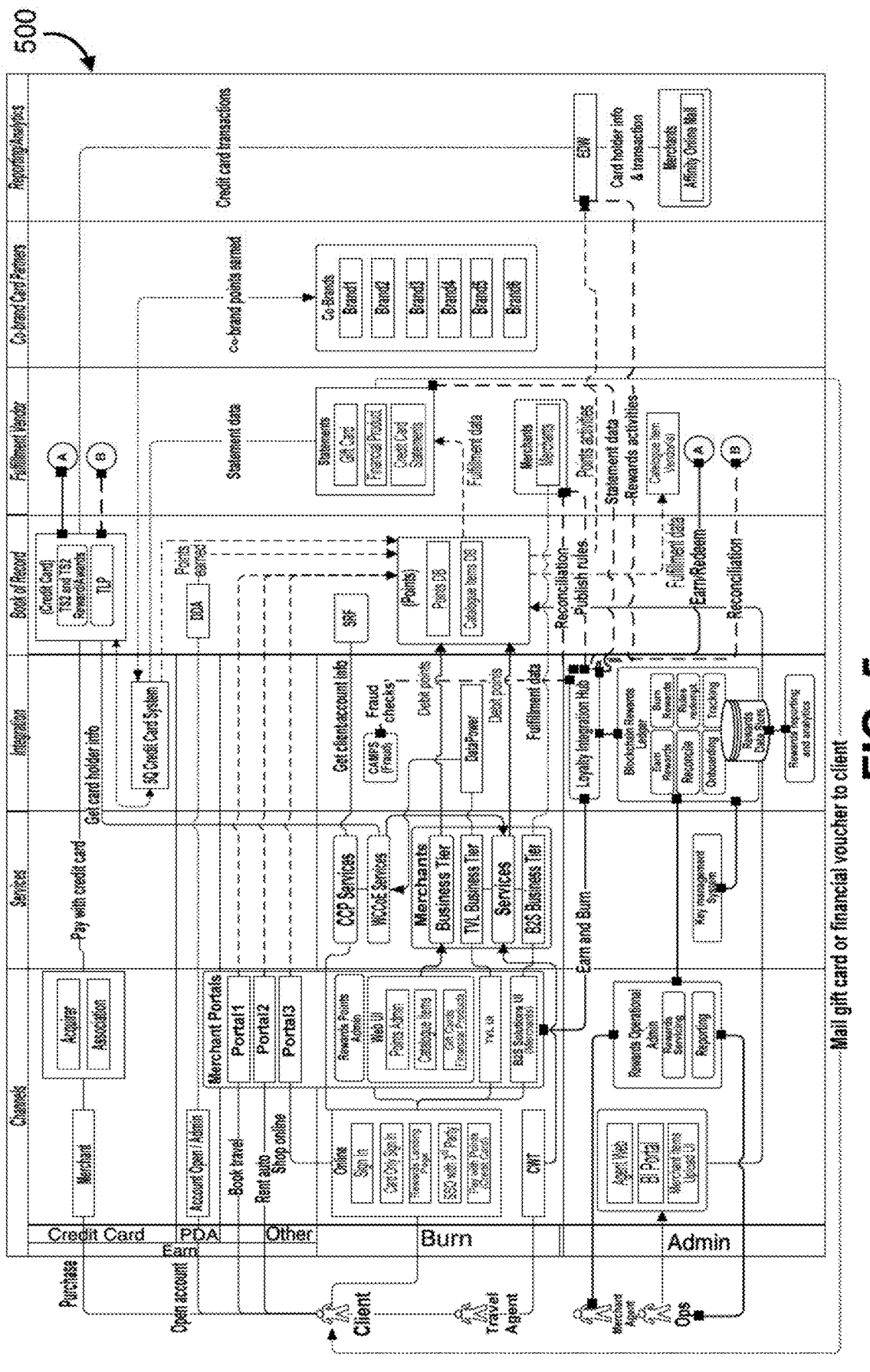
FIG. 5 is an example schematic diagram illustrative of data flows that may occur between various components of a system for providing a decentralized rewards system, according to some embodiments.

FIG. 5 is an example schematic diagram 500 illustrative of data flows that may occur between various components of a system for providing a decentralized rewards system, according to some embodiments. In the example of FIG. 5, clients may log into various portals, and through interactions with merchants, such as travel agents, interact with a rewards account through earning and using various rewards accrued through various transactions. As depicted, a blockchain rewards ledger may be utilized to track and/or manage rewards, and such ledger may be distributed and decentralized across various nodes.

FIGS. 6-10 are illustrative of various user flows indicative of interactions that may occur in relation to the distributed ledgers.

Figure 6:
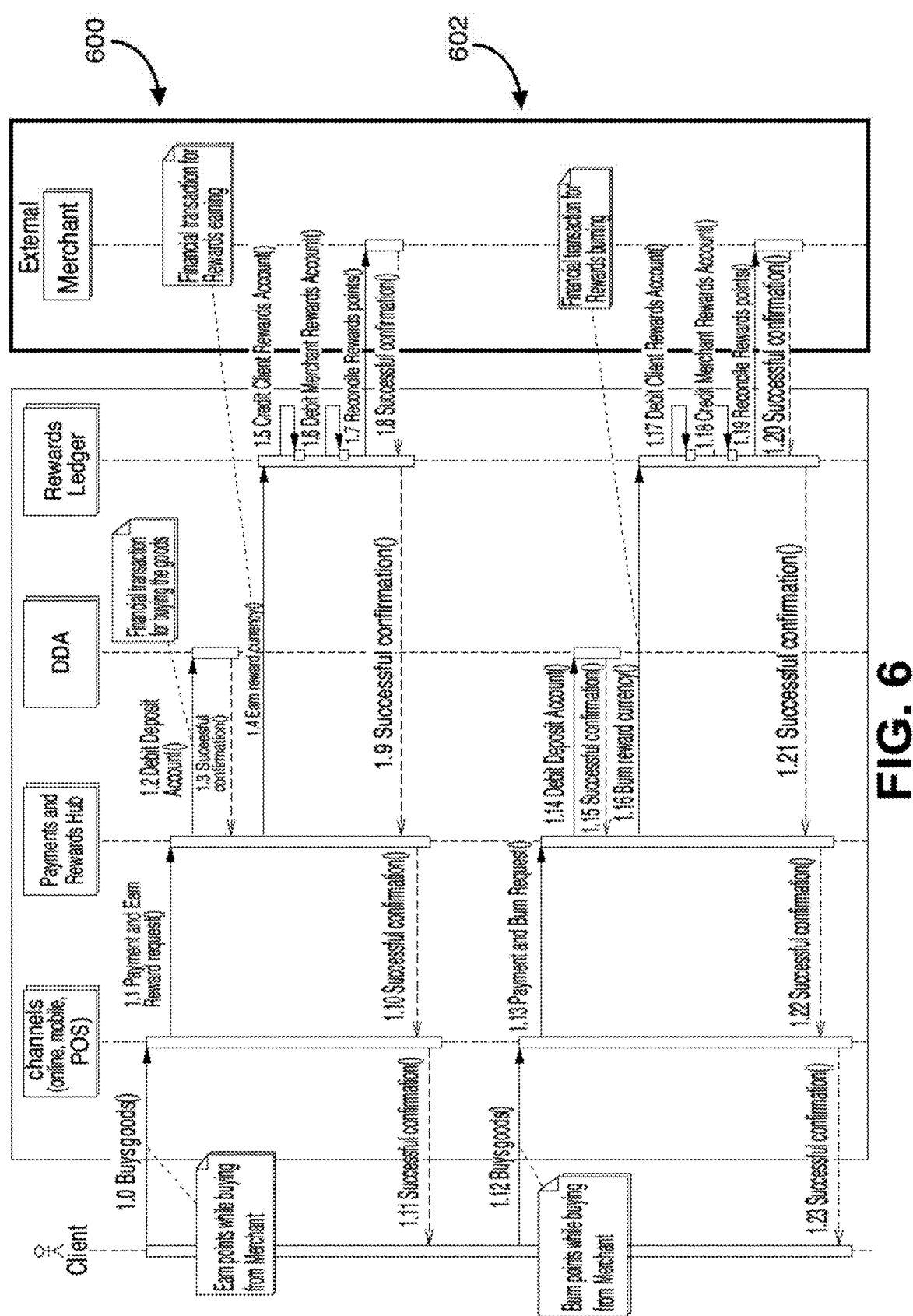
FIGS. 6-10 are illustrative of various user flows indicative of interactions that may occur in relation to the distributed ledgers.

FIG. 6 is illustrative of two use cases 600 and 602 wherein a user earns points while purchasing an item from a merchant (steps 1.0-1.11). Commands are generated throughout the transaction, and the steps 1.0-1.1 may be conducted in relation to payment terminal. At 1.1, the transaction triggers both a payment (debit at 1.2 of the customer's account of the dollar value), and a provisioning of reward currency under 1.4-1.9, where credits are transferred from a merchant's reward account to the customer's reward account. A similar use case 602 is illustrated at 1.12-1.23, but in this use case, the user applies reward credits to reduce the price to be paid using reward points.

As a specific example, a user may spend $100 at a merchant. Based on the use case of FIG. 6, the payment may trigger a reward to be earned (e.g., set at a predefined rate of 1 point per $100 spent). The merchant may be set up such that the merchant's payment terminals and/or the merchant is a node maintaining a distributed ledger. The merchant's payment terminal may receive payment from the user's preferred payment method (e.g., debit card, credit card), and the merchant's payment terminal may then access the interface layer to interact with the distributed ledger, the merchant's payment terminal sending an instruction to the interface layer to credit the user's account with 1 point. The interface layer interprets this instruction, and matches the transaction data to trigger a reward by initiating a blockchain function call (encoding and/or encapsulating the instructions such that a corresponding blockchain record can be created). This blockchain record can be provided to the distributed ledger, and propagated across the various nodes through communication links until the blockchain record exists on all (or almost all) of the distributed ledgers held at various nodes.

Figure 7:
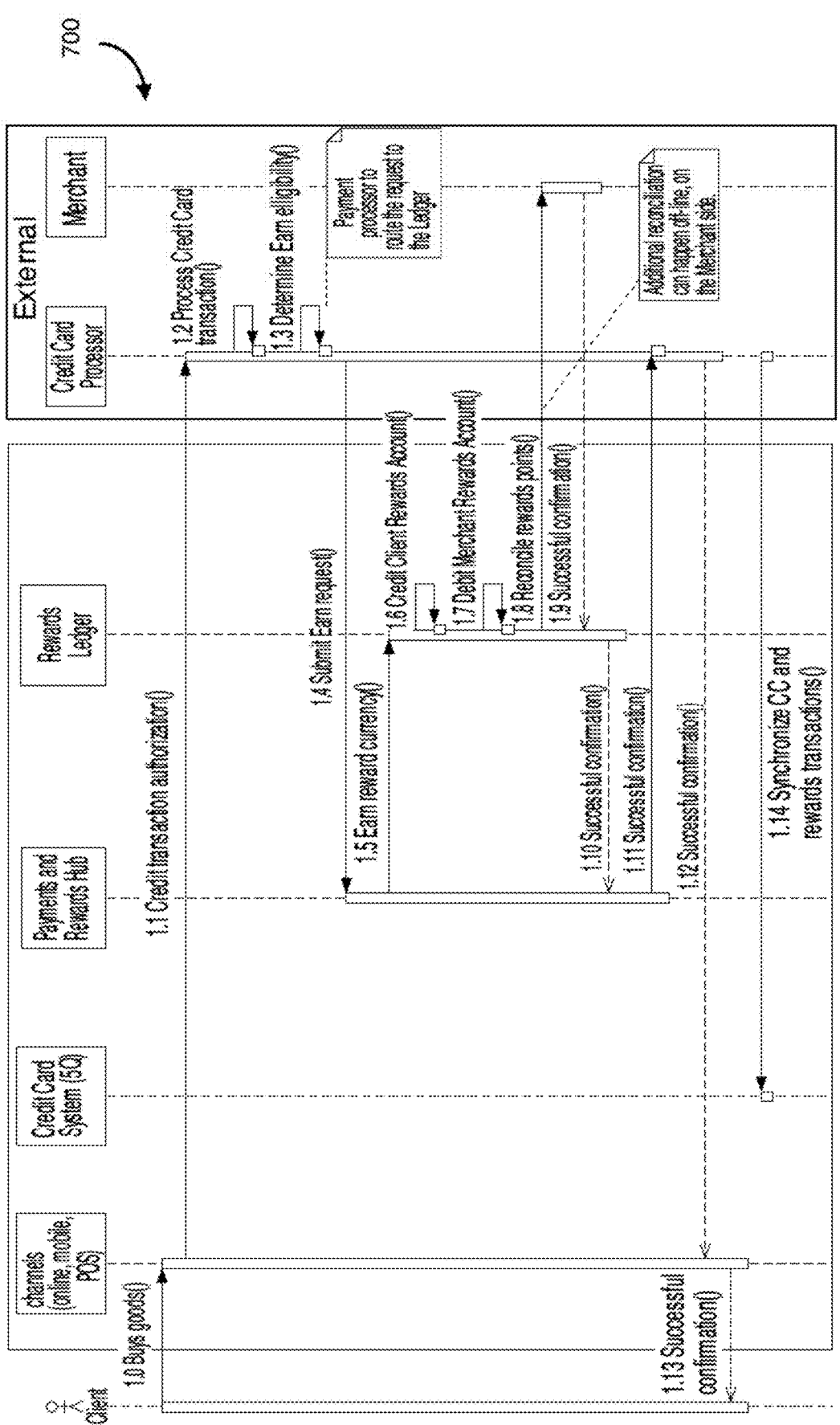

FIG. 7 is a diagram 700 illustrative of a use case wherein a credit card account is utilized to provision payments, and rewards are accrued in relation to the credit card. As depicted, a credit card system may be utilized and linked to a user's rewards profile, such that any points accrued may be stored (and accessed) in relation to the user's credit card information and/or portals.

At steps 1.1-1.3, a transaction occurs and the interface unit 310 is configured to receive the electronic instructions from the payment terminals (e.g., credit card processors, merchant devices) and extract a set of control commands to generate/provision virtual tokens. In some scenarios, the payment terminals may also permit the user to utilize (e.g., redeem) credits in view of a transaction, and in this scenario, the virtual tokens corresponding to the credits would be processed in a transaction.

At 1.4-1.7, the earn request is processed to update the distributed ledgers by invoking functions that nominally credit and debit digital wallets, and process the transactions by way of generating corresponding data payloads that are submitted for addition into the distributed ledgers by way of block entries. Processing requests are submitted to a transaction queue, and upon processing of the request, new sequential entries are generated based on encapsulated data payloads.

At this stage, the data payloads may be encapsulated with merchant identifier specific public keys to support later traversal by the merchant identifier. In some embodiments different parts of the data payloads are encrypted and/or otherwise obfuscated differently such that different parties are able to access various information that will be available, albeit in encrypted form, on the distributed ledgers. For example, a marketing entity may be provided with a specific key that provides the marketing entity the ability to traverse the distributed ledgers to obtain only a subset of information (e.g., transaction amount, underlying product, credit behavior) that is stored on a data payload on a particular block or blocks associated with one or more transactions.

In this embodiment, the marketing entity would be able to later generate queries that are able to access the subset of information but not other information (e.g., identifying information). Different keys permit for differentiated access provisioning by the system in relation to providing granular access control to different entities.

Confirmations are utilized at steps 1.8-1.12 to determine whether the transaction is properly recorded on the distributed ledgers. To avoid double spending and race conditions, confirmations may be tracked such that a predefined or dynamically determined number of confirmations is required prior to an entity being comfortable that a transaction is recorded. This is an issue that arises in the context of decentralized control of the distributed ledgers, and confirmations may be obtained over a period of time whereby modifications to the underlying blockchain are able to propagate between nodes. For example, in some scenarios, 5 confirmations is required. In other confirmations, 3 confirmations may be required to enhance transaction processing speed, the reduced number of confirmations increasing a risk of double spending (which may be acceptable in some situations). This value may change based, for example, on a trust level associated with nodes and their associated computing power relative to the aggregate computing power available to all nodes.

In some embodiments, the period of time and the number of confirmations is determined based on factors including value of transaction, a confidence score associated with a particular merchant or user profile/wallet, the number of nodes, the distribution of control related to the nodes, among others. Based on confirmed transactions, financial reward accounts, profiles, etc. are updated to reflect a new level of tokens (e.g., amount of virtual currency). Each additional confirmation decreases the risk of a double spending attach, and nodes for confirmation, in some embodiments, are selected to avoid undesired clustering. For example, nodes for querying confirmations may be selected randomly, or geographically/virtually separated to avoid correlation and "neighborhoods" of nodes.

Figure 8:
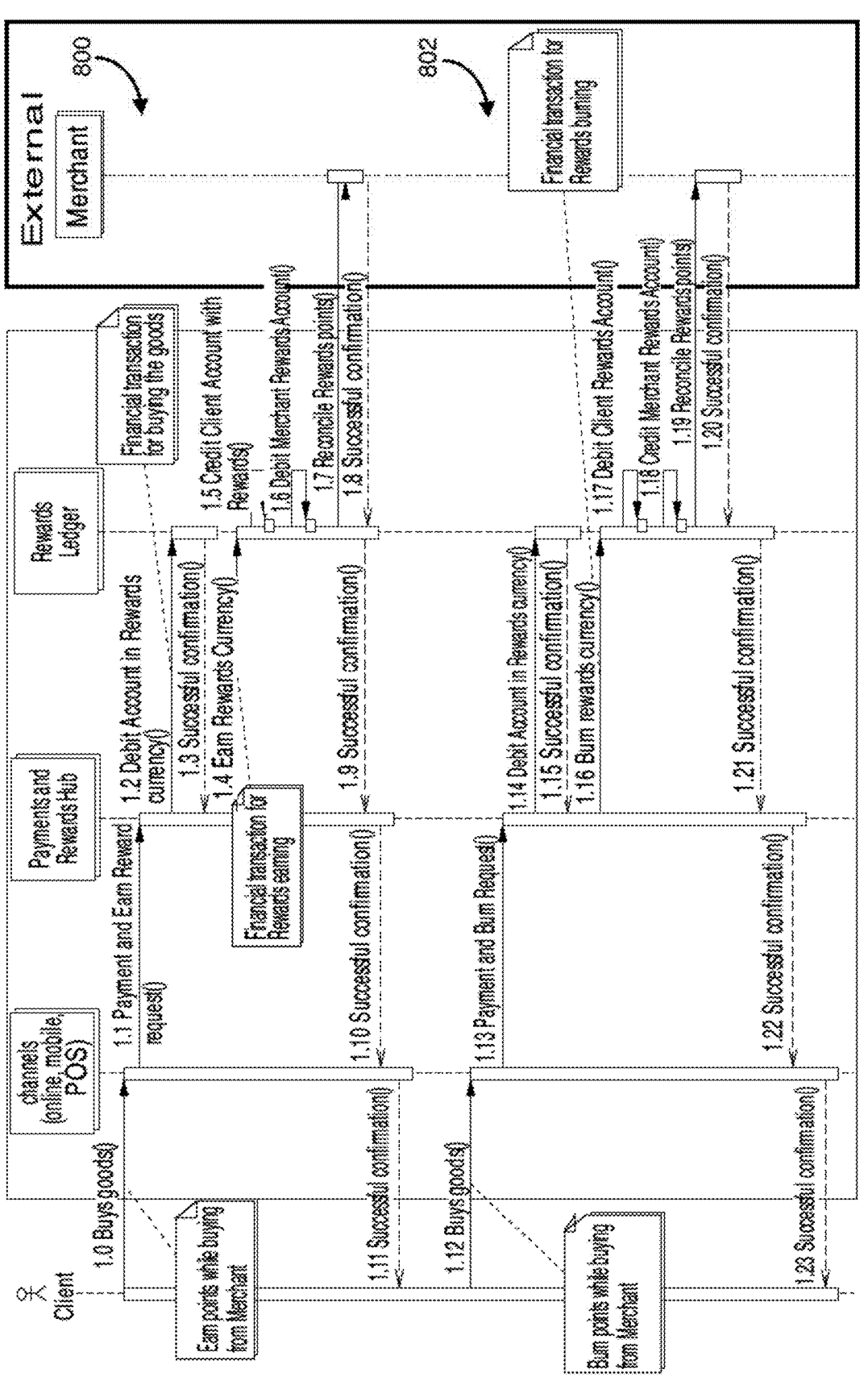

FIG. 8 is a diagram illustrative of two use cases 800 and 802 for payments and rewards, in single currency. In 800, a client undertakes a transaction whereby the client earns points while buying goods or services from a merchant.

In 802, the client undertakes a transaction whereby the client redeems points while buying goods or services from a merchant.

As illustrated in both 800 and 802, the transactions involve generating invocations of functions that cause modifications to the underlying distributed ledgers. Where there are credit or debit activities, these activities are encapsulated in the form of data payloads which are configured to add new blocks to the blockchains on each of the distributed ledgers. Blocks including one or more transactions are propagated across the distributed ledgers such that even while decentralized, the distributed ledgers retain a level of currency and consistency.

In some embodiments, the merchant itself may operate one or more nodes that is connected via network to other nodes.

Figure 9:
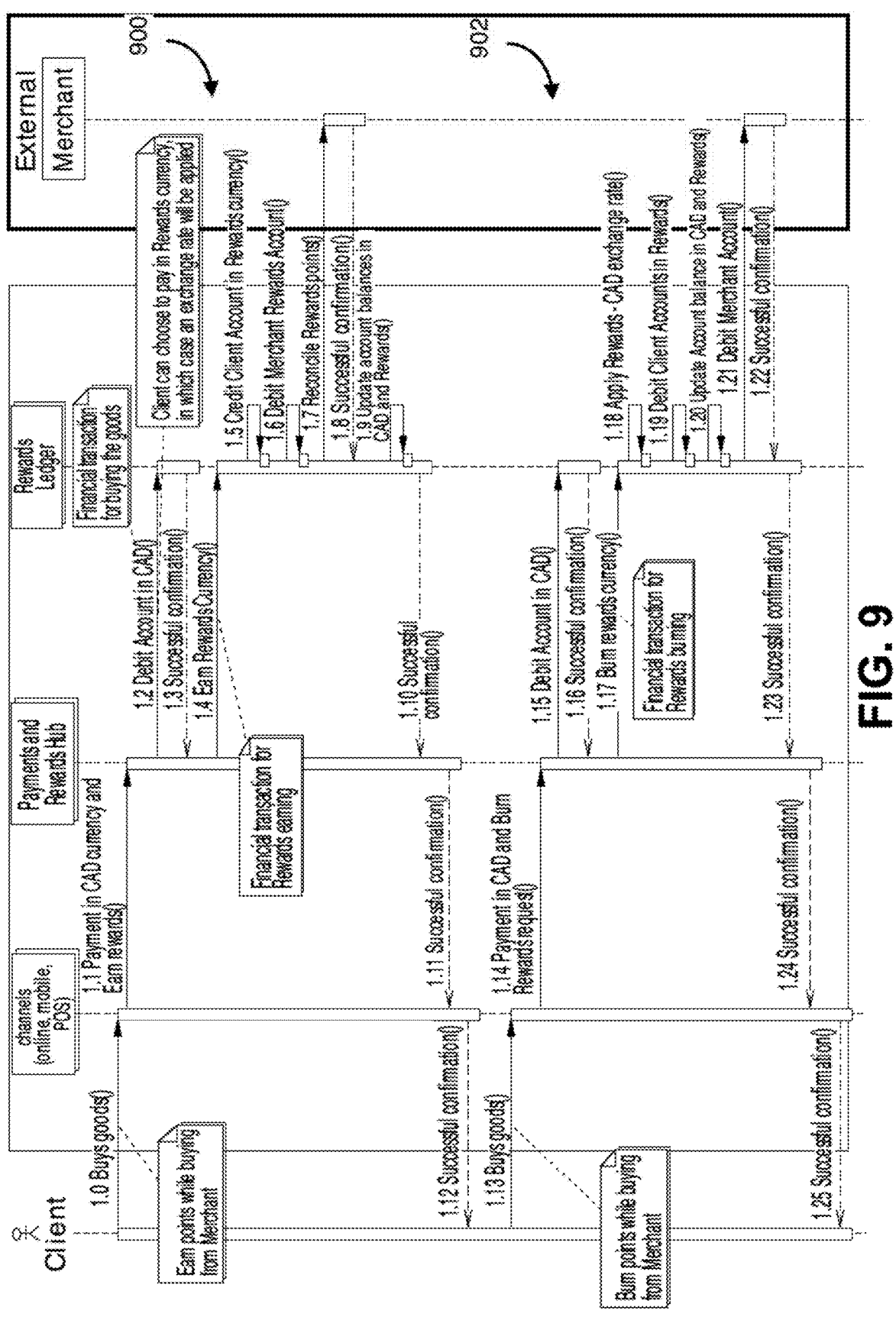

FIG. 9 is a diagram illustrative of use cases 900 and 902 where payments and rewards are conducted in multiple currencies (e.g., CAD and rewards points). Where the user choose to pay in rewards points, a conversion may be applied, and an exchange rate may be applied. In some embodiments, the exchange rate may be fixed, and in other embodiments, the exchange rate may be dynamically determined.

Conversion may be conducted in various different processes and situations, for example, in a base case, between a merchant and a consumer wherein the user sends an order (ask) for selling a first reward currency and buying merchant reward point(s), with an exchange rate. The merchant's computing systems may then sends an order (bid) for buying reward point(s) and selling the first reward currency. A system may be used to match the 2 orders above and facilitates the exchange between merchant and user.

In another embodiment where a user engages in an exchange, the first user may send an order (ask) for selling the first reward currency and buying merchant X reward point(s), with an exchange rate. Another second user sends an order (bid) for buying merchant x reward point(s) and selling the reward currency. A reward system matches the 2 orders above and facilitates the exchange between the first and second user.

In another embodiment, merchants may also utilize reward currency to convert between reward points associated with each of their own reward point systems (e.g., merchant x reward points and merchant y reward points. Merchant x sends an order (ask) for selling reward currency and buying merchant x reward point(s), with an exchange rate. Merchant y sends an order (bid) for buying merchant y reward point(s) and selling reward currency. A reward system matches the 2 orders above and facilitates the exchange between merchants x and y.

A cross-platform transfer mechanism for processing transactions between a first digital wallet and a second digital wallet, the first digital wallet corresponding to a first merchant, and the second digital wallet corresponding to a second merchant may be provided to support this transaction.

The cross-platform transfer mechanism is configured to receive, from authentication interfaces associated with each of the first and the second merchant, a first private key associated with the first merchant and a second private key associated with the second merchant; determine, from a conversion table, a conversion rate to be applied as between transaction amounts from the first digital wallet and the second digital wallet.

A control command generator is instructed to cause the recordation of a first transaction on the first digital wallet using the first private key and the recordation of a second transaction on the second digital wallet using the second private key, the transaction amounts determined based at least on the conversion rate and to confirm the recordation of the first transaction and the second transaction by monitoring received confirmations related to both of the first and the second transaction until a total number of confirmations required in the variable confirmation requirement fields is satisfied.

Figure 10:
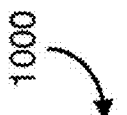
Figure 10:
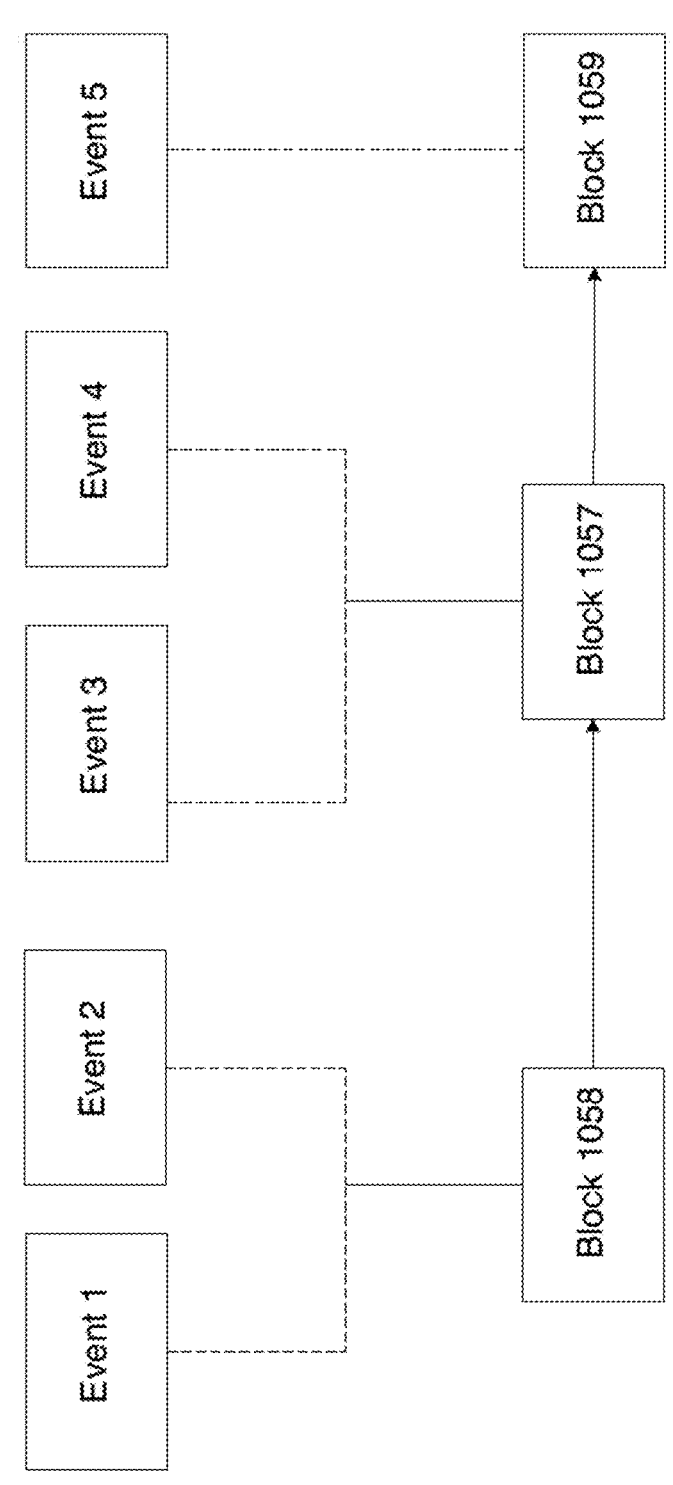

FIG. 10 is an example diagram 1000 depicting of how records may be stored in various blocks of a blockchain. As indicated blocks 1057, 1058, and 1059 are sequential blocks that may be stored on the distributed ledgers. Information relating to the transactions may be encapsulated in the form of data payloads that are fully or partially encrypted in accordance to one or more keys. In some embodiments, each block is associated with a particular public private key pair that is used to authorize further transactions relating to information encapsulated in the block, and the private key, for example, may serve as a token that is stored in a digital wallet.

In an embodiment, the blocks each record individual transactions between Mary and Joe, and queries can be conducted by reviewing events over a particular period., where a correct private key is available to be used for decrypting the transaction records, etc. In other embodiments, the blocks may represent one or more transactions, FIG. 11 is an example use case illustrating an environment with stakeholders and responsibilities, according to some embodiments.

Figure 11:
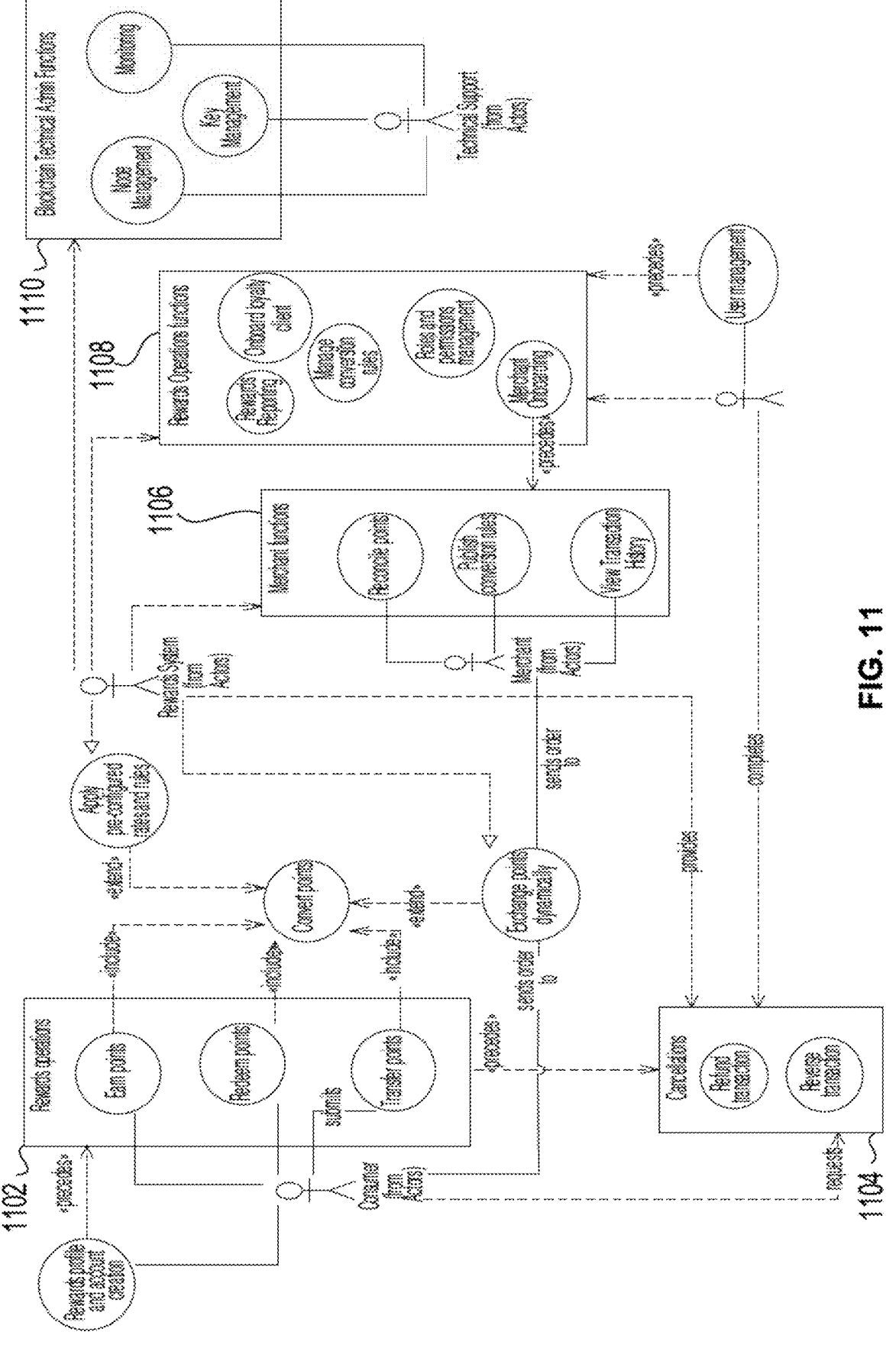
FIG. 11 is an example use case model illustrating an environment with stakeholders and responsibilities, according to some embodiments.

As depicted in FIG. 11, there may be various functional groupings, including rewards operations 1102, cancellations 1104, merchant functions 1106, rewards operations functions 1108, and blockchain technical administrative functions 1110. These functional groupings 1102-1110 interoperate with one another to provide the interactions and interfaces supporting a rewards implementation that utilizes blockchains and/or distributed ledger techniques to validate, provision, and/or consume reward tokens.

From the perspective of the rewards operations 1102 or cancellations 1104, functions to earn, redeem, revoke, and transfer points are functions that can be invoked to modify characteristics of a user's reward profile. Upon invocation of such functions, a backend system, such as system 300a, is triggered and processes the function calls in relation to the underlying set of "blocks" stored on the distributed ledgers 304a . . . 300e of nodes 302a . . . 302e. For example, the conversion of points may include the application of various pre-configured rates, and/or rules, which may be provided and/or provisioned through the use of backend rewards operations functions 1108. One or more rewards operators may modify and/or configure rewards operations functions 1108 such that the rewards operations functions 1108 are able to interoperate with merchant systems, provide role and permissions management, etc.

The blockchain technical administrative functions 1110 provide access to the underlying ledgers and records stored in the blockchain, including node management, monitoring, encryption key management, among others. For example, such access may be controlled and/or otherwise verified (e.g., through the use of provisioned encryption keys) to ensure that there all access to the blockchain by authorized parties in carrying out authorized functions and/or activities, etc. The access may be provided, for example, through an application programming interface, etc. The access to the records may include the conversion of point rewards functionality calls to blockchain specific interface commands, including commands to provision new blocks into the blockchain, such as records indicative of transfers from one owner to another, provisioning of new encryption keys provided to the "owners" of a unit of rewards, generating of new rewards units, etc.

Figure 12:
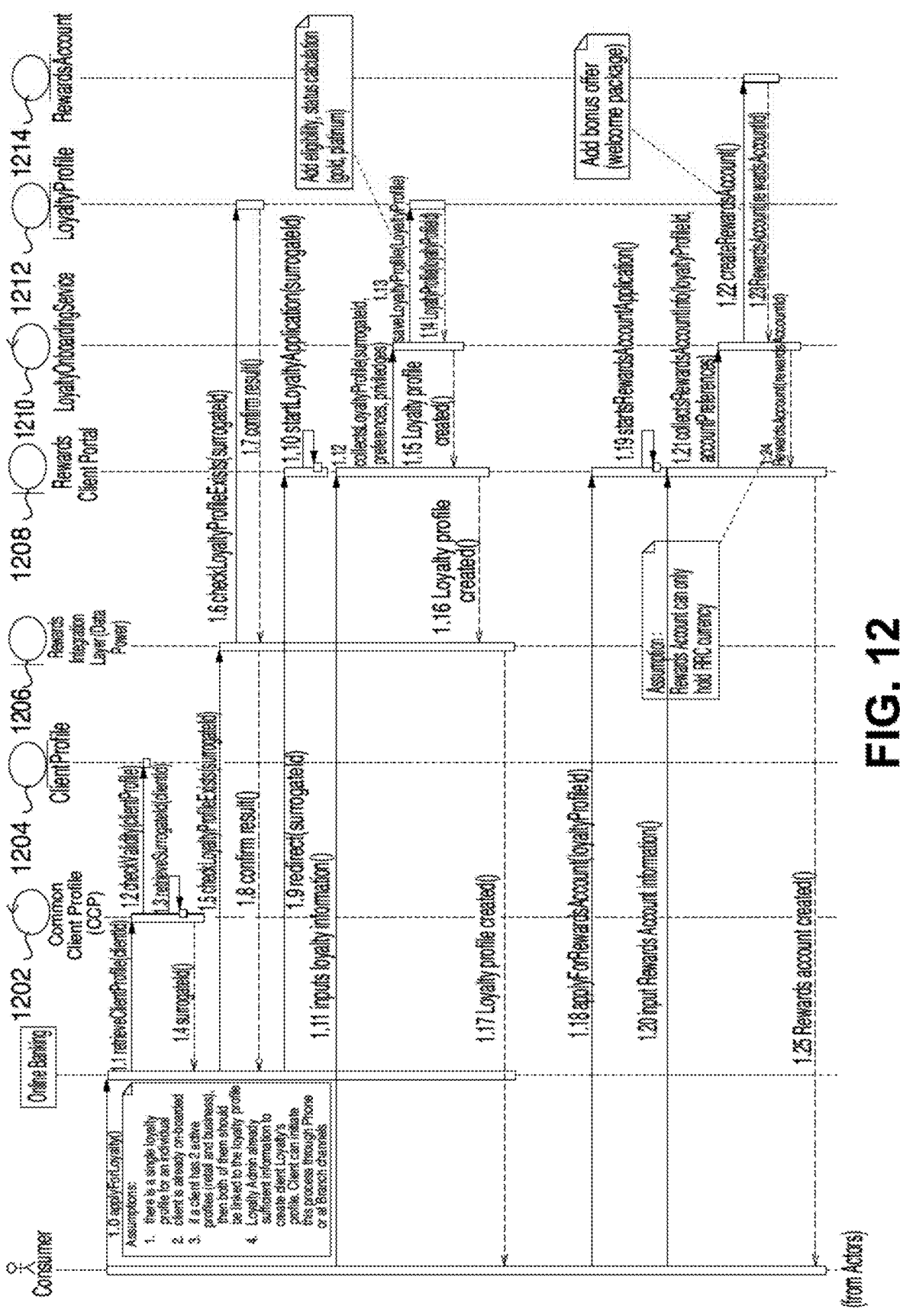
FIG. 12 is illustrative of a use case for loyalty onboarding where there is self-enrolment, according to some embodiments.
Figure 13:
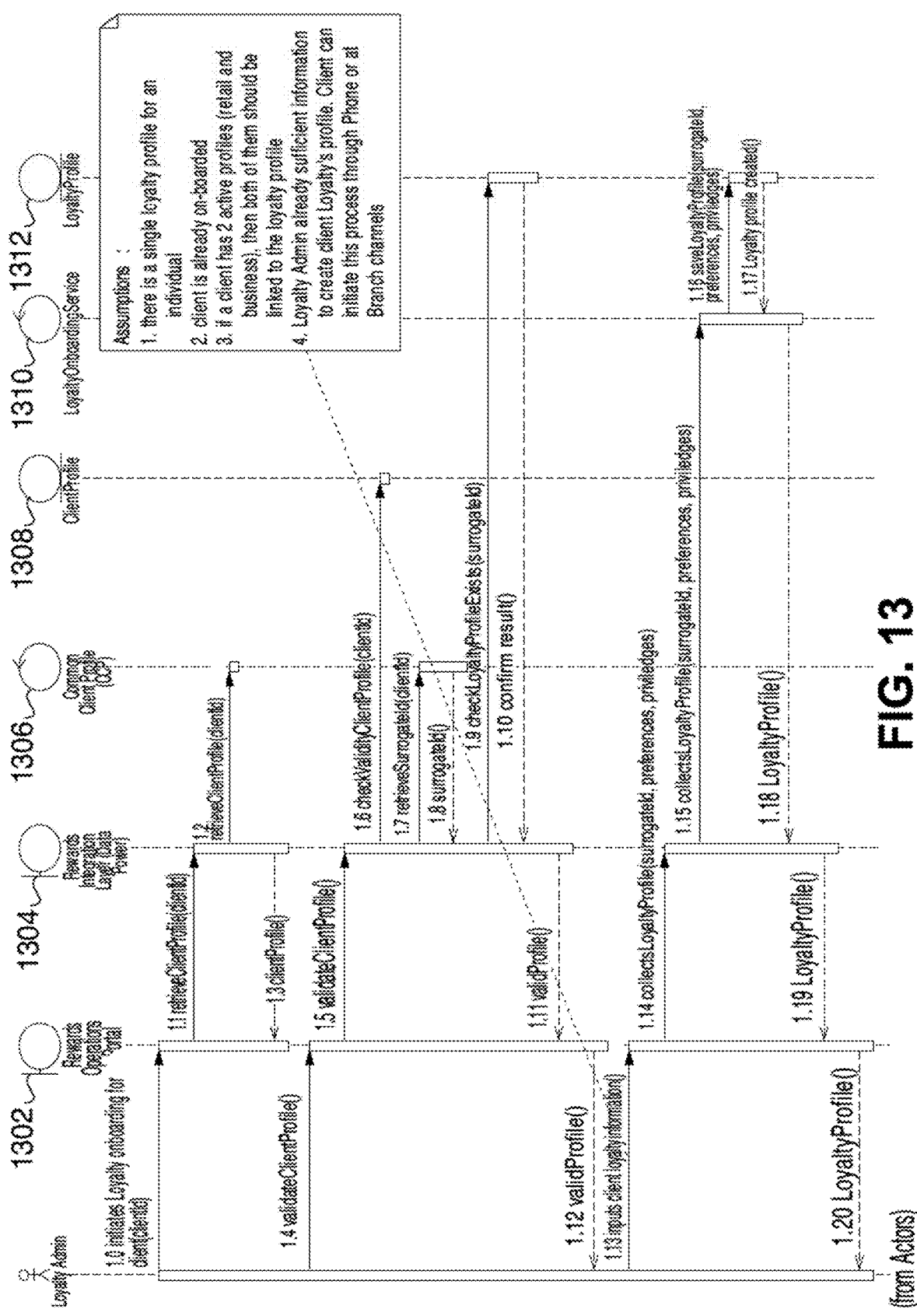
FIG. 13 is illustrative of a use case for loyalty onboarding for assisted enrolment, according to some embodiments.

FIGS. 12 and 13 are illustrative of use cases for loyalty onboarding, according to some embodiments.

In some embodiments, a use case may be provided relating to a process of onboarding a new client who applies for a loyalty product. The system initiates the process by preparing an interface for which a user is able to instruct the system that the user wishes to applies for the banking product, for example, through via an interface (e.g., online public website). The system begins the process shown on FIG. 12 or 13, whereby a new client profile will be instantiated and a loyalty profile will be created in a rewards system and linked to the client profile.

The system can activate a loyalty account, and any available bonus points or financial rewards are then deposited into the clients' loyalty account or banking account after the initial setup.

From a workflow perspective, there may be variations depending on whether the client is an existing client without a loyalty product, an existing client with multiple profiles, and/or is an existing client requiring assisted enrolment. The system may adapt the workflows and/or instruction sets accordingly.

As depicted in FIG. 12, various assumptions are made, including that there is a single loyalty profile for the individual, the client is already on-boarded, where the client has multiple active profiles (e.g., retail and business), both of them may be linked to the loyalty profile, and that a loyalty administrator already has sufficient information to create the client's loyalty profile, with the process being instigated through the phone or branch channels.

Steps 1.0 to 1.25 are illustrated, wherein interactions are depicted between a common client profile 1202, a client profile 1204, a rewards integration layer 1206, a rewards client portal 1208, a loyalty onboarding service 1210, a loyalty profile 1212, and a rewards account 1214.

As depicted in FIG. 13, various assumptions are made, including that there is a single loyalty profile for the individual, the client is already on-boarded, where the client has multiple active profiles (e.g., retail and business), both of them may be linked to the loyalty profile, and that a loyalty administrator already has sufficient information to create the client's loyalty profile, with the process being instigated through the phone or branch channels.

Steps 1.0 to 1.20 are illustrated, wherein interactions are depicted between a rewards operations portal 1302, a rewards integration layer 1304, a common client profile 1306, a client profile 1308, a loyalty onboarding service 1310, and a loyalty profile 1312. As illustrated, function calls are provided wherein validity checks are performed, and loyalty profile information is collected.

Figure 14:
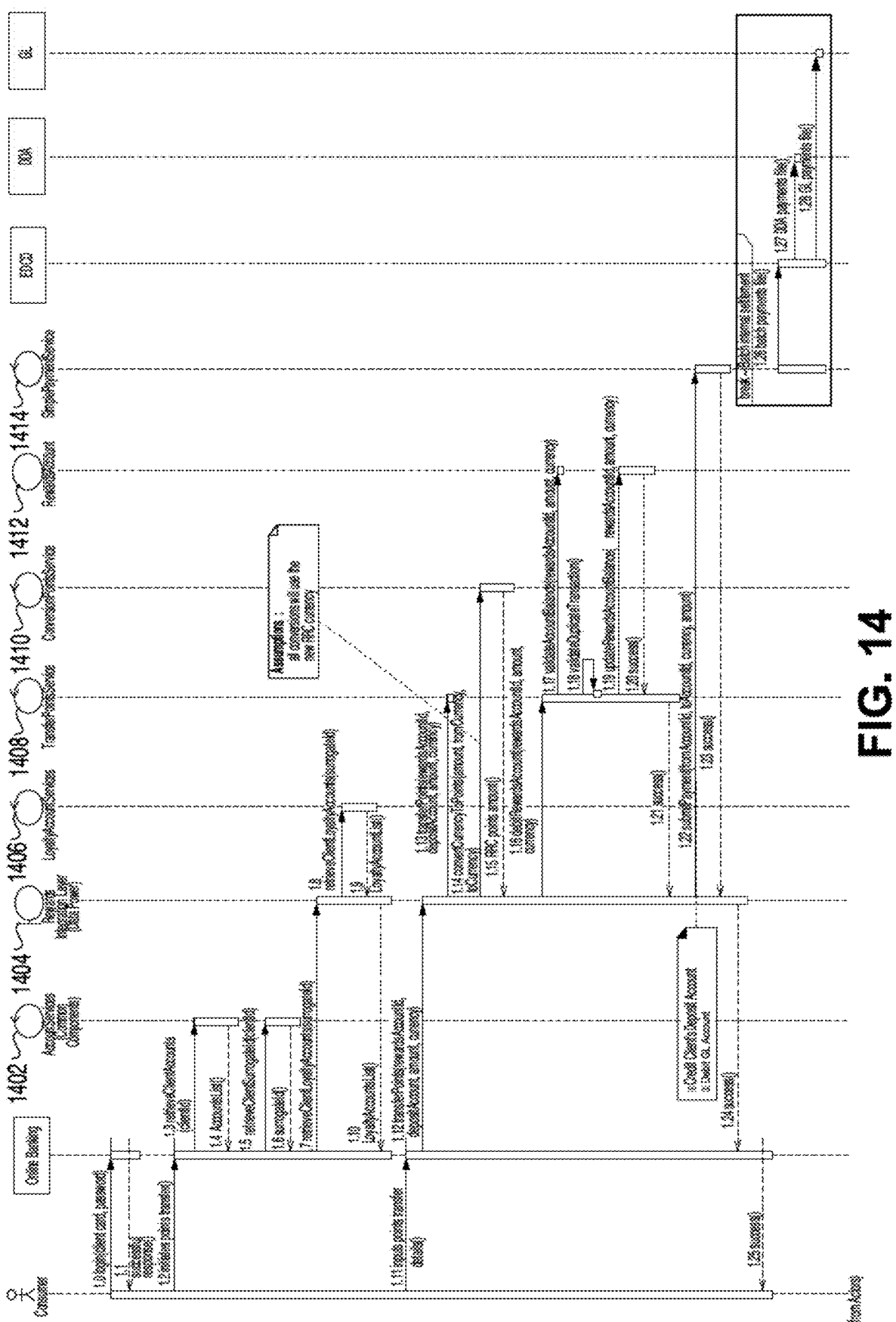
FIG. 14 is an example use case illustrated for the transfer of points between client accounts, according to some embodiments.

FIG. 14 is an example use case illustrated for the transfer of points between client accounts, according to some embodiments.

The system may be configured to generate signals indicative of instructions to, for example, transfer points to/from the client's own accounts (e.g., from deposit/credit account to a rewards account and vice versa), and/or to another client's accounts. In some embodiments, an intermediate step may be involved wherein all currencies are first converted to a rewards currency (as provided and supported by a blockchain backend) before and/or as part of subsequent conversions. For example, a settlement process may be provided for use with deposit and/or credit account settlement.

In some situations, a points conversion may need to be applied to account for various differences, such as currencies (e.g., CAD to USD) and specific merchant loyalty program points. Steps 1.0 to 1.28 are illustrated, depicting interactions between an account services components 1402, a rewards integration layer 1404, a loyalty account services function 1406, a transfer points service 1408, a conversion points service function 1410, a rewards account function 1412, and a payment service 1414. The payment service invokes an internal settlement process 1.26 to 1.28.

Figure 15:
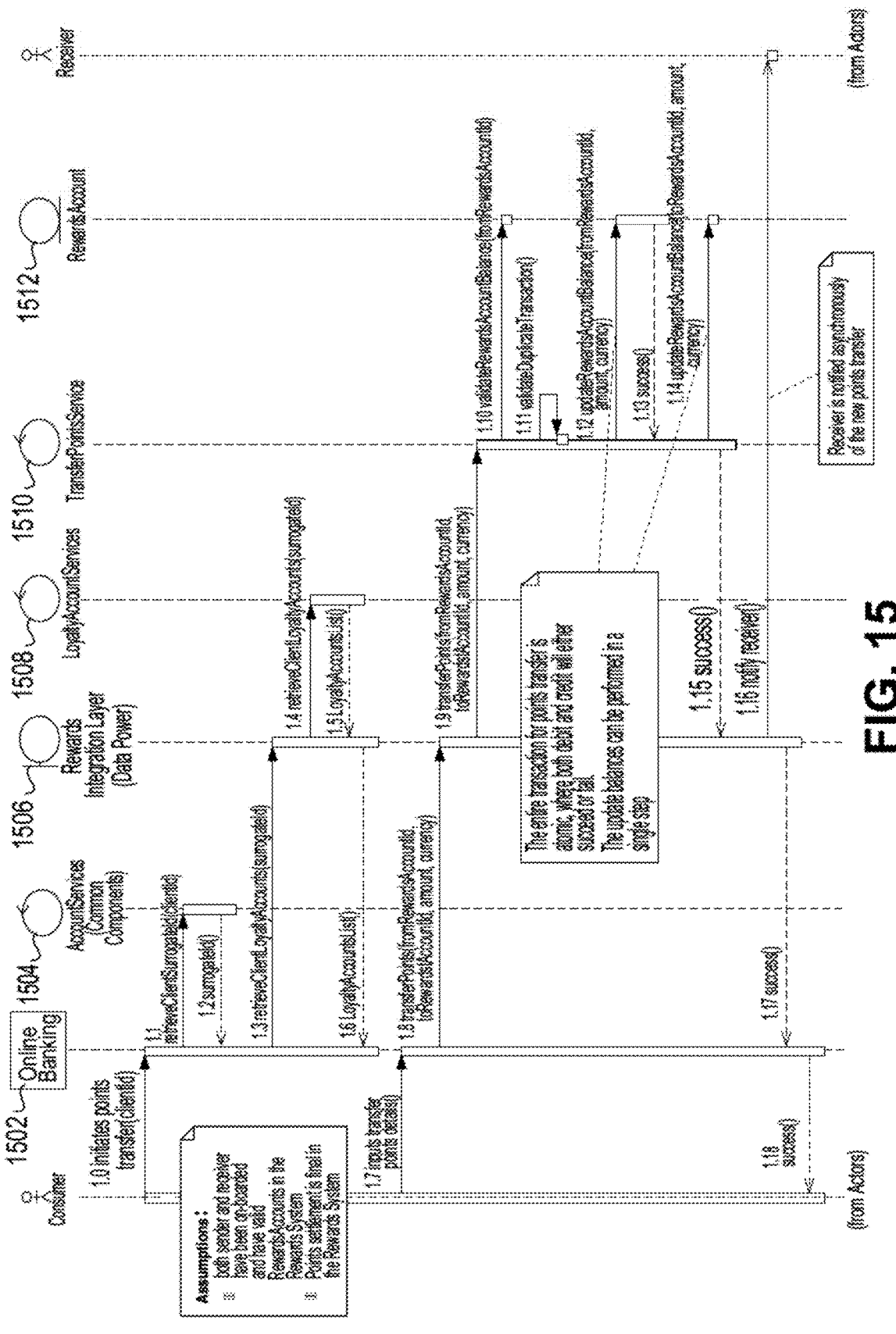
FIG. 15 is an example use case illustrated for the transfer of points between different clients, according to some embodiments.

FIG. 15 is an example use case illustrated for the transfer of points between different clients, according to some embodiments. Steps 1.0 to 1.18 are illustrated, depicting interactions between an online banking component 1502, an account services components 1504, a rewards integration layer 1506, a loyalty account services component 1508, a transfer points service 1510, and a rewards account 1512.

Figure 16:
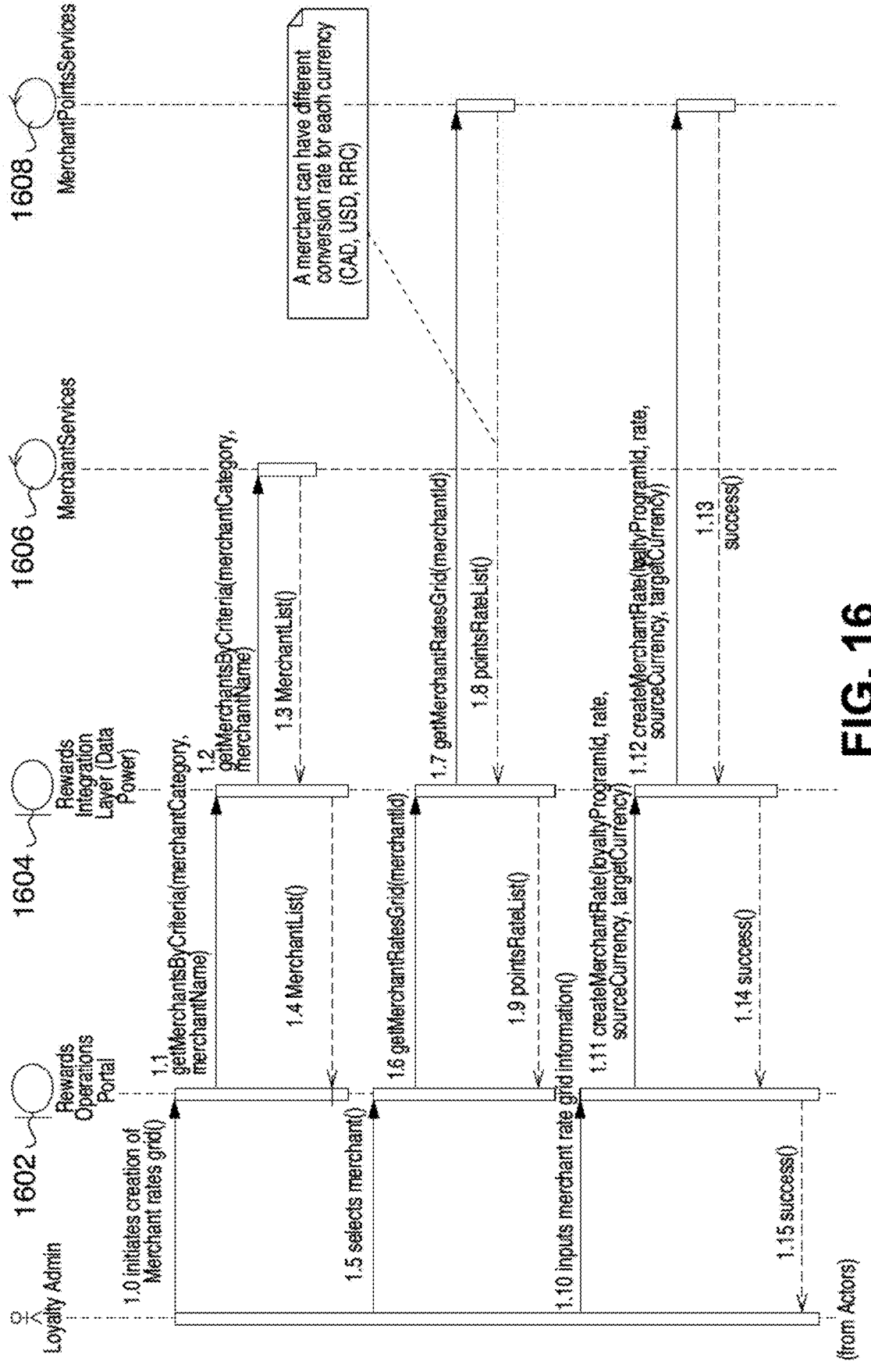
FIGS. 16 and 17 are example use cases illustrated in relation to managing conversion rules and rates, according to some embodiments.
Figure 17:
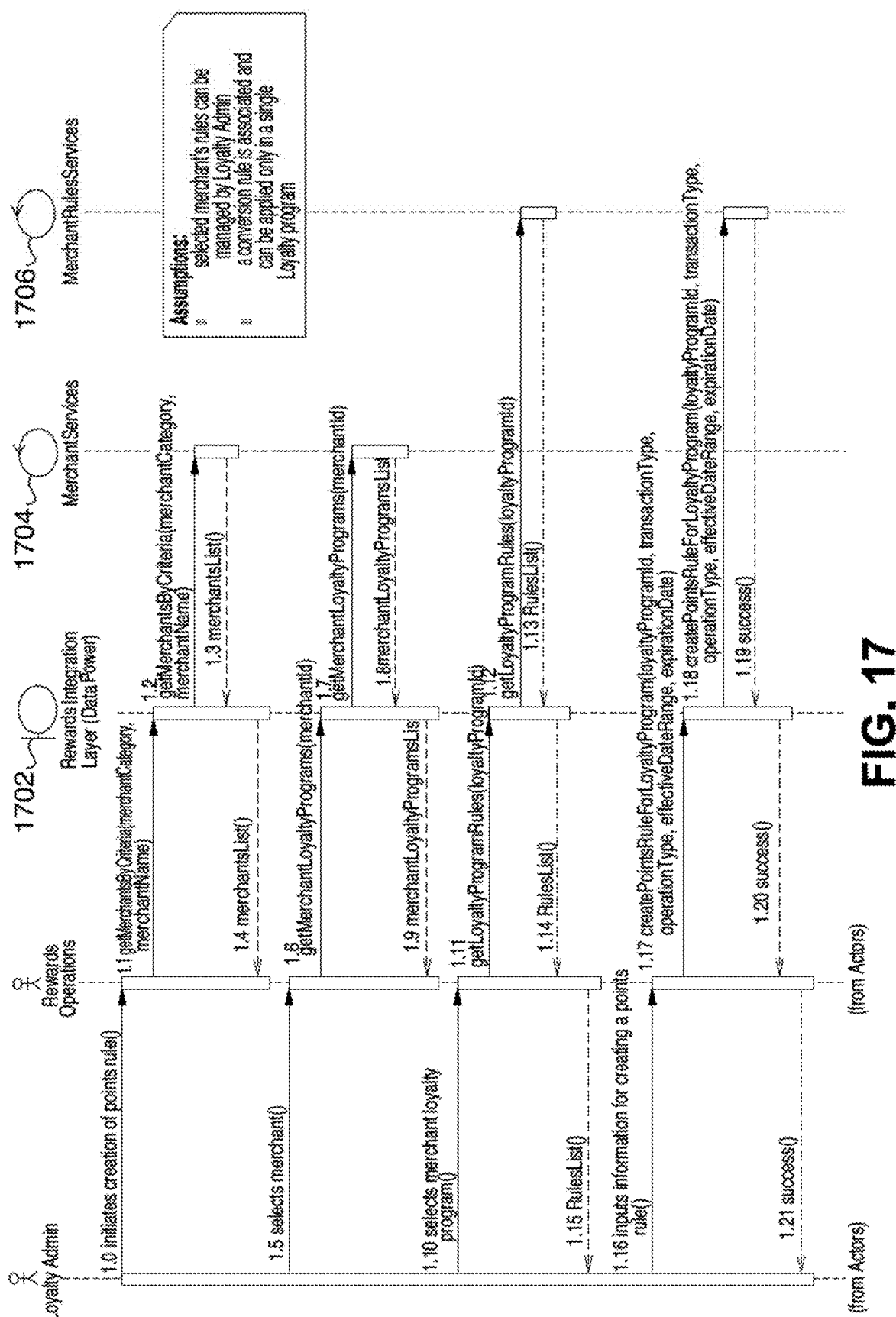

FIGS. 16 and 17 are example use cases illustrated in relation to managing conversion rules and rates, according to some embodiments. The use cases describe steps of example processes of managing the loyalty programs grid rates for currency conversion and their specific rules, for earning and redeeming operations.

In some embodiments, rate grids cover conversion for merchant points, reward currencies, CAD and USD currencies, among others. Conversion rules may be provided for earn, redeem operations, among others.

As depicted in FIG. 16, steps 1.0-1.15 are sample steps of a method for interaction between a rewards operation portal 1602, a rewards integration layer 1604, a merchant services function 1606, and a merchant points services function 1608. FIG. 16 is illustrative of a flow for managing conversion rates.

As depicted in FIG. 17, steps 1.0 to 1.21 are sample steps of a method for interaction between a rewards integration layer 1702, a merchant services function 1704, and a merchant points services function 1706. FIG. 17 is illustrative of a flow for managing conversion rules.

Figure 18:
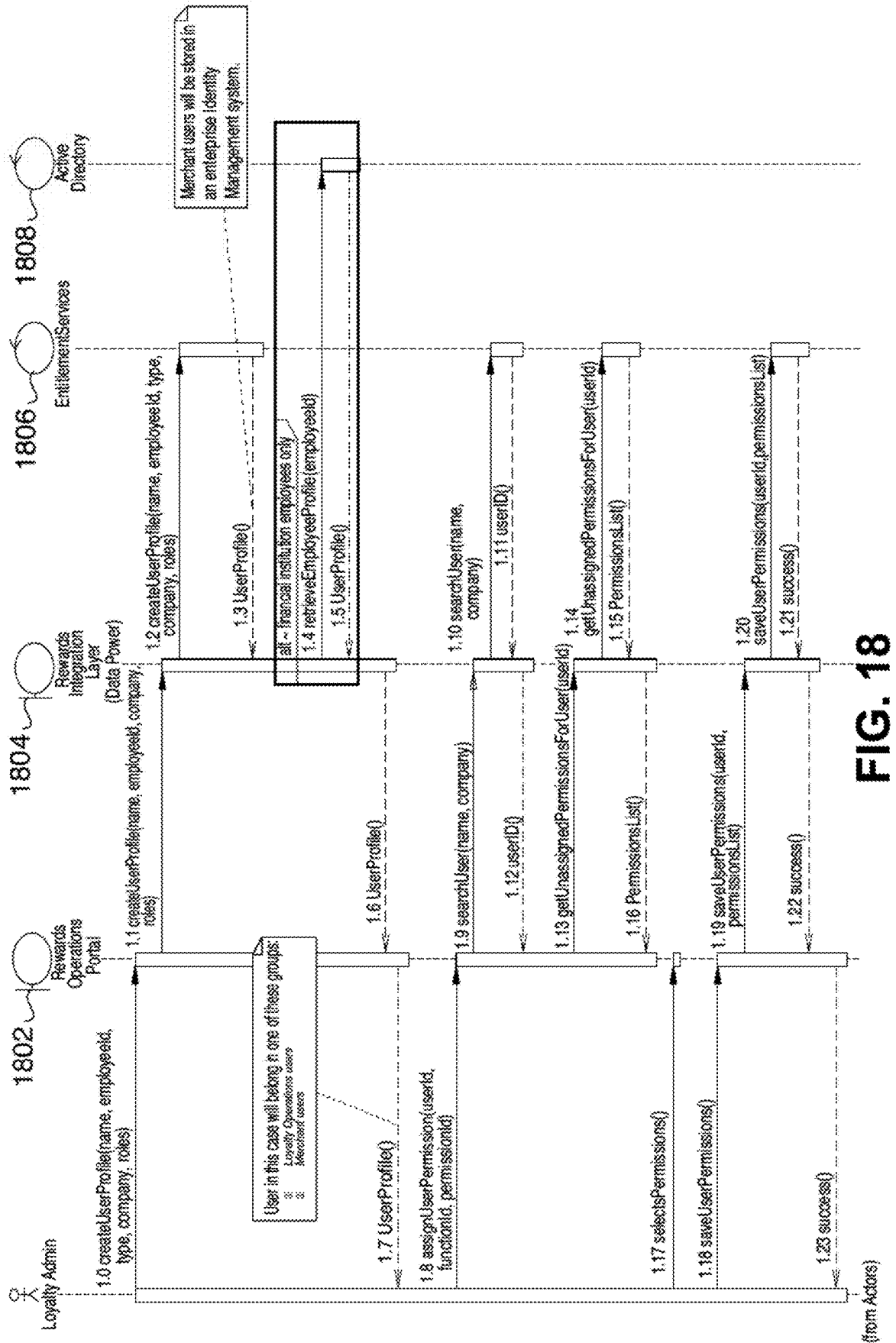
FIG. 18 is an example use case provided in relation to the provision and setup of user flow, according to some embodiments.

FIG. 18 is an example use case provided in relation to the provision and setup of user flow, according to some embodiments. A process is described for setting up users in a rewards administrative portal, assigning users roles and permissions to be able to service clients, merchants and internal employees.

As depicted in FIG. 18, steps 1.0 to 1.23 are sample steps of a method for setting up a user that is conducted between a rewards operations portal 1802, a rewards integration layer 1804, an entitlements service 1806, and an active directory service 1808. For example, various user information, such as characteristics of merchant users, will be stored in an enterprise identity management system.

Figure 19:
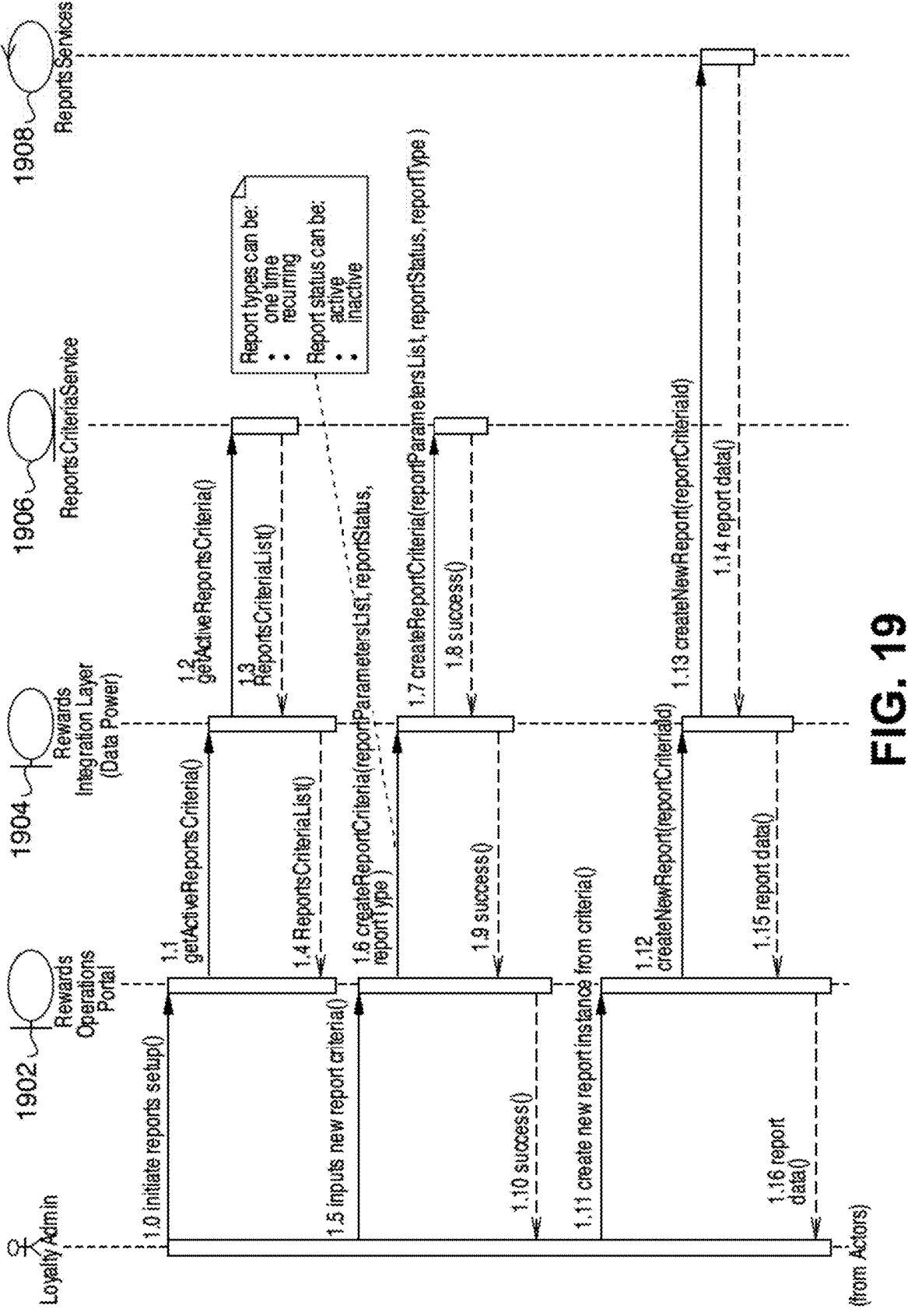
FIG. 19 is an example use case provided in relation to reports management, according to some embodiments.

FIG. 19 is an example use case provided in relation to reports management, according to some embodiments. A process is described managing reports templates using predefined criteria and rules, the templates being usable to create reports delivered in real or near-real time. For example, there may be ad-hoc historical reports, transaction inquiries, etc.

As depicted in FIG. 19, steps 1.0 to 1.16 are sample steps of a method for generating reports that is conducted between a rewards operations portal 1902, a rewards integration layer 1904, a reports criteria service 1906, and a reports service 1908.

Figure 20:
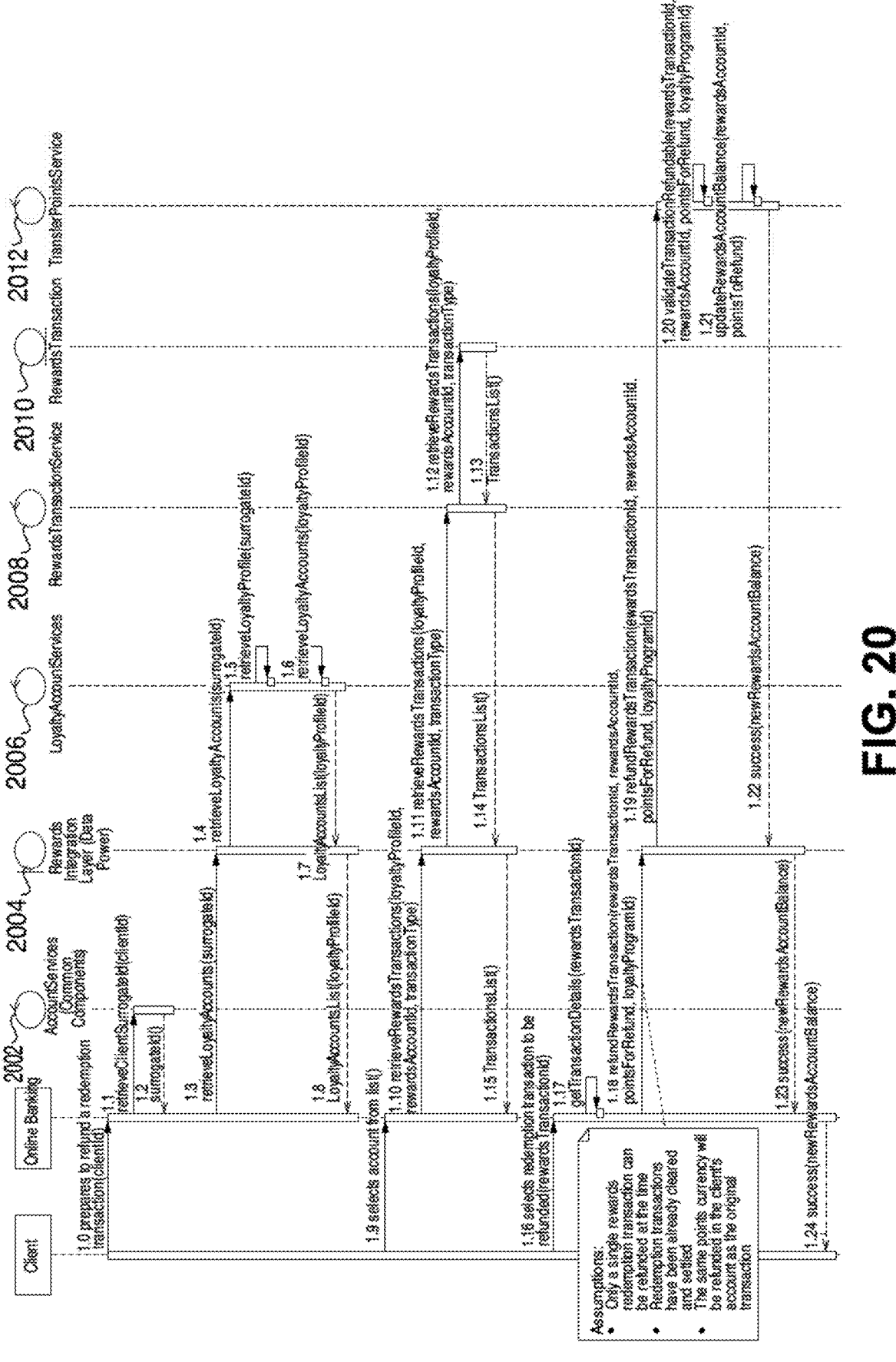
FIG. 20 and FIG. 21 provide an example use cases in relation to provisioning of a refund, according to some embodiments.
Figure 21:
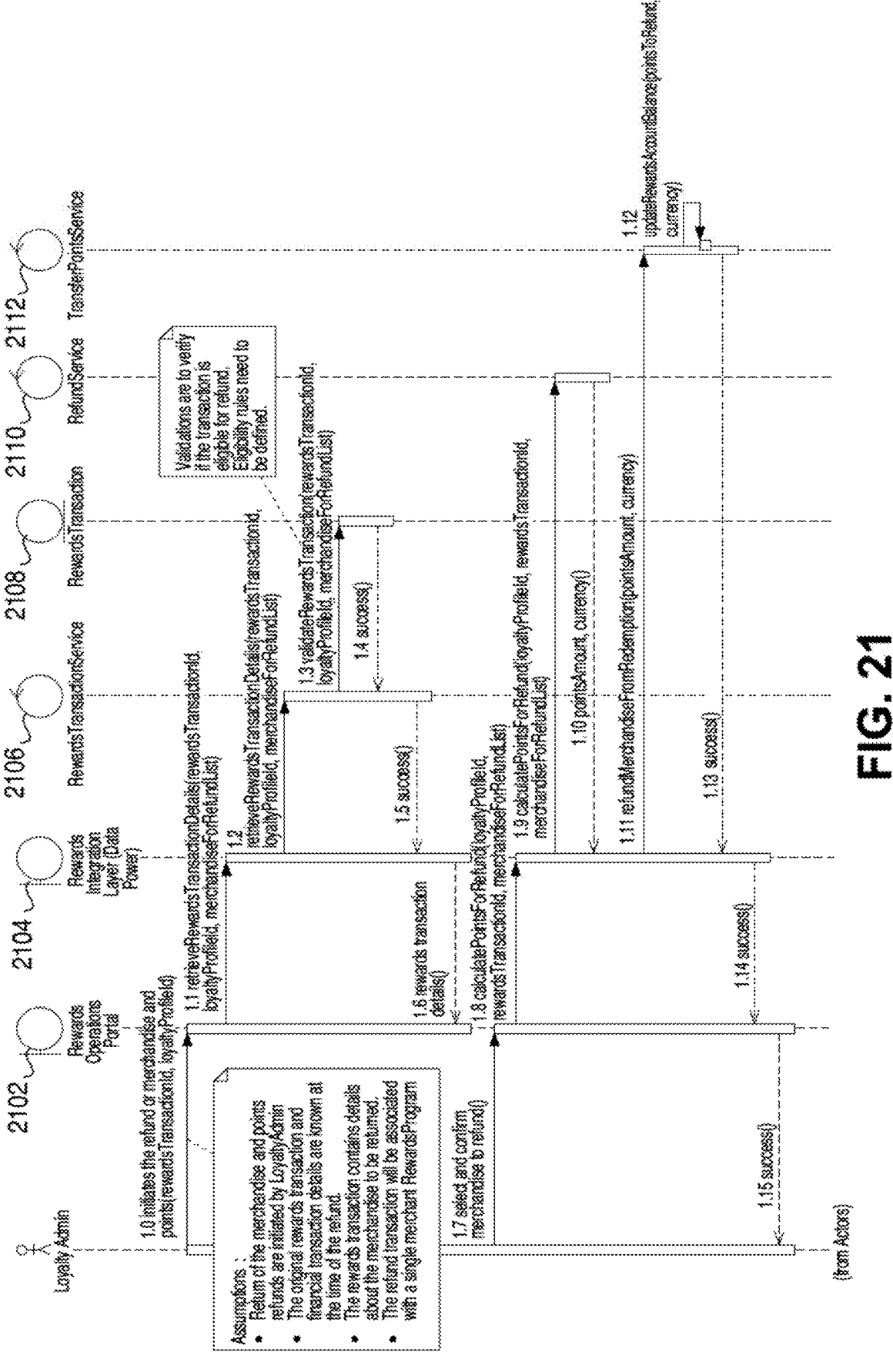

FIG. 20 and FIG. 21 provide an example use cases in relation to provisioning of a refund, according to some embodiments. A process is described for refunding points for a redemption rewards transaction, with or without a merchandise refund. The points to be refunded may be associated with the same merchant's rewards program. When returning merchandise, the refund operation can be partial or total, depending if the merchandise is returnable or not.

Various assumptions may be made, for example. In some situations, only a single redemption transaction with merchandise return will be refunded at the time, transactions which are considered for redemption are already cleared and settled, the points will be returned using the same currency used in original transaction, and the operation to return the merchandise is handled by external platforms (merchants) and may require confirmation the rewards ledger.

As depicted in FIG. 20, steps 1.0 to 1.24 are sample steps of a method for generating reports that is conducted between an account services function 2002, a rewards integration layer 2004, a loyalty account service 2006, a rewards transaction service 2008, a rewards transaction 2010, and a transfer points service 2012.

As depicted in FIG. 21, steps 1.0 to 1.15 are sample steps of a method for generating reports that is conducted between a rewards operation portal 2102, a rewards integration layer 2104, a rewards transaction service 2106, a rewards transaction 2108, a refund service 2110, and a transfer points service 2112.

Figure 22:
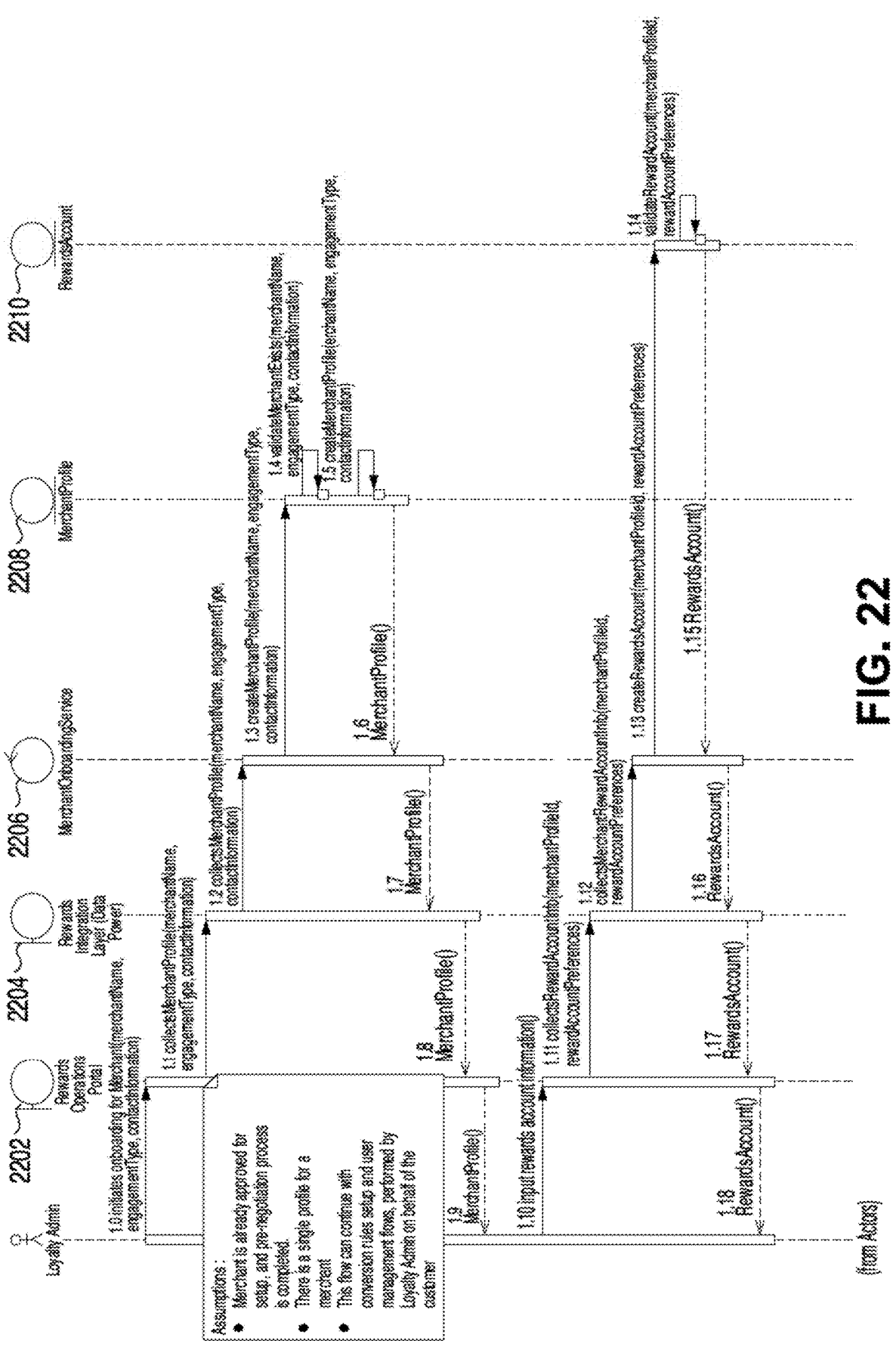
FIG. 22 is an example use case provided in relation to merchant onboarding, according to some embodiments.

FIG. 22 is an example use case provided in relation to merchant onboarding, according to some embodiments. A process is described to onboard a merchant into a rewards ledger platform. Various assumptions may be made, for example, that the merchant is already pre-approved to be on-boarded in rewards ledger platform, and that the merchant may have a single profile. The merchant profile, rewards programs details, users and accounts may be set up.

As depicted in FIG. 22, steps 1.0 to 1.18 are sample steps of a method for generating reports that is conducted between a rewards operation portal 2202, a rewards integration layer 2204, a merchant onboarding service 2206, a merchant profile 2208, and a reward account function 2210.

Figure 23:
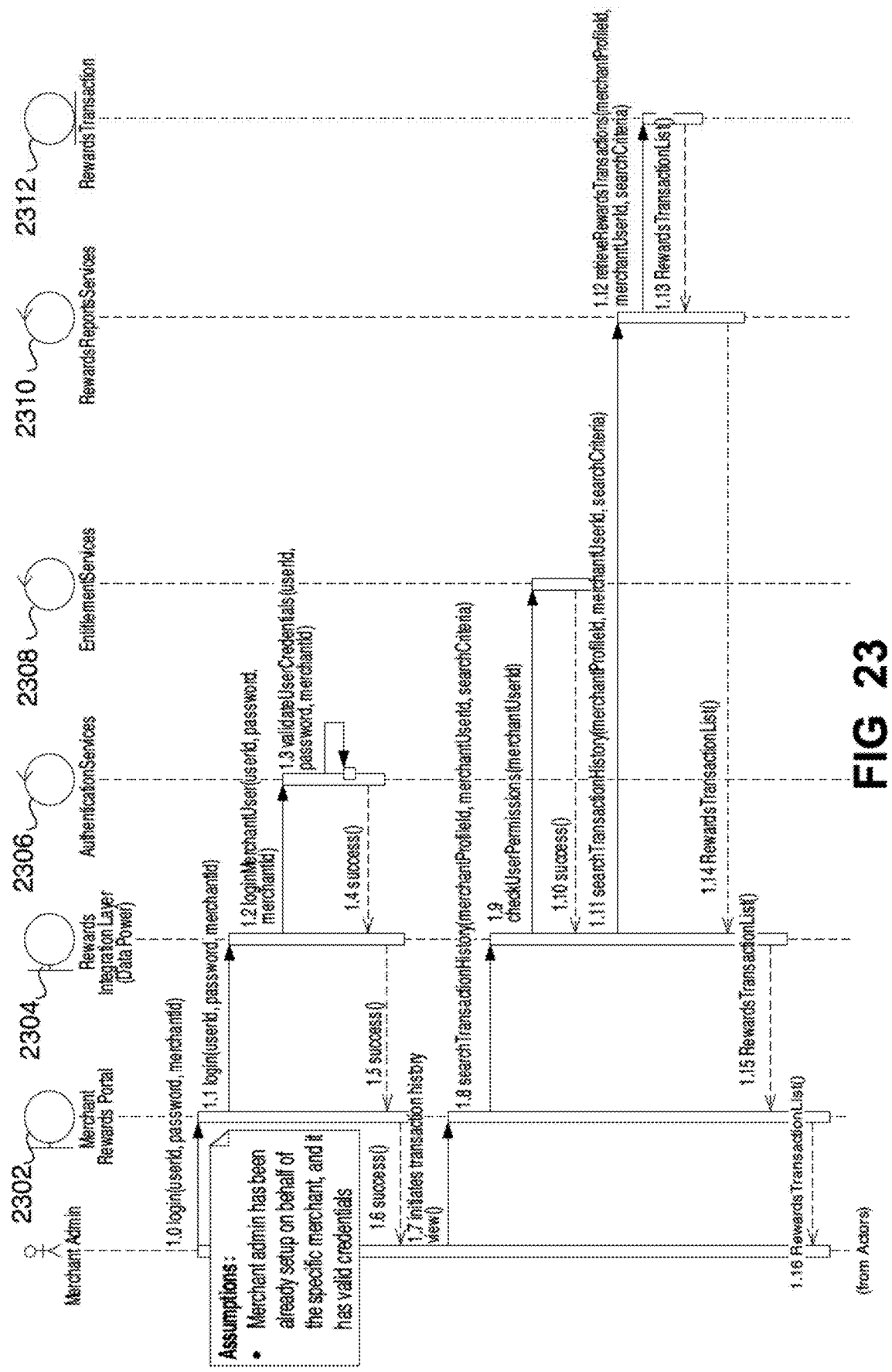
FIG. 23 is an example use case provided in relation to viewing transactions by merchants, according to some embodiments.

FIG. 23 is an example use case provided in relation to viewing transactions by merchants, according to some embodiments. A process is described for a merchant to access historical rewards transactions associated with his/her rewards programs.

As depicted in FIG. 23, steps 1.0 to 1.16 are sample steps of a method for providing functionality for a merchant to view historical records that is conducted between a merchant rewards portal 2302, a rewards integration layer 2304, authentication services 2306, entitlement services 2308, rewards report services 2310, and a rewards transaction service 2312.

Figure 24:
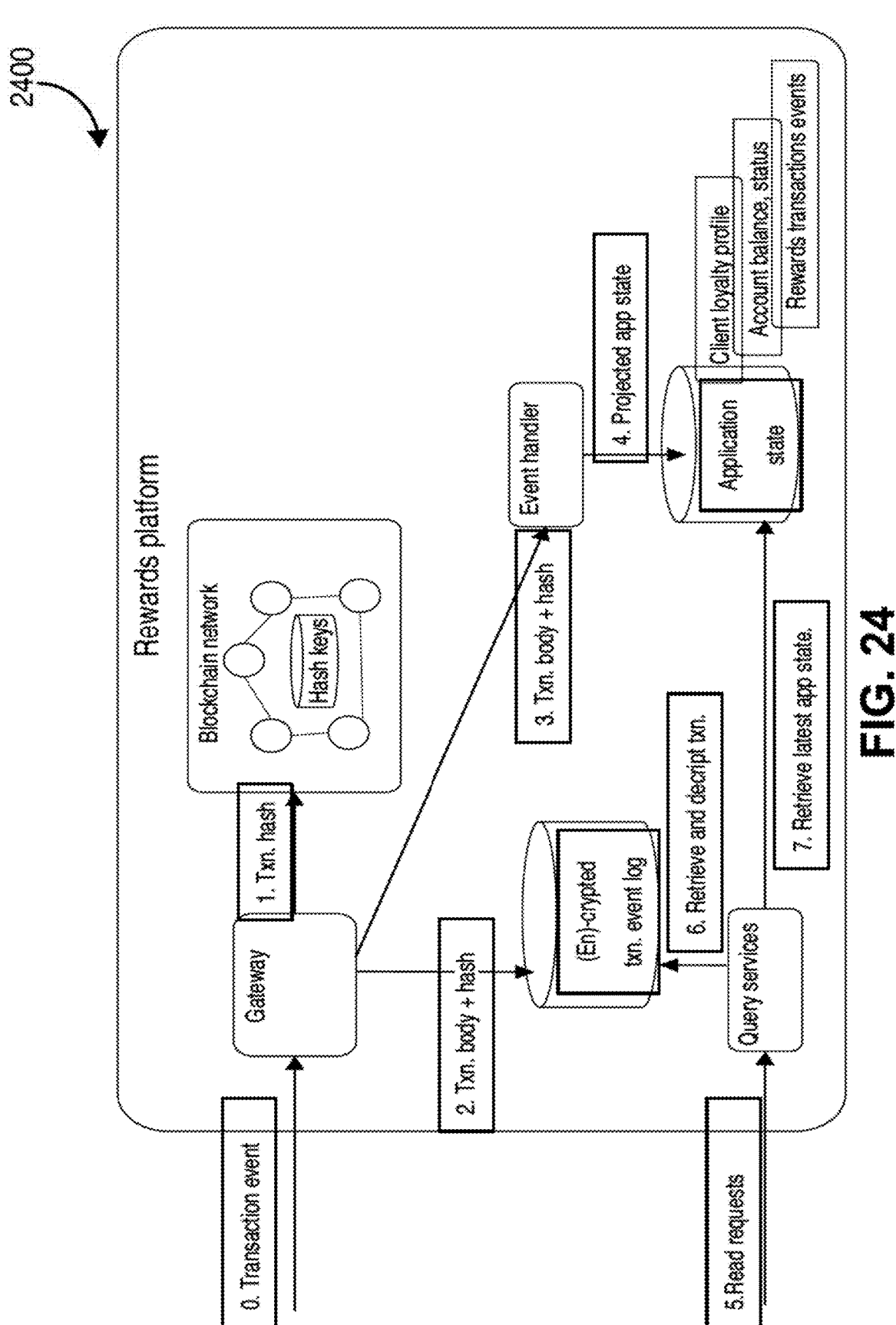
FIGS. 24 and 25 provide two example architectures for storing data in various databases. according to some embodiments.
Figure 25:
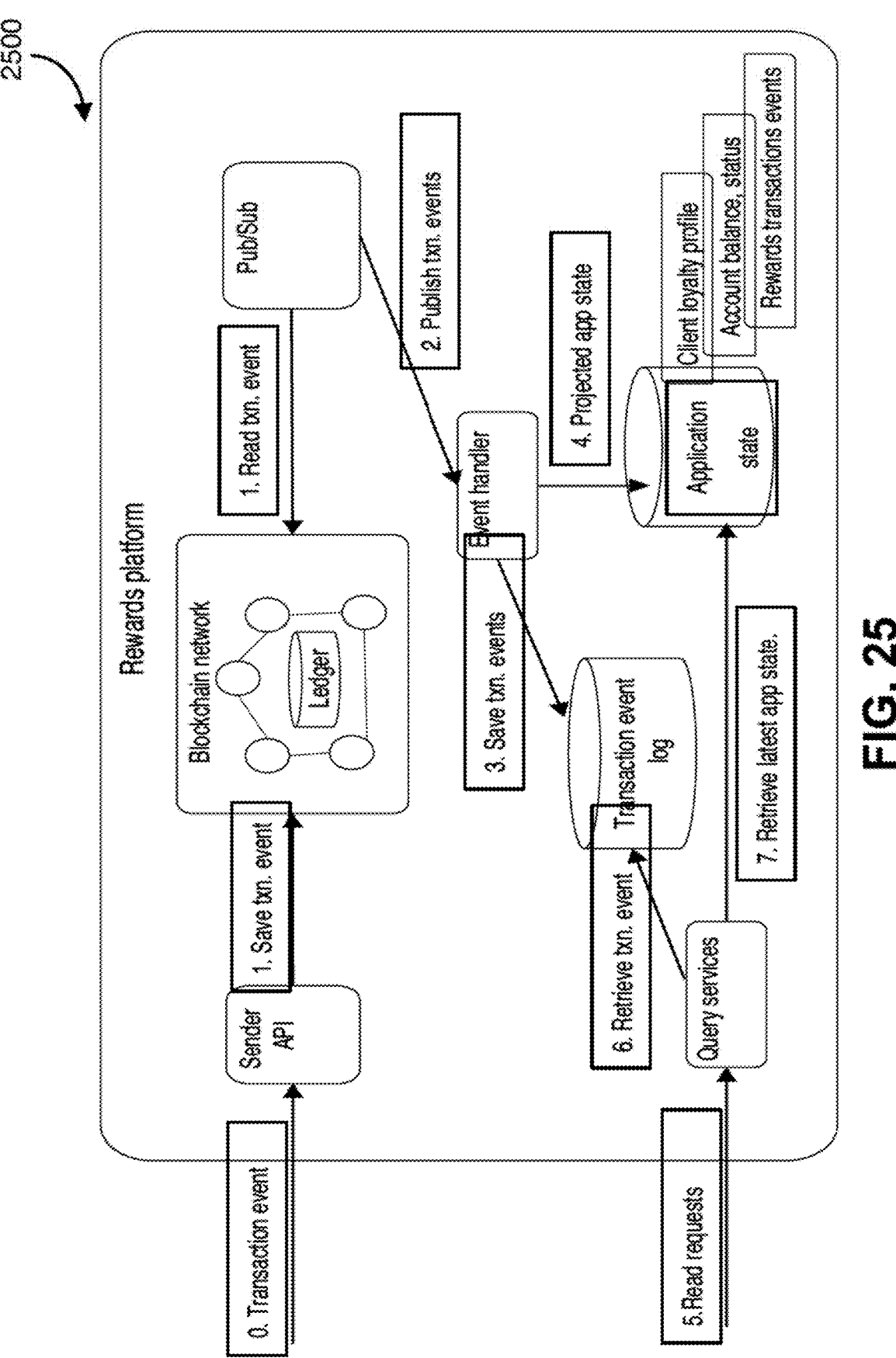

Various approaches may be utilized for storing data in various databases. FIGS. 24 and 25 provide two example architectures for storing data in various databases. according to some embodiments.

FIG. 24 is illustrative of a first architecture 2400, wherein business data is stored in a relational database, according to some embodiments. As depicted in FIG. 24, business data (business events, application state) are stored once and conform to well-defined, structured data schema (relational database). The architecture provides secured storage of business events, linked to blockchain keys in a fault tolerant approach where, for example, the system can restore state from past events.

The architecture may be used, for example, to receive business events, store business events in relational data store, calculate application state from incoming events, restore application state from events (rolling snapshot, cache), in case of failure, dynamic and ad-hoc queries to business data: aggregations, joins, filters etc., and generate reports and analytics of business data, among others.

Potential advantages may include, for example, normalized transaction data, tuned for query performance, aggregations, filters, joins etc., data structured and accessible for operational troubleshooting.

Typed data may allow for compiled time checks, avoiding runtime transaction errors, and business event data may be stored once, with no duplications. Dynamic and ad-hoc queries may be facilitated and fault tolerance may be achieved by restoring the application data from past events. Evolving the transaction metadata minimizes ledger corruption.

However, a potential drawback may arise wherein changing the transaction/events data structures may impact the system.

In some embodiments, the data payloads (i.e., the information being queued to be stored on the blockchain) may include conversion rule/consensus rule modifications that are "piggy-backed" on to existing transactions. When processing these data payloads, the consensus and/or processing rules residing on the nodes may also be modified (e.g., to reflect a new policy that 1000 points of rewards type A are now convertible to 1250 points of rewards type B, instead of 1000 points of rewards type B.

The blocks may be configured such that conversion rules/consensus rules are also stored directly on the distributed ledgers and obtained via querying the distributed ledger by the one or more nodes. The provisioning of "piggy-backed" rules allows for an easy propagation of "earning rule" changes, which is otherwise difficult due to the lack of a centralized control authority where conversion rules are read from. Accordingly, in some embodiments, the distributed ledgers may include one or more "side chains" whereby conversion rules are maintained similar to processed transactions (e.g., modifications are applied not to change the rules on the chain, but rather, added as sequential blocks which are read to determine the most current conversion rule).

Where conversion rules are modified and propagated, the system may be configured to prevent all conversions during a period of time to permit the conversion rules to fully propagate through the system. In some embodiments, a conversion mechanism may be configured to query for a predefined or a dynamic number of confirmations prior to being satisfied that the rules have sufficiently propagated throughout the system.

In implementation, processing rules (e.g., consensus rules, conversion rules, propagation rules) may be stored as a separate ledger on at each of the nodes. The separate ledger operates alongside the aforementioned distributed ledger, and the separate ledger is utilized to provide a record of changes to the processing rules. A separate set of base consensus rules may be applied to the separate ledger such that only authorized modifications can be propagated, and in some embodiments, these base consensus rules may have a greater level of security than conducting transactions. The greater level of security may cause, as a drawback, a greater amount of delay in processing updates to the processing rules, however, given the reduced likelihood and generally reduced volume of rule changes, the delay may be acceptable. For example, the higher level of security may include a higher level of encryption or more bits required, a stronger public/private key configuration, etc.

Accordingly, when a data payload is received having both a transaction and a modification to the processing rules "piggy-backed" on it, the portions are separated for processing and verification. Where a modification is being conducted to the processing rules, the merchant private key or other private key associated with the merchant may be required to initiate the modification. In some embodiments, a cascading hash is utilized to generate a next private key requirement to authorize modification (e.g., so that the same key is not used for each modification, but a next key is generated upon a modification, and so forth).

In operation, the modifications are propagated similarly between nodes such that over a duration of time, all of the separate ledgers are updated to reflect the correct processing rules. Accordingly, a merchant is able to distribute modifications to processing rules associated with its own reward points even though there is no centralized authority and the number and location of nodes is unknown. As described above, there may be a built-in requirement for a minimum number of confirmations and/or time elapsed prior to implementation of the rules.

The separate ledgers may be designated as a plurality of distributed processing rule ledgers each being managed by a corresponding node computing device of the plurality of node computing devices and corresponding to a distributed ledger of the plurality of distributed ledgers. Each of the separate ledgers sequentially stores a series of modifications of processing rules that are cryptographically linked to one another.

The interface layer of each node computing device is configured to traverse the corresponding distributed processing rule ledger during the extraction of the one or more control commands to identify and to apply a latest updated processing rule. A base rule can be identified and subsequent modifications can be determined via traversal of the chain (e.g., Rule A, Rule A*, Rule A **, and so on).

In accordance with another aspect, the control command generator is configured to encapsulate rule modifications and rule modification authorization keys alongside the electronic transactions within at least one of one or more the data payloads, so a single data payload can be used to incorporate not only transaction information, but also to efficiently propagate changes to the underlying processing rule mechanism (e.g., coupons, offers, enhanced redemption events, enhanced earning events) that would otherwise be a challenge in a distributed computing environment where the number, location, and characteristics of nodes may be dynamic, and there is no central authority tracking and managing all of the nodes.

When receiving propagated payloads from nodes in direct communication with a particular node, the interface layer of each node is configured to (i) extract transaction information for addition to the distributed ledger corresponding to the node computing device where the propagation consensus mechanisms are satisfied, and (ii) extract the rule modifications authorized against the rule modification authorization keys for addition to the processing rule ledger corresponding to the node.

In some embodiments, enhanced security is provided by way of cascading cryptographic keys at each rule modification, such that encryption is sequentially reapplied in a nested manner such that new public/private key pairs are generated at every rule modification. In such an implementation, a merchant or other administrator may continually generate different private keys that are used for each level of rule modification (e.g., so an earlier key is likely not applicable or usable to enforce a new rule modification). A merchant or administrator with knowledge of the specific parameters of a hash function may be able to regenerate future keys based off of a base key.

In some embodiments, the processing rules are configured to have a delayed implementation (e.g., based on a system clock or other type of clock) so that there is adequate time for such propagation to occur. Otherwise, a challenge that may exist in relation to decentralized systems is that there may be different versions of the processing rules being implemented in a particular point in time, especially where propagation speed may be impacted due to the availability of fast network connections between nodes.

In some embodiments, a separate processing rule propagation engine is provided at each node that is configured to utilize a higher priority communication channel or link to propagate processing rule changes, where the processing rules are encapsulated in separate data payloads than data payloads representing transactions.

FIG. 25 is illustrative of a second architecture 2500, wherein business data stored via files and a separate reporting database is provided, according to some embodiments.

This architecture may receive business data (business events, application state) that conforms to well-defined, structured data schema (relational database), and provides a fault tolerant application that can restore state from past events. Business data is accessible to enterprise needs (operations) and transaction data may be synchronized from a blockchain ledger to a normalized data store.

The architecture may be used to receive business events, store business events in relational data store. calculate application state from incoming events, restore application state from events (rolling snapshot, cache), in case of failure, and to perform dynamic and ad-hoc queries to business data: aggregations, joins, filters etc. to generate reports and analytics of business data.

Potential advantages may include, for example, the ability to provide normalized transaction data, tuned for query performance, aggregations, filters, joins etc. Data is structured and accessible for operational troubleshooting, and allows dynamic and ad-hoc queries. Fault tolerance may be achieved by restoring the application data from past events, and the architecture may meet an enterprise standard for storing data.

However, an additional data store may be required to synchronize transaction events with a blockchain ledger and there may be a duplicated transaction events store.

Figure 26:
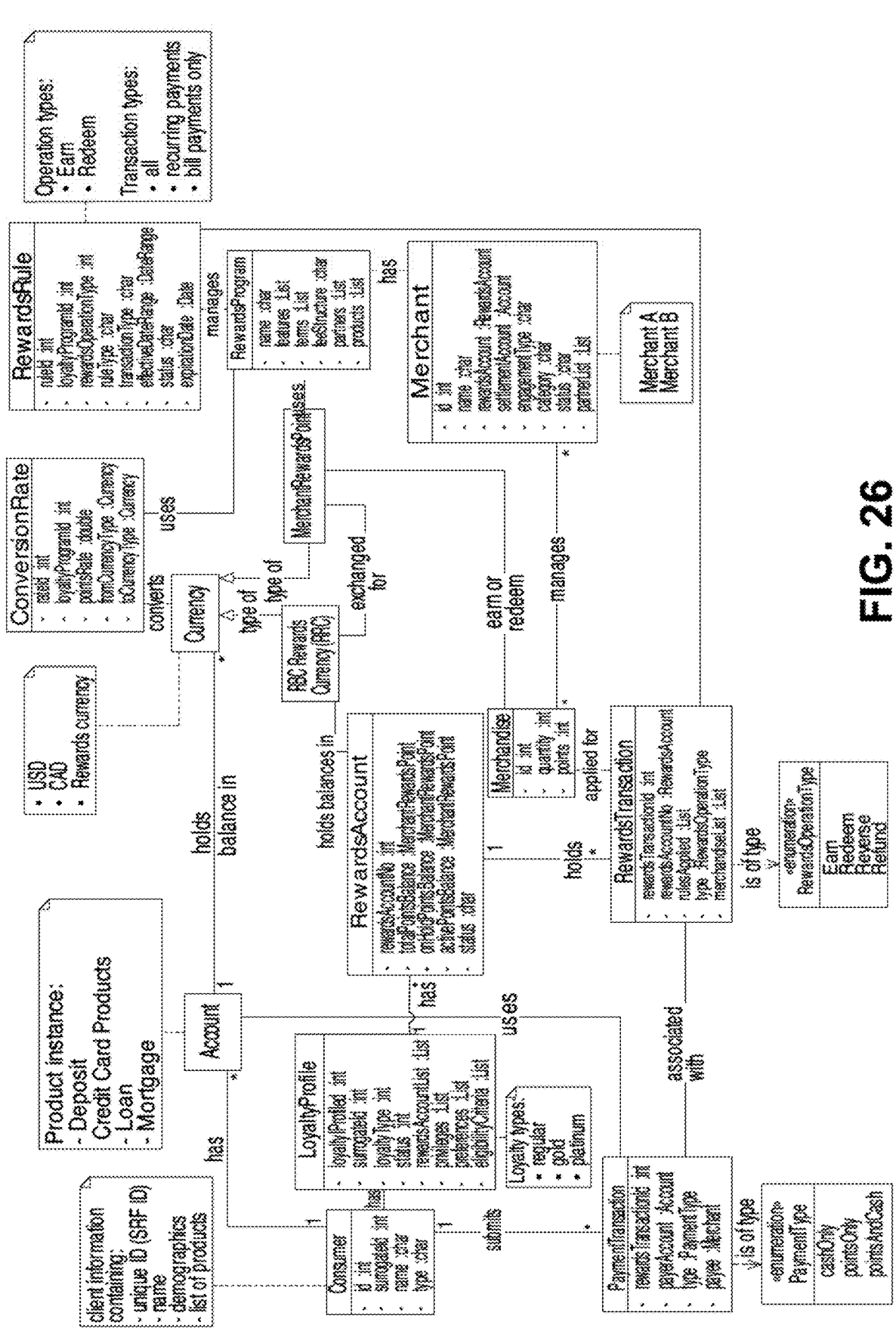
FIG. 26 is illustrative of an example information model, according to some embodiments.

FIG. 26 is illustrative of an example information model, according to some embodiments. The information model depicted in FIG. 26 is provided for illustration and variations are possible.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication.

In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for nonphysical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. As can be understood, the examples described above and illustrated are intended to be exemplary only.

Figure 27:
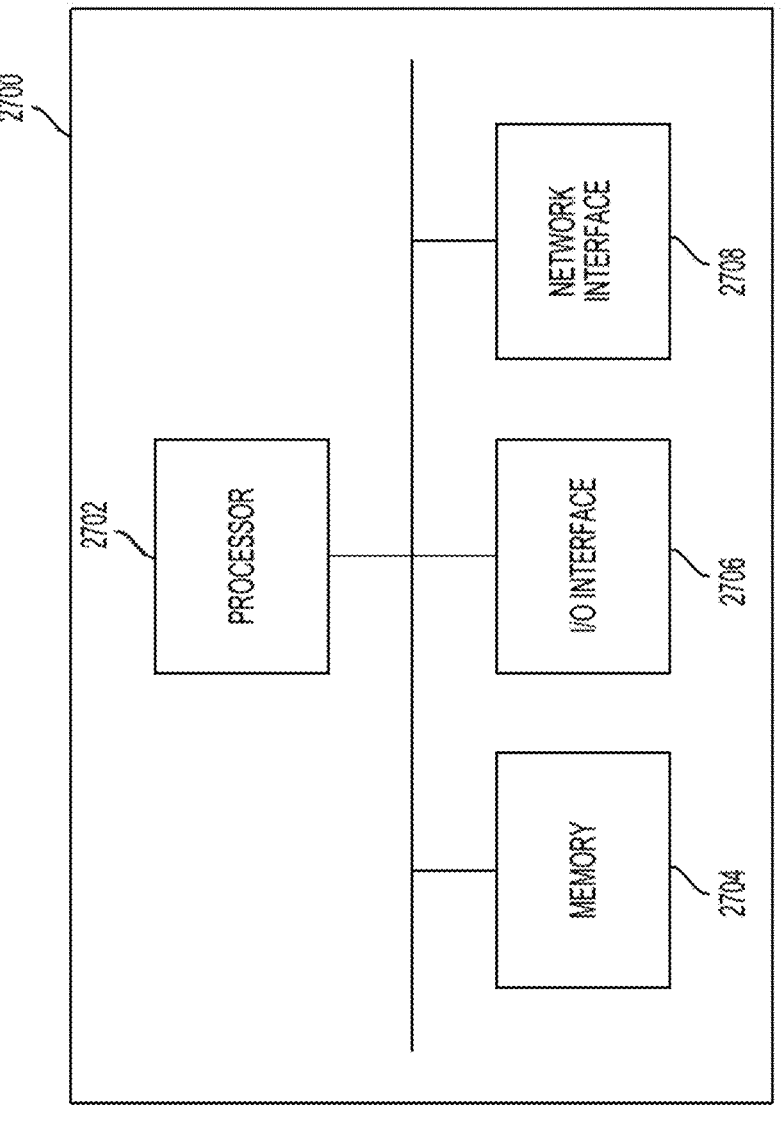
FIG. 27 is a schematic diagram of computing device, exemplary of an embodiment.

FIG. 27 is a schematic diagram of computing device 2700, exemplary of an embodiment. As depicted, computing device 2700 includes at least one processor 2702, memory 2704, at least one I/O interface 2706, and at least one network interface 2708.

Each processor 2702 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 2704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 2706 enables computing device 2700 to interconnect with one or more input devices, such as a keyboard, mouse, camera, touch screen and a microphone, or with one or more output devices such as a display screen and a speaker.

Each network interface 2708 enables computing device 2700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 2700 is operable to register and authenticate users (using a login, unique identifier, and password for example) prior to providing access to applications, a local network, network resources, other networks and network security devices. Computing devices may serve one user or multiple users.

A rationale for adopting blockchain platforms is to better transform and operate current enterprise business processes, as the business process in enterprise goes hand in hand with smart contracts in blockchain. In particular, the data configuration (integration, storage, security), in the context of business processes, has increased value, as the business process provides the context around how data is used in the entire flow. As blockchain is provided in relation to cross-enterprise trade, the matter of "centralized" vs "non-centralized" also has to be considered from the perspectives of business processes and data processes.

Business processes are often an overlooked design aspect when architecting inter-organizational platforms. The business control flow of the activities is very important, such as the entire process will span much more than just across a data perspective. In many enterprise applications, the control flow and business logic is scattered across the platform, without being managed more explicitly. Business process execution is by definition decentralized, dispersing different responsibilities between parties.

Current inter-organizational business processes present several challenges: how to manage conflict and disputes between parties; trust issues between organizations to participate in the business process: they can be addressed to some extent via secure data access, encryption mechanisms, agent services architecture, trust services for cross-parties collaborations, etc.; reliability and quality of services: are not easily solved by centralized process execution, as it does not solve the trust and historical data corruption issues; trust challenges for business processes can be better addressed by shared data stores, which are synchronized via consensus algorithms in a full trusted environment.

This is where Blockchain infrastructures can help with the trust issues. Blockchain platforms include several architecture constructs in their design, such as: business processes based on trust between entities; an accounting ledger database; improved cryptography, security.

One approach of implementing business processes with Blockchain data structures is where large parts of the control flow and business logic of inter-organizational processes are compiled from process models into smart contracts, ensuring that the joint process is correctly executed.

Figure 28:
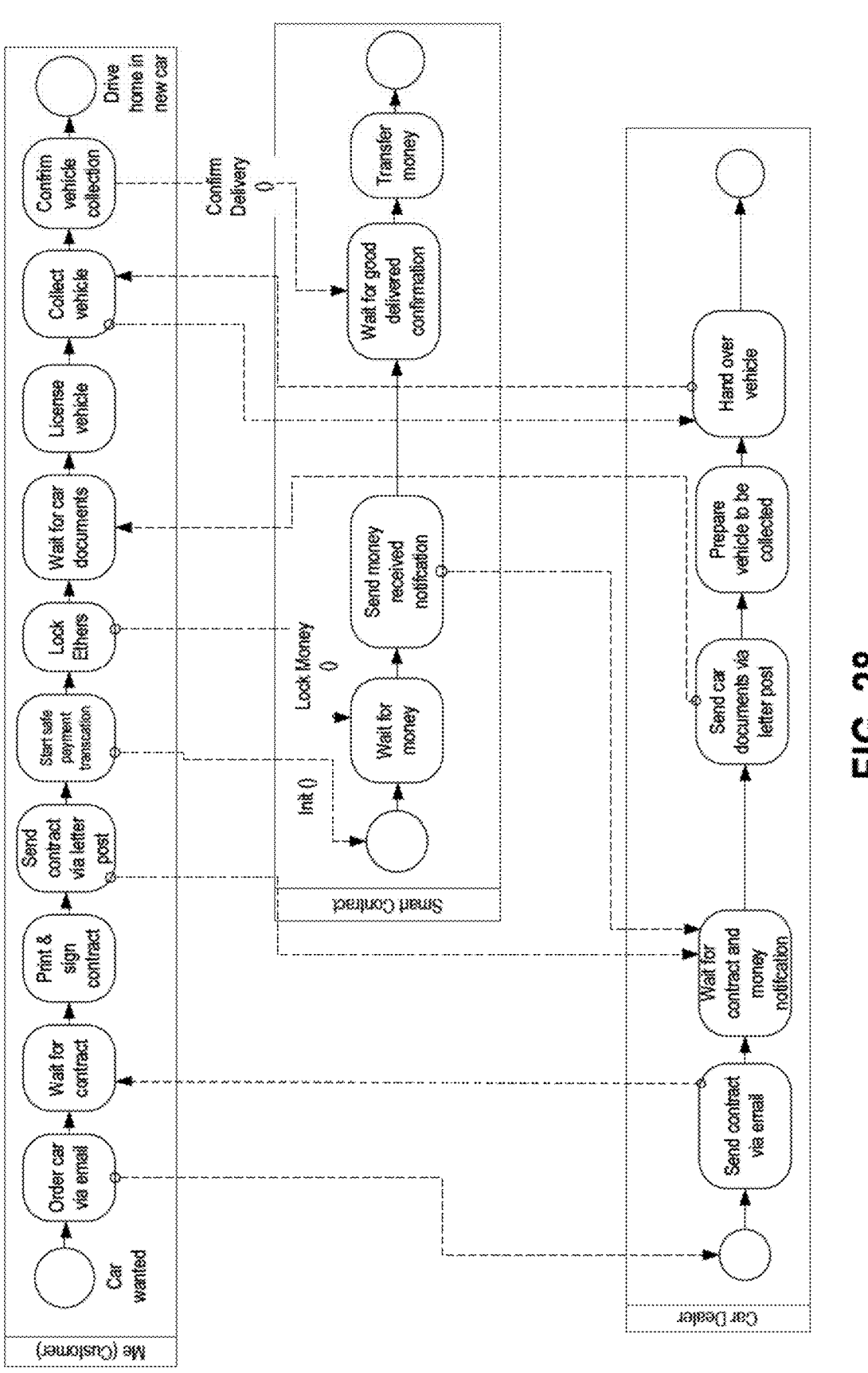
FIG. 28 is an example method diagram illustrating an example implementation of Blockchain smart contracts for purchasing a car, according to some embodiments.

FIG. 28 is an example method diagram illustrating an example implementation of Blockchain smart contracts for purchasing a car, according to some embodiments.

Smart contracts show promise to help with business process implementation between entities, providing orchestration and monitoring support, as blockchains help implementing business processes and alleviating their current drawbacks by leveraging its key features: active mediator between parties: coordinates the collaborative process execution, using smart contracts to drive the process and data transformations; process monitoring: via smart contracts, where only expected events are accepted, from registered parties; providing an immutable ledger: where all state changing events are recorded in the ledger; encryption: which will ensure the certain data entities are publicly visible, while the private; and entities are protected so only process participants can access them. Solutions such as Rho-lang™ can provide domain specific languages, Caterpillar™ can be used for Business Process Management Systems, and Camunda™ can be utilized for process integration with blockchain technologies.

Blockchain for rewards exchange can be used support the following key business processes across multiple organizations (loyalty merchants and banks): exchange: by debiting or crediting client and merchant accounts, and requesting merchants to update their own points banks; clearing: by giving access to merchants and banks to the entire set of transactions history recorded in the ledger; settlement: by facilitating payment transactions between merchants and their own banks; and reconciliation: allowing merchants to further reconcile their own systems.

Figure 30A:
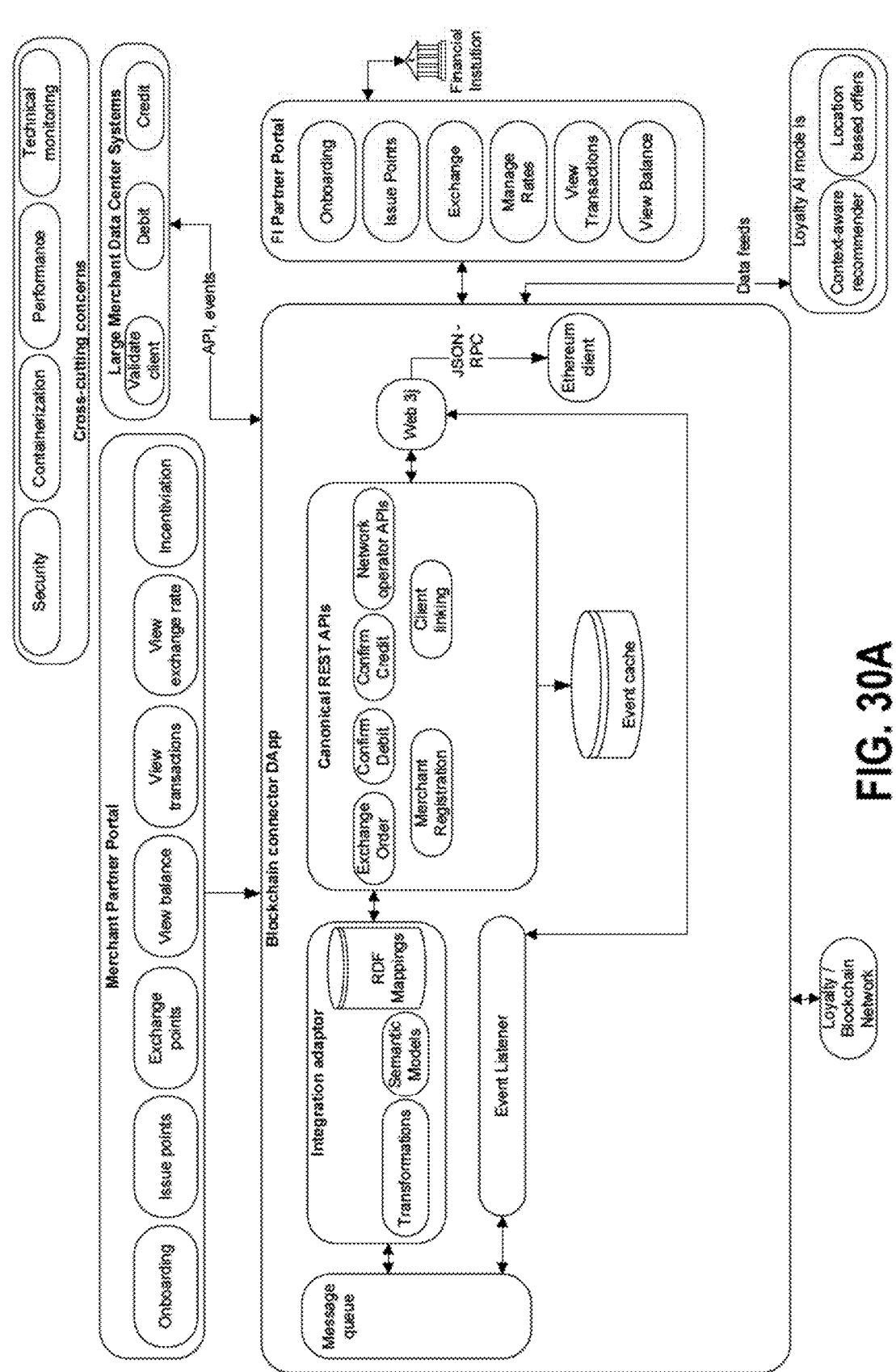
FIG. 30A is an example system architecture diagram including a blockchain connector distributed application, according to some embodiments.
Figure 30B:
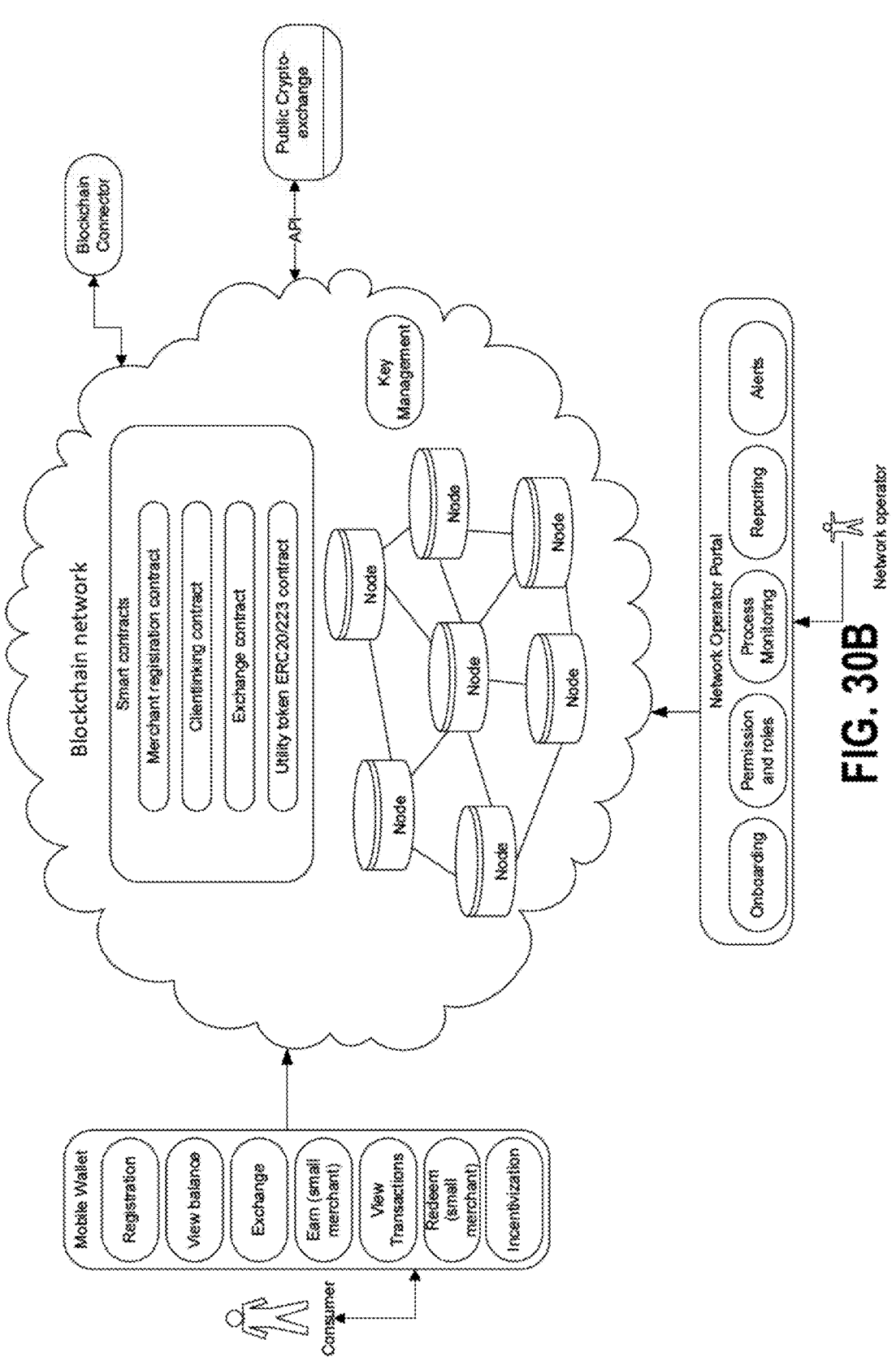
FIG. 30B is an example system architecture diagram of the blockchain network of FIG. 30A.

From a design features perspective, the following considerations in Table 1 are relevant:

FIG. 30A and FIG. 30B is an example system architecture diagram including a blockchain connector distributed application, according to some embodiments.

In this example embodiment, a specific blockchain connector distributed application (blockchain connector Dapp) is utilized as an intermediary that is used for indirect access to the blockchain ledger/loyalty network through a set of integration adaptors, APIs, etc., which utilize event listeners and caches to generate command messages and signals which are then propagated to loyalty nodes of the loyalty network for generating new blocks representative of transactions on the blockchain data structure.

TABLE 1

| No | Category | Design Feature |
|---|---|---|
| 1 | Ease of use | Interactions between merchants and existing loyalty platforms needs to be seamless, with simplified integrations and simpler processes to perform registration and exchange. Partner integration is included whereby state changing events are recorded on the ledger, and encryption is used to ensure that certain data aspects are publicly available, but private data elements are protected. |
| 2 | Reusability | Reuse the integration protocol with each merchant with minimal impact to the core Exchange platform |
| 3 | Reusability | Reuse existing banking services (CAMPS for fraud) where applicable |
| 4 | Blockchain | Ledger type: the Blockchain ledger used for Exchange will be a consortium-based ledger, private and permissioned. |
| 5 | Blockchain | Network management: The ledger protocol should be designed to minimize unnecessary network traffic |
| 6 | Blockchain | Network operations: The network must be extensible, so that participants have flexibility in joining and leaving the network |
| 7 | Smart contracts | Process orchestration: smart contracts will act as a process coordinator between entities, their on-chain and off-chain operations |
| 8 | Smart contracts | Utility token: can be implemented via ERC20/223 standard to act as a proxy exchange currency between different currency pairs. The utility token will not have an intrinsic value at initial phases. |
| 9 | Smart contracts | Modularity: business logic covering the exchange should be encapsulated from token management, access controls logic, change management etc. |
| 10 | Smart contracts | Change management: modular smart contracts, allowing them to be upgraded without impacting the other components or causing system disruption |
| 11 | Security | Calls between on-chain and off-chain are secured ( via hashing, transactions signing etc.) to ensure transactions have not tampered when they are processed off-chain (merchant's systems) |
| 12 | Data | Integrity: Using blockchain for loyalty points exchange provides exchange transaction data integrity between participating entities |
| 13 | Data | Authoritative: Facts recorded by the ledger should be regarded as authoritative by all parties, functioning as a sub-ledger, not a shadow ledger |
| 14 | Data | Storage on chain: minimize amount of data stored in Blockchain, as this a distributed append-only log, which is replicated among network entities. Every event and transaction data added to the blockchain cannot be subsequently removed. Where applicable, store only a reference address to the off-chain data, and not the entire data |
| 15 | Data | Storage off-chain: implement an off-chain application state storage to maintain application state, events, requests data and provide better application query performance compare to Blockchain block queries. This off-chain data store will persist the events emitted by smart contracts and also the request data before being sent to the smart contracts. |
| 16 | Merchant driven | Merchant is the master of his own data; he has the full and granular access control over the data he shared in the network or in the cloud. |
| 17 | Exchange rate | Will be pre-configured and managed directly on the Blockchain ledger. The exchange rate will be static in the first phases and it can become dynamically traded in the future phases |

Pre-requisites for an implementation include: Merchant has been registered to Blockchain ledger and has already a Blockchain account (public and private keys). Merchant deployed the Blockchain connector on its own data center, tested and ensured network connectivity between connector and Blockchain private network.

Figure 29:
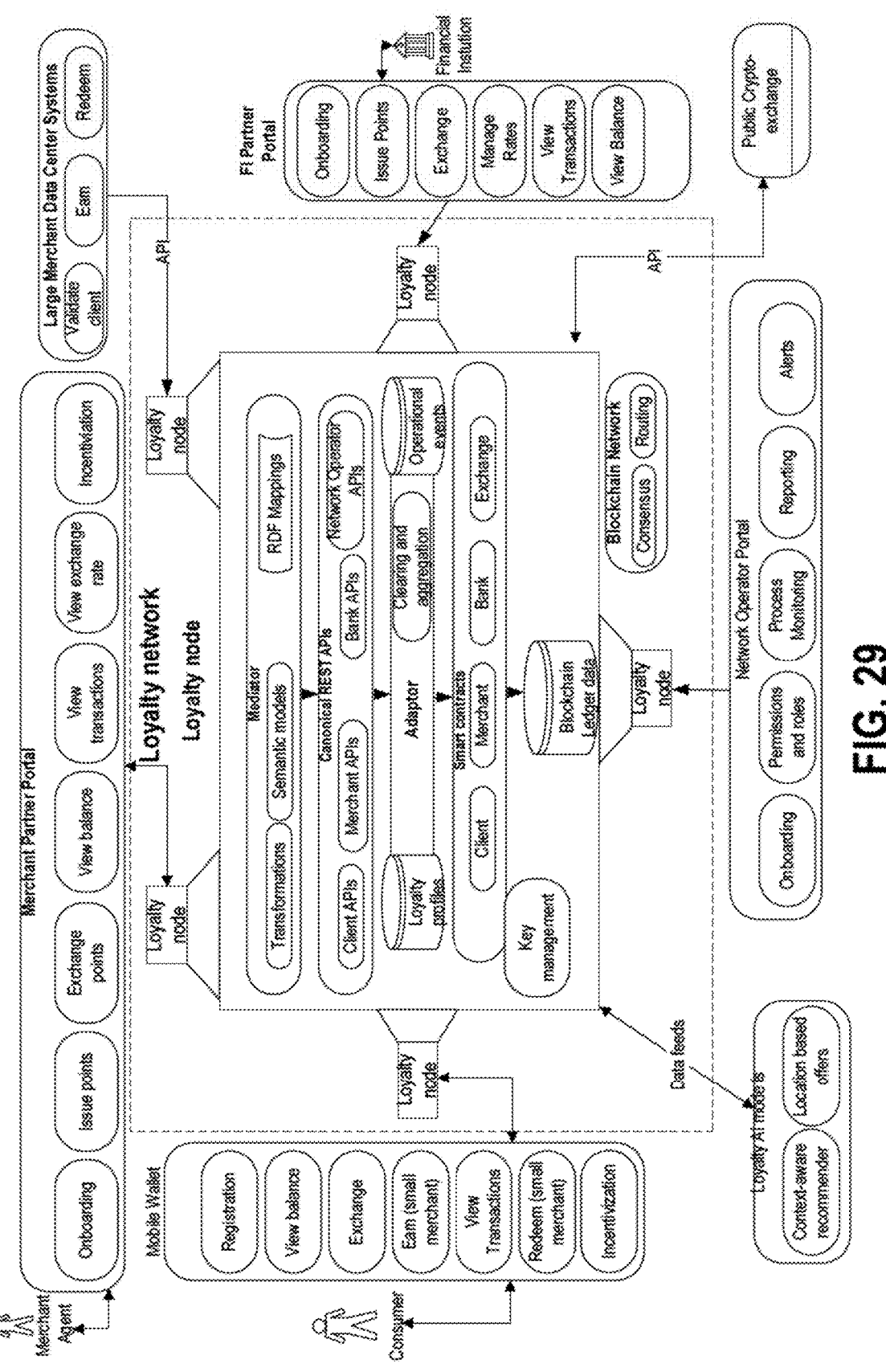
FIG. 29 is an example system architecture diagram, according to some embodiments.

FIG. 29 is an example system architecture diagram, according to some embodiments.

A loyalty network is provided that interconnects with a merchant partner portal, financial institution partner portals, mobile wallets, loyalty artificial intelligence models, as well as a network operator portal.

The loyalty node is configured for storing blockchain ledger data, propagated across a set of loyalty nodes, each run by a computing device. Each loyalty node tracks a copy of the blockchain ledger data, and is able to receive updates and transactions, which are then posted as data messages encapsulated in new blocks to be added to the blockchain. Any loyalty nodes of the network of loyalty nodes can be directly accessed to transact with the blockchain.

In accordance with some embodiments, a set of design choices and principles have been defined to address the key goals for: simplified partner integration; reduced reconciliation; immutable transaction data, while leveraging Blockchain infrastructure These design principles cover the target state architecture.

Figure 31:
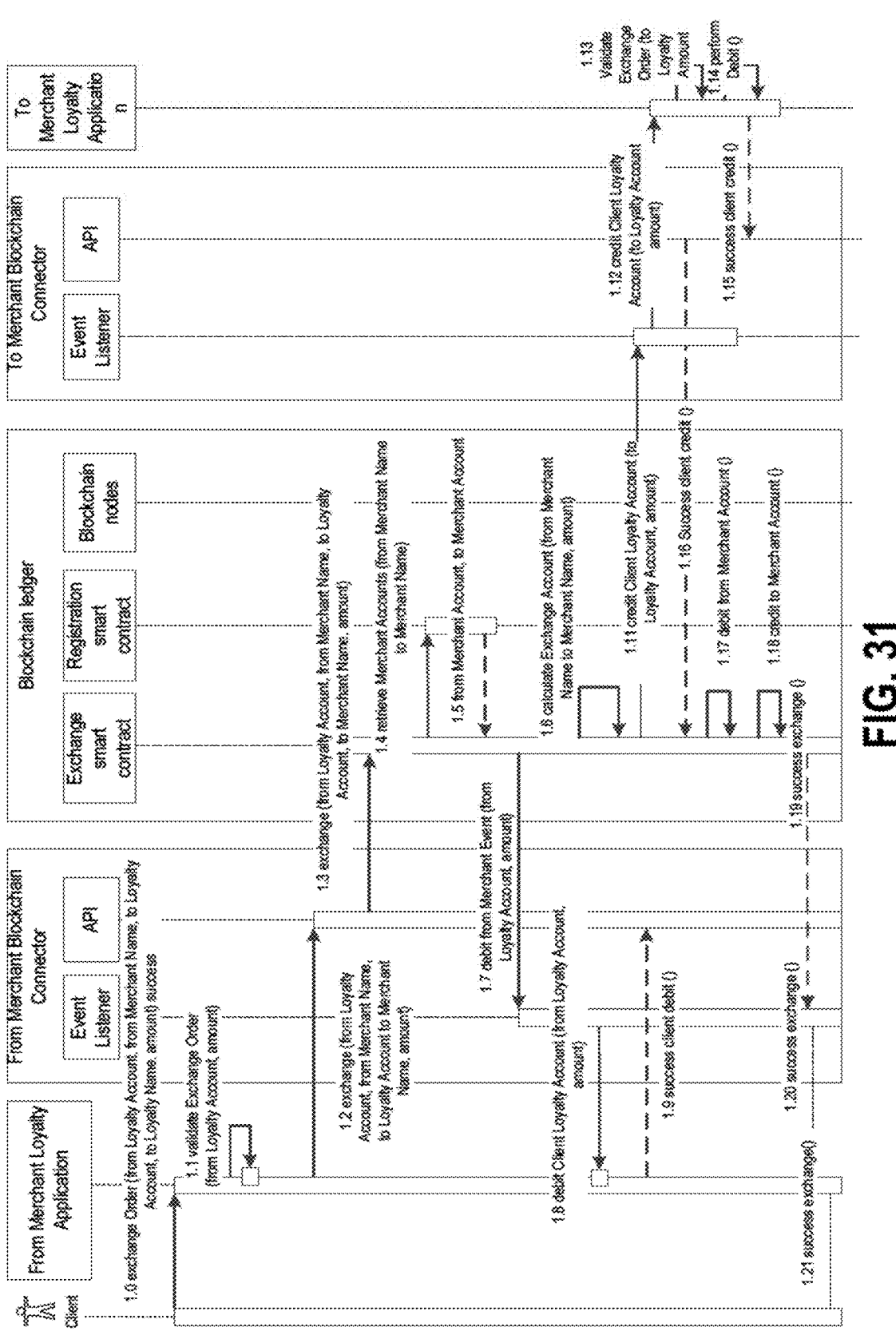
FIG. 31 is an example exchange sequence diagram, according to some embodiments.

FIG. 31 is an example exchange sequence diagram, according to some embodiments. A merchant blockchain connector is provided that includes an event listener and an application programming interface (API), which interoperates with a blockchain ledger housing an exchange smart contract, a registration smart contract across distributed ledgers stored on and propagated across one or more blockchain computing nodes. The blockchain is configured for interoperability with one or more merchant loyalty applications.

As shown in steps 1.0-1.21, data flows are provided illustrating an exchange order being handled from the merchant loyalty application across blockchain connector to the blockchain ledger and back to the merchant loyalty application. In particular, the exchange includes validated exchange orders which are transferred from one loyalty account at one merchant to another loyalty account, conducting both a debit transaction and a credit transaction to various merchant loyalty applications by way of a transaction that is facilitated across the blockchain. Activities on the blockchain and updated ledgers initiate both the debit and credit processes, and the parties are able to validate that transactions have taken place by investigating information stored on the blocks of the blockchain.

In this example, there are several prerequisites: merchant has integrated the Blockchain connector with its own loyalty applications, to ensure client validation, debit or credit operations for client loyalty account, and the client has been registered with the merchant, and there exists a mapping between the client's "From Merchant" and "To Merchant" loyalty accounts that is already in place; and the client is authenticated with the "From Merchant" loyalty application.

the rest of the platform services, by using semantic mappings to transform to canonical specifications (JSON Linked Data).

Benefits of conducting the mapping include minimizing customizations for each merchant, by insulating the specific merchant data from the rest of the platform, and provides core platform loyalty services which can be reused with different merchants integrations, which will simplify the onboarding process.

Example technologies can include: Scala™, Java™; Akka™ and Akka-HTTP™; Spray™ JSON; Karma™ offline library; Data formats standards: OWL™ (web ontology language), R2RML™, Turtle™ (TTL), JSON Linked Data; Stanford Protégé for OWL™ definition; and Karma™ web application for semantic mappings, among others.

Figure 34:
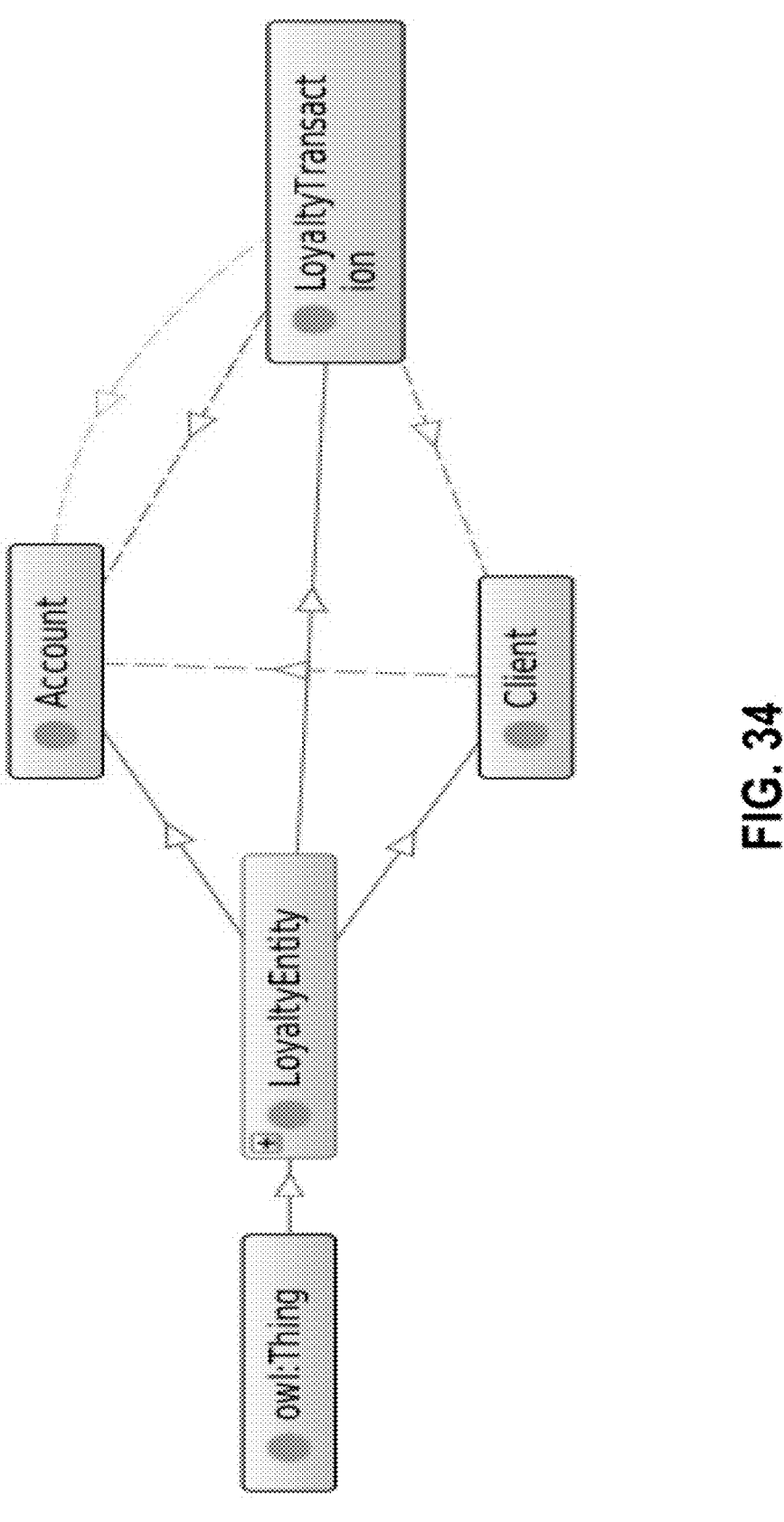
FIG. 34 is an example ontology structure, according to some embodiments.

FIG. 34 is an example ontology structure, according to some embodiments.

The ontology structure can include, for example:

```
<rdf:RDFxmlns="http://www.banking.com/loyalty.owl#"
xml:base="http://www.banking.com/loyalty.owl"  xmlns:owl="http://www.w3.org/2002/07/owl#"
xmlns:owl2="http://www.w3.org/2006/12/owl2-xml#"
xmlns:loyalty="http://www.banking.com/loyalty.owl#"
xmlns:rdf="http://www.w3.org/1999/02/22-rdf-syntax-ns#"
xmlns:xsd="http://www.w3.org/2001/XMLSchema#"
xmlns:skco="http://www.w3.org/2004/02/skos/core#"
xmlns:skos="http://www.w3.org/2008/05/skos#"  xmlns:swvs="http://www.w3.org/2003/06/sw-
vocab-status/ns#"                    xmlns:rdfs="http://www.w3.org/2000/01/rdf-schema#">
<owl:Ontology                                               rdf:about=""/>
<owl:Class                                                rdf:ID="Account">
  <rdfs:label                              xml:lang="en-us">Account</rdfs:label>
</owl:Class>
<owl:DatatypeProperty                                    rdf: ID="accountId">
<rdfs:domain                                      rdf:resource="#Account"/>
<rdfs:label                             xml:lang="en-us">accountId</rdfs:label>
<rdfs:range                                      rdf:resource="&xsd;string"/>
</owl:DatatypeProperty>
<owl:ObjectProperty                                       rdf:ID="accounts">
<rdfs:domain                                       rdf:resource="#Client"/>
<rdfs:label                                xml:lang="en">accounts</rdfs:label>
<rdfs:range                                      rdf:resource="#Account"/>
</owl:ObjectProperty>
<owl:DatatypeProperty                                     rdf:ID="amount">
<rdfs:domain                                   rdf:resource="#Transaction"/>
<rdfs:label                                xml:lang="en">amount</rdfs:label>
<rdfs:range                                      rdf:resource="&xsd;double"/>
</owl:DatatypeProperty>
<owl:DatatypeProperty                                     rdf:ID="balance">
<rdfs:domain                                      rdf:resource="#Account"/>
<rdfs:label                                xml:lang="en">balance</rdfs:label>
<rdfs:range                                      rdf:resource="&xsd;double"/>
</owl:DatatypeProperty>             <owl:Class            rdf: ID="Client">
<rdfs:label                              xml:lang="en-us">Client</rdfs:label>
</owl:Class>
```

Figure 32:
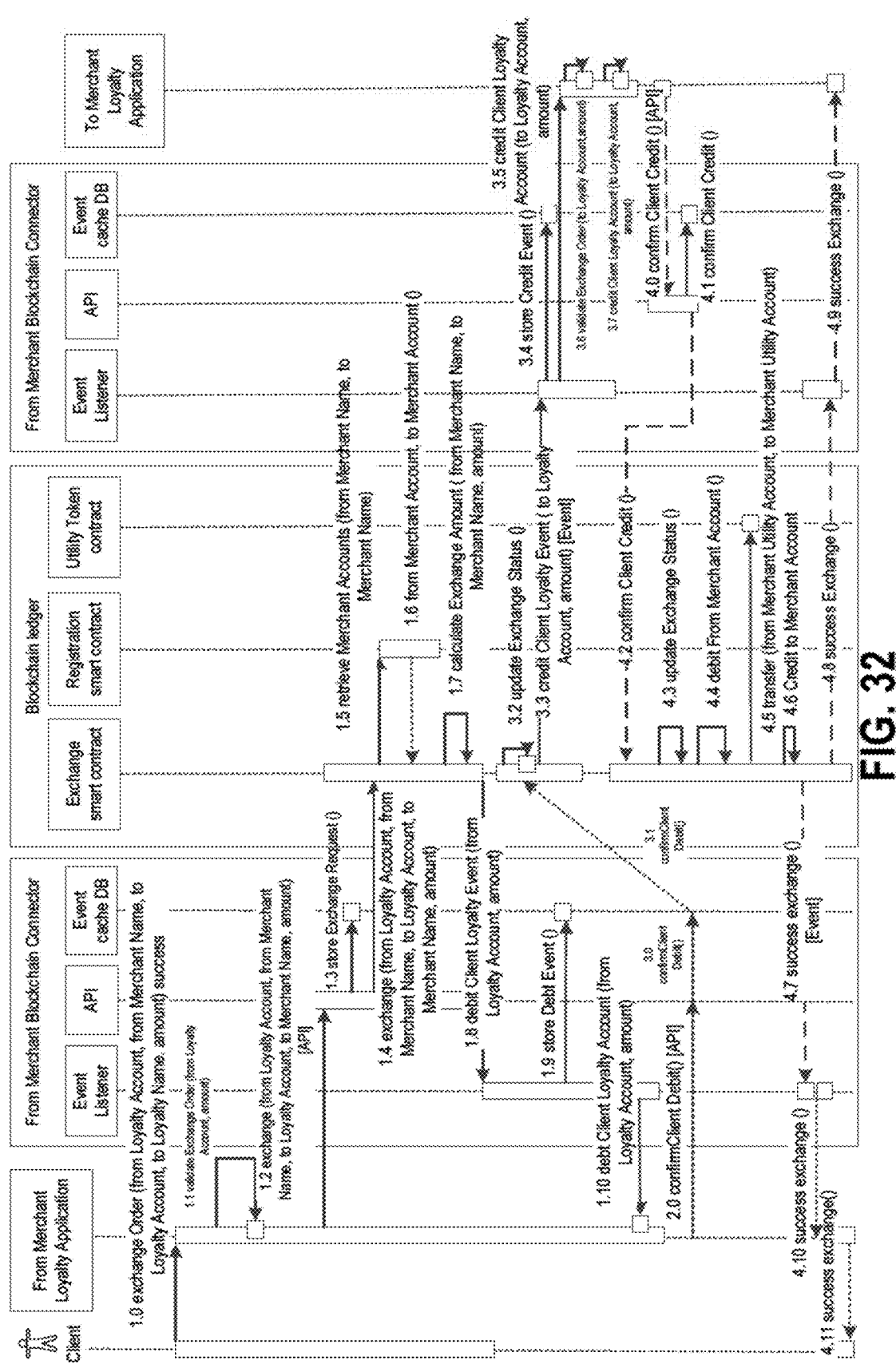
FIG. 32 is an example exchange sequence diagram, according to some embodiments.

FIG. 32 is an example exchange sequence diagram, according to some embodiments. In this example, steps are shown from 1.0-4.11. In this example, there are additional steps relative to the sequence of FIG. 31, whereby event cache databases are also interacted with to store the various requests and to conduct confirmations of credit amounts and events, among others.

Figure 33:
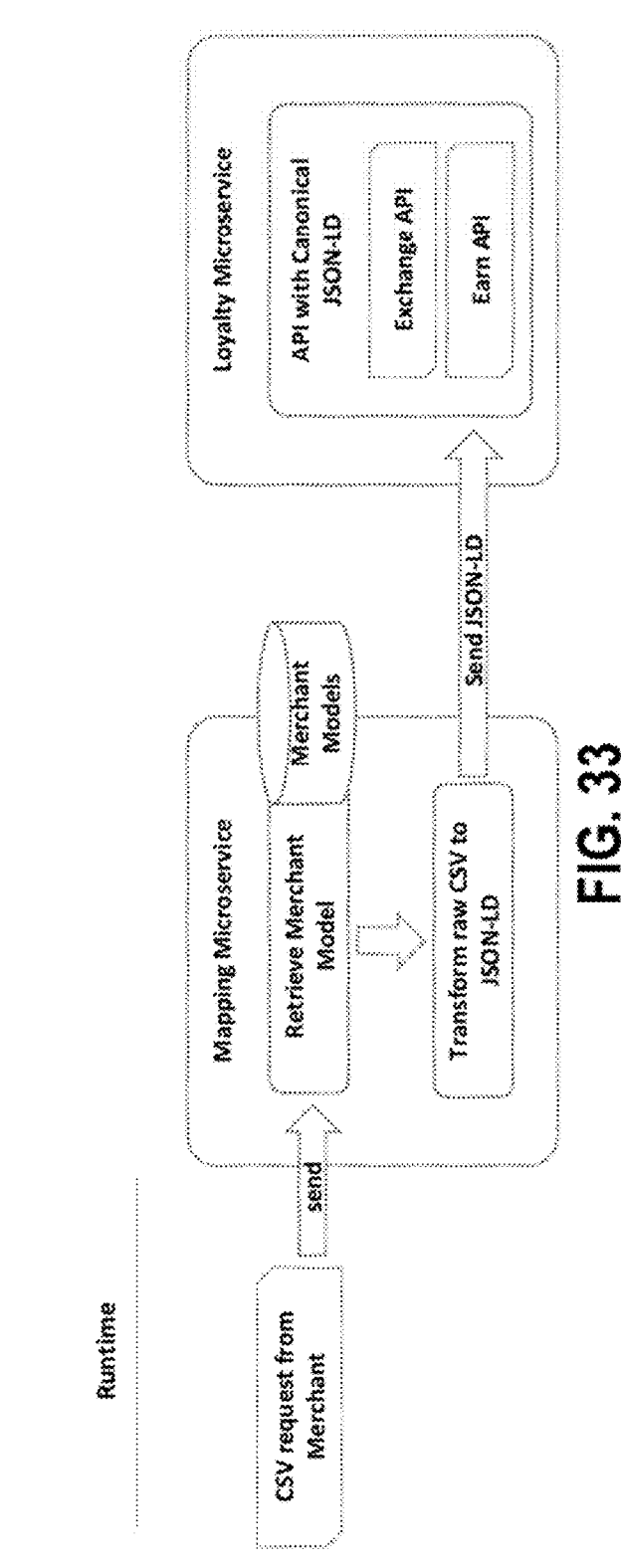
FIG. 33 is an illustration of data flows for providing a mapping layer between merchant specific data to a canonical model for use with a blockchain implementation, according to some embodiments.
Figure 35:
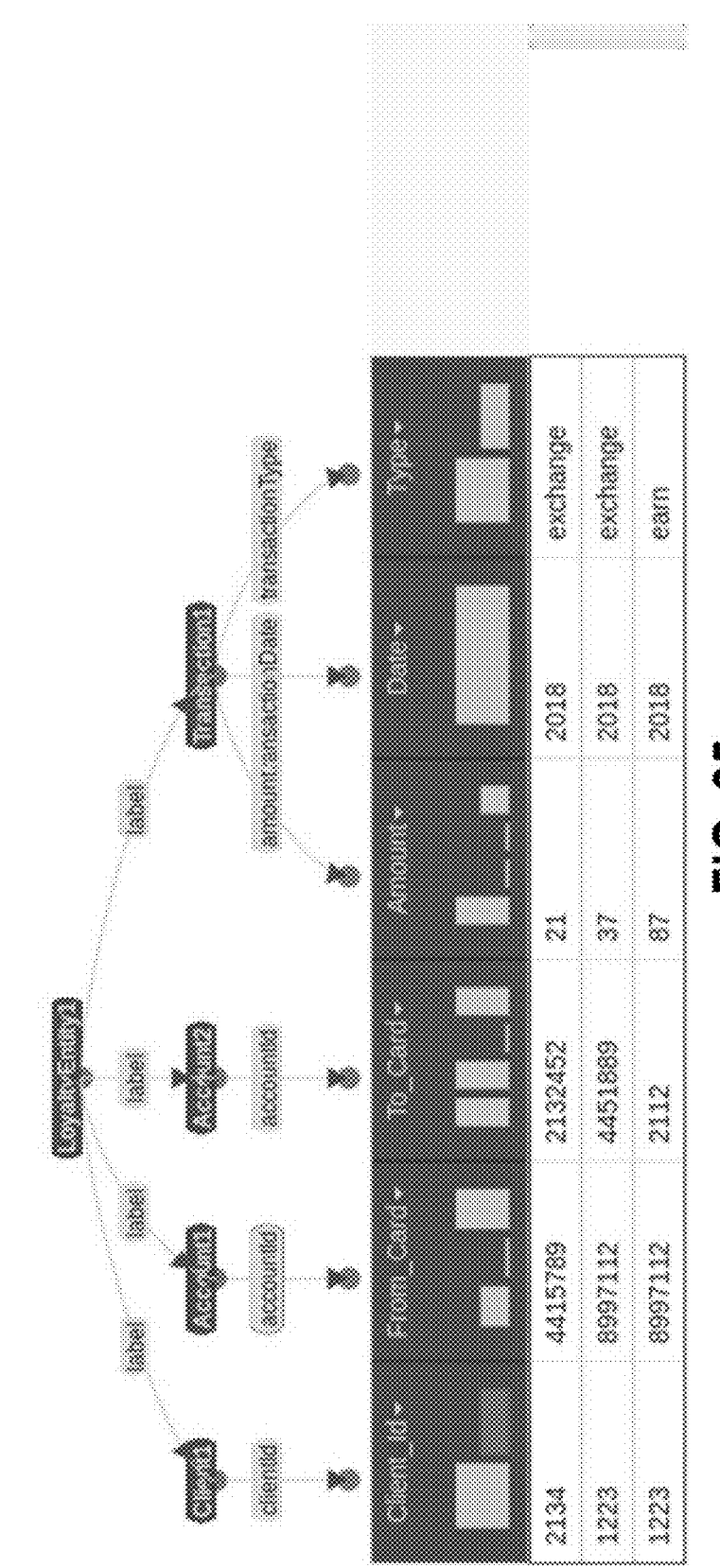
FIG. 35 is an example mapping to an ontology structure, according to some embodiments, based on a flat OWL™ structure.

FIG. 33 is an illustration of data flows for providing a mapping layer between merchant specific data to a canonical model for use with a blockchain implementation, according to some embodiments. The process is conducted to streamline the integration process with each merchant, by providing: A business semantic mapping layer: which can be used at design time, by business analysts to map the merchants interface specifications to canonical models; integration services which abstract merchant data specifications from FIG. 35 is an example mapping to an ontology structure, according to some embodiments, based on a flat OWL™ structure.

Figure 36:
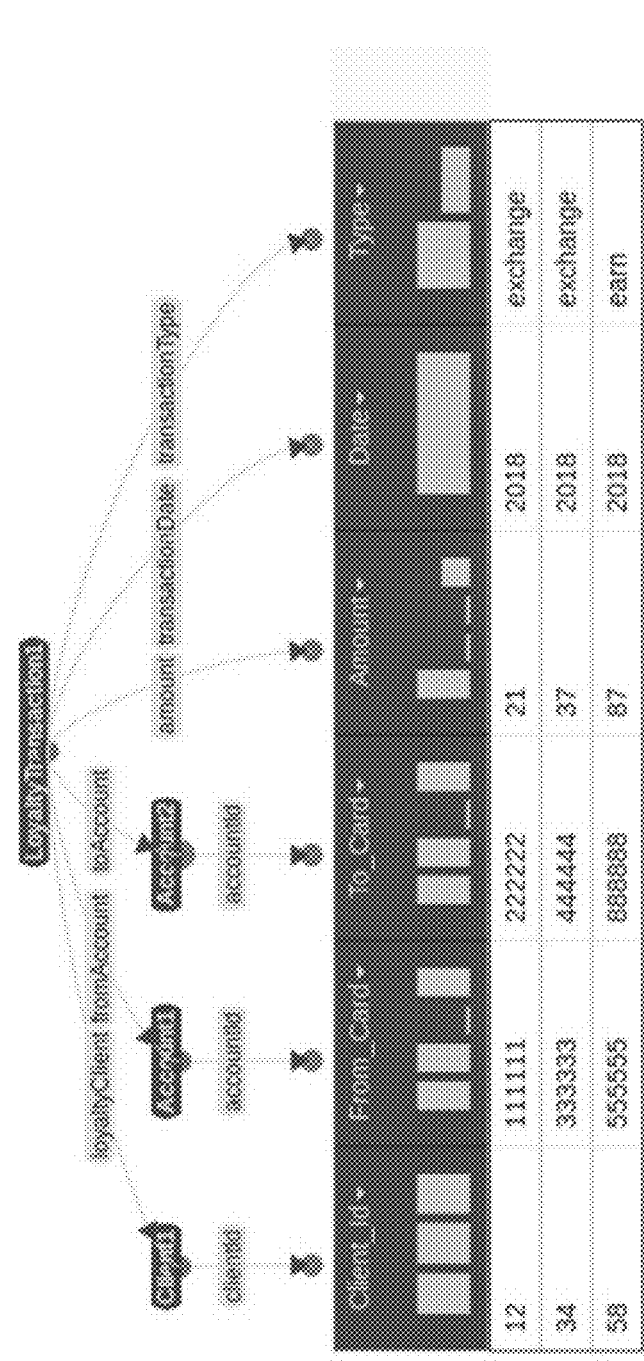
FIG. 36 is an example mapping to an ontology structure, according to some embodiments, based on an hierarchical OWL™ structure.

FIG. 36 is an example mapping to an ontology structure, according to some embodiments, based on an hierarchical OWL™ structure.

A R2RML model may be applied to the raw CSV data to obtain a Json Linked Data (JSON LD) format:

FIG. 37 is an example of an application of an R2RML model to a JSON Linked Data, according to some embodiments.

What is claimed is:

1. A system for electronically managing virtual tokens corresponding to loyalty rewards stored on a series of decentralized devices, the system comprising:

a plurality of node computing devices, each node computing device of the plurality of node computing devices having a communication link established with at least one other node computing device of the plurality of node computing devices;

a plurality of distributed ledgers, each distributed ledger of the plurality of distributed ledgers managed by a corresponding node computing device of the plurality of node computing devices, the plurality of distributed ledgers together tracking generation, provisioning and processing of the virtual tokens through sequential entries that are cryptographically linked together and propagated through the plurality of distributed ledgers through application of a set of electronic propagation consensus mechanisms that are applied to determine whether an incoming sequential entry should be added at a target distributed ledger;

a distributed ledger connector application provided at some or all of the nodes of the node computing devices, the distributed ledger connector application adapted for receiving electronic instructions at payment transaction devices operatively linked to the corresponding node computing device, the electronic instructions including at least data transmissions representative of an electronic transaction;

wherein the distributed ledger connector application is configured to extract, from the electronic instructions, one or more control commands indicative of requests to generate, provision or process virtual tokens stored in a digital wallet linked to a user profile, the one or more control commands adapted to interface with the plurality of distributed ledgers by recording electronic transactions to the distributed ledger corresponding to the node computing device that the distributed ledger connector application is operating on, the electronic transactions representative of data records corresponding to the one or more control commands and adapted for propagation through the plurality of distributed ledgers through the communication links established between the individual node computing devices of the plurality of node computing devices, the propagation updating each of the plurality distributed ledgers by generating new sequential entries cryptographically linked to existing sequential entries; and wherein:
the plurality of node computing devices are configured to encrypt at least a portion of each of one or more data payloads using at least a public key corresponding to the merchant identifier;

a corresponding private key to the public key is made available to a corresponding merchant, the corresponding private key usable by the corresponding merchant to decrypt the one or more data payloads;

the one or more blocks aggregate only data payloads that share a common merchant identifier; and cryptographic linkages between the one or more blocks are generated using at least the public key corresponding to the merchant identifier.

2. The system of claim 1, further comprising:

a plurality of distributed processing rule ledgers each being managed by a corresponding node computing device of the plurality of node computing devices and corresponding to a distributed ledger of the plurality of distributed ledgers, the distributed processing rule ledgers sequentially storing a series of modifications of processing rules; and wherein the distributed ledger connector application of each node computing device is configured to traverse the corresponding distributed processing rule ledger during the extraction of the one or more control commands to identify and to apply a latest updated processing rule.

3. The system of claim 2, wherein the latest updated processing rule includes one of: a conversion rule reflective of how many virtual tokens can be converted into a second type of virtual token, or a consensus rule reflective of a wait time within the set of electronic propagation consensus mechanisms.

4. The system of claim 2, wherein:

the plurality of node computing devices are configured to encapsulate rule modifications and rule modification authorization keys alongside the electronic transactions within at least one of one or more data payloads;

the distributed ledger connector application of each node computing device is configured to receive propagated data payloads from neighboring node computing devices that are directly in communication with the node computing device; and the distributed ledger connector application is further configured to (i) extract transaction information for addition to the distributed ledger corresponding to the node computing device where the propagation consensus mechanisms are satisfied, and (ii) extract the rule modifications authorized against the rule modification authorization keys for addition to the processing rule ledger corresponding to the node computing device.

5. The system of claim 2, wherein the distributed ledger connector application of each node computing device is configured to, upon adding a rule modification to the processing rule ledger corresponding to the node computing device, generate new private key requirements based at least on the rule modification authorization keys, the new private key requirements generated to provide a cascading chain of authorization keys that are automatically modified on every rule modification added to the corresponding processing rule ledger.

6. The system of claim 2, wherein the series of modifications of processing rules are propagated across all of the plurality of distributed processing rule ledgers such that over a duration of time, all of the plurality of distributed processing rule ledgers are updated.

7. The system of claim 1, wherein the distributed ledger connector application is configured to initiate one or more queries associated with the virtual tokens stored in the digital wallet or linked to the user profile by performing a traversal of a portion of a predefined number of the distributed ledgers of the plurality of distributed ledgers, the traversal utilizing the private key corresponding to the merchant identifier to decrypt the cryptographic linkages between the one or more blocks.

8. The system of claim 7, wherein the one or more queries include at least one of marketing queries, account information queries, and integrity checking queries.

9. The system of claim 1, wherein the plurality of node computing devices are further configured to:

receive, from an external rewards database, an array of data messages representing a series of transactions to onboard legacy rewards points records; and generate a corresponding data payload for each data message of the array of data messages representing a series of transactions to onboard legacy rewards points records, each of the corresponding data payloads being populated with a bypass value in a variable confirmation requirement field such that the electronic propagation consensus mechanisms determine that the corresponding data payloads having the bypass values in the variable confirmation requirement field do not require confirmation prior to the corresponding data payloads being marked as recorded.

10. The system of claim 1, wherein the plurality of node computing devices are further configured to:

process transactions between a first digital wallet and a second digital wallet, the first digital wallet corresponding to a first merchant, and the second digital wallet corresponding to a second merchant by:

receiving, from authentication interfaces associated with each of the first and the second merchant, a first private key associated with the first merchant and a second private key associated with the second merchant;

determining, from a conversion table, a conversion rate to be applied as between transaction amounts from the first digital wallet and the second digital wallet;

recording a first transaction on the first digital wallet using the first private key and the recordation of a second transaction on the second digital wallet using the second private key, the transaction amounts determined based at least on the conversion rate; and confirming the recordation of the first transaction and the second transaction by monitoring received confirmations related to both of the first and the second transaction until a total number of confirmations required in a variable confirmation requirement fields is satisfied.

11. The system of claim 1, wherein the plurality of node computing devices are further configured to:

periodically or continuously mine an external transaction log to identify accumulation of new virtual tokens associated with the user profile; and generate one or more new data payloads corresponding to the accumulated new virtual tokens, each of the new data payloads including an originating account identifier populated as a virtual token treasury, a counterparty account identifier populated with the virtual wallet associated with the user profile, and a variable confirmation requirement field populated with a bypass value in the variable confirmation requirement field such that no confirmations are required prior to the data payload being marked as recorded.

12. The system of claim 1, wherein:

the plurality of node computing devices are configured to encapsulate one or more data payloads that are propagated to the plurality of distributed ledgers through the communication links established between the individual node computing devices of the plurality of node computing devices, the one or more data payloads encapsulated to include at least: (i) a transaction amount, (ii) a transaction type, (iii) an originating account identifier, (iv) a counterparty account identifier, and (v) a merchant identifier; and wherein the one or more data payloads are aggregated in one or more blocks that are stored within the sequential entries on the plurality of distributed ledgers.

13. The system of claim 1, wherein each of the distributed ledger connector applications are configured with permissioning settings which specify whether the associated node is able to monitor, view, access, or modify the distributed ledger, wherein each associated node is adapted to perform functions defined by the associated permissioning settings.

14. A method for electronically managing virtual tokens corresponding to loyalty rewards stored on a series of decentralized devices, the method comprising:

providing a plurality of node computing devices, each node computing device of the plurality of node computing devices having a communication link established with at least one other node computing device of the plurality of node computing devices;

maintaining a plurality of distributed ledgers, each distributed ledger of the plurality of distributed ledgers managed by a corresponding node computing device of the plurality of node computing devices, the plurality of distributed ledgers together tracking generation, provisioning and processing of the virtual tokens through sequential entries that are cryptographically linked together and propagated through the plurality of distributed ledgers through application of a set of electronic propagation consensus mechanisms that are applied to determine whether an incoming sequential entry should be added at a target distributed ledger;

providing a distributed ledger connector application at some or all of the nodes of the node computing devices, the distributed ledger connector application adapted for receiving electronic instructions at payment transaction devices operatively linked to the corresponding node computing device, the electronic instructions including at least data transmissions representative of an electronic transaction;

wherein the distributed ledger connector application is configured for extracting, from the electronic instructions, one or more control commands indicative of requests to generate, provision or process virtual tokens stored in a digital wallet linked to a user profile, the one or more control commands adapted to interface with the plurality of distributed ledgers by recording electronic transactions to the distributed ledger corresponding to the node computing device that the distributed ledger connector application is operating on, the electronic transactions representative of data records corresponding to the one or more control commands and adapted for propagation through the plurality of distributed ledgers through the communication links established between the individual node computing devices of the plurality of node computing devices, the propagation updating each of the plurality distributed ledgers by generating new sequential entries cryptographically linked to existing sequential entries; and further comprising:

encrypting at least a portion of each one or more data payloads using at least a public key corresponding to the merchant identifier;

wherein a corresponding private key to the public key is made available to a corresponding merchant, the corresponding private key usable by the corresponding merchant to decrypt the one or more data payloads;

wherein the one or more blocks aggregate only data payloads that share a common merchant identifier; and wherein the cryptographic linkages between the one or more blocks are generated using at least the public key corresponding to the merchant identifier.

15. The method of claim 14, further comprising:

encapsulating, by each node computing device of the plurality of node computing devices operatively coupled to the distributed ledger connector application, one or more data payloads that are propagated to the plurality of distributed ledgers through the communication links established between the individual node computing devices of the plurality of node computing devices, the one or more data payloads encapsulated to include at least: (i) a transaction amount, (ii) a transaction type, (iii) an originating account identifier, (iv) a counterparty account identifier, and (v) a merchant identifier; and wherein the one or more data payloads are aggregated in one or more blocks that are stored within the sequential entries on the plurality of distributed ledgers.

16. The method of claim 14, further comprising maintaining a plurality of distributed processing rule ledgers each being managed by a corresponding node computing device of the plurality of node computing devices and corresponding to a distributed ledger of the plurality of distributed ledgers, the distributed processing rule ledgers sequentially storing a series of modifications of processing rules; and traversing, by the distributed ledger connector application of each node computing device, the corresponding distributed processing rule ledger during the extraction of the one or more control commands to identify and to apply a latest updated processing rule.

17. The method of claim 16, further comprising propagating, the series of modifications of processing rules, across all of the plurality of distributed processing rule ledgers such that over a duration of time, all of the plurality of distributed processing rule ledgers are updated.

18. The method of claim 14, wherein the distributed ledger connector application is configured to initiate one or more queries associated with the virtual tokens stored in the digital wallet or linked to the user profile by performing a traversal of a portion of a predefined number of the distributed ledgers of the plurality of distributed ledgers, the traversal utilizing the private key corresponding to the merchant identifier to decrypt the cryptographic linkages between the one or more blocks.

19. The method of claim 14, further comprising:

processing transactions for a cross-platform transfer between a first digital wallet and a second digital wallet, the first digital wallet corresponding to a first merchant, and the second digital wallet corresponding to a second merchant;

wherein the cross-platform transfer includes:

receiving, from authentication interfaces associated with each of the first and the second merchant, a first private key associated with the first merchant and a second private key associated with the second merchant;

determining, from a conversion table, a conversion rate to be applied as between transaction amounts from the first digital wallet and the second digital wallet;

instructing each node computing device of the plurality of node computing devices to cause the recordation of a first transaction on the first digital wallet using the first private key and the recordation of a second transaction on the second digital wallet using the second private key, the transaction amounts determined based at least on the conversion rate; and confirming the recordation of the first transaction and the second transaction by monitoring received confirmations related to both of the first and the second transaction until a total number of confirmations required in the variable confirmation requirement fields is satisfied.

20. A non-transitory computer readable medium for electronically managing virtual tokens corresponding to loyalty rewards stored on a series of decentralized devices storing non-transitory machine-readable instruction sets, the machine-readable instruction sets, when executed by a processor, cause the processor to perform steps of:

providing a plurality of node computing devices, each node computing device of the plurality of node computing devices having a communication link established with at least one other node computing device of the plurality of node computing devices;

maintaining a plurality of distributed ledgers, each distributed ledger of the plurality of distributed ledgers managed by a corresponding node computing device of the plurality of node computing devices, the plurality of distributed ledgers together tracking generation, provisioning and processing of the virtual tokens through sequential entries that are cryptographically linked together and propagated through the plurality of distributed ledgers through application of a set of electronic propagation consensus mechanisms that are applied to determine whether an incoming sequential entry should be added at a target distributed ledger;

providing a distributed ledger connector application at some or all of the nodes of the node computing devices, the distributed ledger connector application adapted for receiving electronic instructions at payment transaction devices operatively linked to the corresponding node computing device, the electronic instructions including at least data transmissions representative of an electronic transaction;

wherein the distributed ledger connector application is configured for extracting, from the electronic instructions, one or more control commands indicative of requests to generate, provision or process virtual tokens stored in a digital wallet linked to a user profile, the one or more control commands adapted to interface with the plurality of distributed ledgers by recording electronic transactions to the distributed ledger corresponding to the node computing device that the distributed ledger connector application is operating on, the electronic transactions representative of data records corresponding to the one or more control commands and adapted for propagation through the plurality of distributed ledgers through the communication links established between the individual node computing devices of the plurality of node computing devices, the propagation updating each of the plurality distributed ledgers by generating new sequential entries cryptographically linked to existing sequential entries; and further comprising:

encrypting at least a portion of each one or more data payloads using at least a public key corresponding to the merchant identifier;

wherein a corresponding private key to the public key is made available to a corresponding merchant, the corresponding private key usable by the corresponding merchant to decrypt the one or more data payloads;

wherein the one or more blocks aggregate only data payloads that share a common merchant identifier; and wherein the cryptographic linkages between the one or more blocks are generated using at least the public key corresponding to the merchant identifier.

\* \* \* \* \*